United States Patent
Jhu et al.

(10) Patent No.: US 12,452,460 B2
(45) Date of Patent: Oct. 21, 2025

(54) METHODS AND APPARATUS FOR HIGH-LEVEL SYNTAX IN VIDEO CODING

(71) Applicant: BEIJING DAJIA INTERNET INFORMATION TECHNOLOGY CO., LTD., Beijing (CN)

(72) Inventors: Hong-Jheng Jhu, Beijing (CN); Yi-Wen Chen, Beijing (CN); Xiaoyu Xiu, Beijing (CN); Tsung-Chuan Ma, Beijing (CN); Wei Chen, Beijing (CN); Xianglin Wang, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 443 days.

(21) Appl. No.: 17/963,086

(22) Filed: Oct. 10, 2022

(65) Prior Publication Data

US 2023/0064904 A1 Mar. 2, 2023

Related U.S. Application Data

(63) Continuation of application No. PCT/US2021/026881, filed on Apr. 12, 2021.
(Continued)

(51) Int. Cl.
*H04N 19/70* (2014.01)
*H04N 19/159* (2014.01)

(52) U.S. Cl.
CPC ............ *H04N 19/70* (2014.11); *H04N 19/159* (2014.11)

(58) Field of Classification Search
CPC .............................. H04N 19/70; H04N 19/159
See application file for complete search history.

(56) References Cited

U.S. PATENT DOCUMENTS

2006/0017592 A1 1/2006 Shim et al.
2006/0115000 A1 6/2006 Otsuka
(Continued)

FOREIGN PATENT DOCUMENTS

CN 102907100 A 1/2013
GB 2590634 A 7/2021

OTHER PUBLICATIONS

Jhu, Hong-Jheng et al., "AHG9: On Syntax Signaling Order in SPS", Kwai Inc., 18th Meeting: by teleconference, Apr. 15-24, 2020, 13 pages.
(Continued)

*Primary Examiner* — Jerry T Jean Baptiste
(74) *Attorney, Agent, or Firm* — Seed IP Law Group LLP

(57) ABSTRACT

An electronic apparatus performs a method of decoding video data. The method comprises: receiving, from a bitstream, multiple syntax elements at one or more of sequence parameter set (SPS) level, picture parameter set (PPS) level, and slice level, wherein the multiple syntax elements are associated with a predefined function and sequentially arranged in the bitstream; in accordance with a determination that at least one of the multiple syntax elements satisfies a predefined condition: receiving, from the bitstream, a second syntax element after the multiple syntax elements; in accordance with a determination that the at least one of the multiple syntax elements does not satisfy the predefined condition: setting a value of the second syntax element to a default value; and performing the predefined function for video data from the bitstream in accordance with at least one of the multiple syntax elements and the second syntax element, wherein the predefined function is one selected from the group consisting of intra prediction function, inter prediction function, and merge mode.

20 Claims, 10 Drawing Sheets

Related U.S. Application Data

(60) Provisional application No. 63/008,648, filed on Apr. 10, 2020.

(56) References Cited

U.S. PATENT DOCUMENTS

| | | |
|---|---|---|
| 2009/0175349 A1 | 7/2009 | Ye et al. |
| 2011/0058613 A1 | 3/2011 | Han et al. |
| 2023/0099528 A1* | 3/2023 | Zhang ................ H04N 19/1883 375/240.26 |

OTHER PUBLICATIONS

Bross, Benjamin et al., "Versatile Video Coding (Draft 8)", 17$^{th}$ Meeting: Brussels, BE, Jan. 7-17, 2020, 513 pages.
Jhu, Hong-Jheng et al., "AHG9: On Syntax Signaling Order in SPS and PPS", Joint Video Experts Team (JVET) of ITU-T SG 16 WP 3 and ISO/IEC JTC 1/SC 29/WG 11, 19th Meeting by teleconference, Jun. 22-Jul. 1, 2020, 6 pages.

* cited by examiner

METHODS AND APPARATUS FOR HIGH-LEVEL SYNTAX IN VIDEO CODING

CROSS-REFERENCE TO RELATED APPLICATIONS

The present application is a continuation of International Application No. PCT/US2021/026881, entitled "METHODS AND APPARATUS FOR HIGH-LEVEL SYNTAX IN VIDEO CODING", filed on Apr. 12, 2021, which claims priority to U.S. Provisional Patent Application No. 63/008,648, entitled "HIGH-LEVEL SYNTAX FOR VIDEO CODING" filed Apr. 10, 2020, both of which are incorporated by reference in their entirety.

TECHNICAL FIELD

The present application generally relates to video data coding and compression, and in particular, to methods and systems of video coding high-level syntax in video bitstream applicable to one or more video coding standards.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to methods and systems of video coding high-level syntax in video bitstream applicable to one or more video coding standards.

According to a first aspect of the present application, a method of decoding video data includes: receiving, from a bitstream, multiple syntax elements at sequence parameter set (SPS) level, wherein the multiple syntax elements are associated with a predefined function and sequentially arranged in the bitstream; in accordance with a determination that at least one of the multiple syntax elements satisfies a predefined condition: receiving, from the bitstream, a second syntax element after the multiple syntax elements; in accordance with a determination that the at least one of the multiple syntax elements does not satisfy the predefined condition: setting a value of the second syntax element to a default value; and performing the predefined function for video data from the bitstream in accordance with at least one of the multiple syntax elements and the second syntax element, wherein the predefined function is one selected from the group consisting of intra prediction function, inter prediction function, and merge mode.

According to a second aspect of the present application, a method of decoding video data includes: receiving, from a bitstream, multiple syntax elements at one or more of picture parameter set (PPS) level and slice level, wherein the multiple syntax elements are associated with a predefined function and sequentially arranged in the bitstream; in accordance with a determination that at least one of the multiple syntax elements satisfies a predefined condition: receiving, from the bitstream, a second syntax element after the multiple syntax elements; in accordance with a determination that the at least one of the multiple syntax elements does not satisfy the predefined condition: setting a value of the second syntax element to a default value; and performing the predefined function for video data from the bitstream in accordance with at least one of the multiple syntax elements and the second syntax element, wherein the predefined function is one selected from the group consisting of quantization function, intra prediction function, and inter prediction function.

According to a third aspect of the present application, an electronic apparatus includes one or more processing units, memory and a plurality of programs stored in the memory. The programs, when executed by the one or more processing units, cause the electronic apparatus to perform the method of decoding video data as described above.

According to a fourth aspect of the present application, a non-transitory computer readable storage medium stores a plurality of programs for execution by an electronic apparatus having one or more processing units. The programs, when executed by the one or more processing units, cause the electronic apparatus to perform the method of decoding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
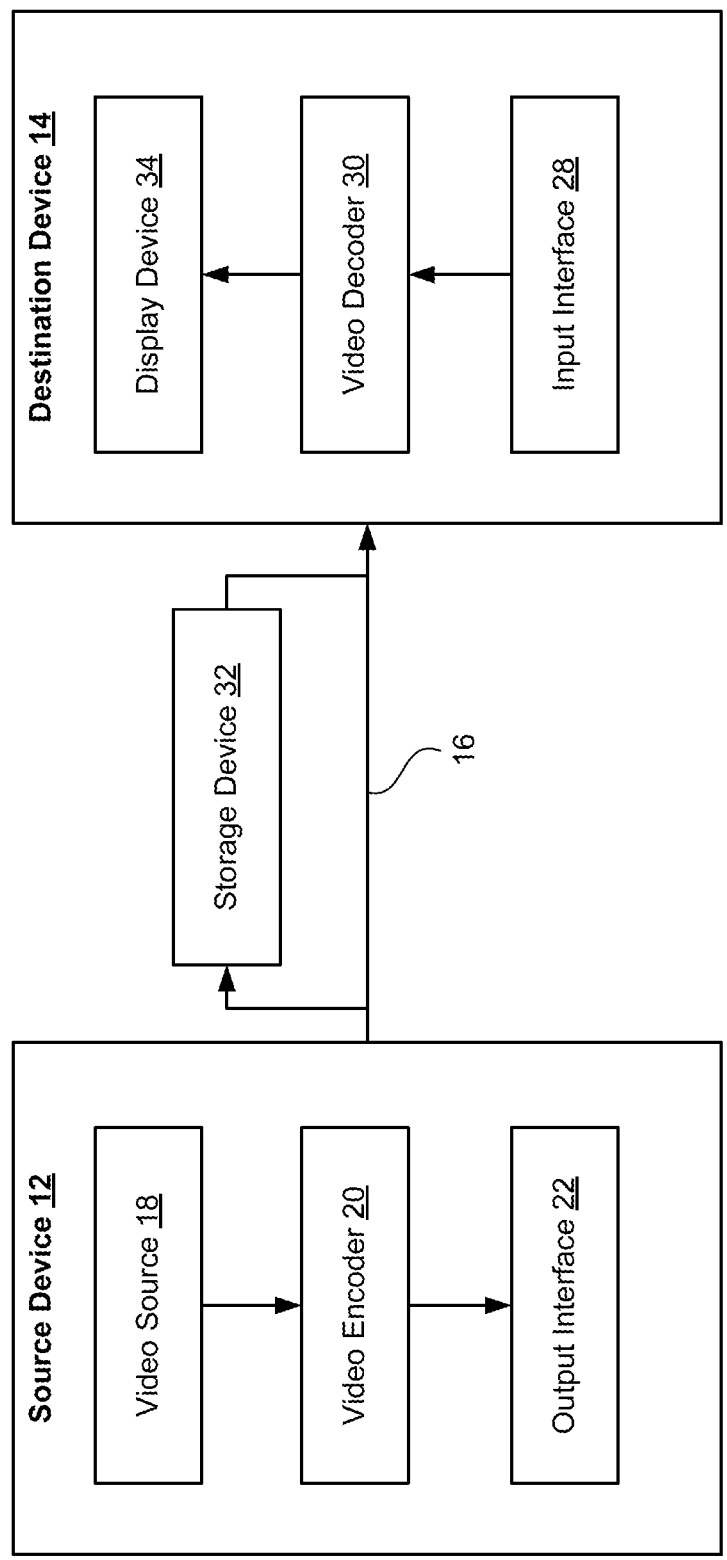
FIG. 1 is a block diagram illustrating an example video encoding and decoding system in accordance with some implementations of the present disclosure.

FIG. 1 is a block diagram illustrating an example system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Example file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
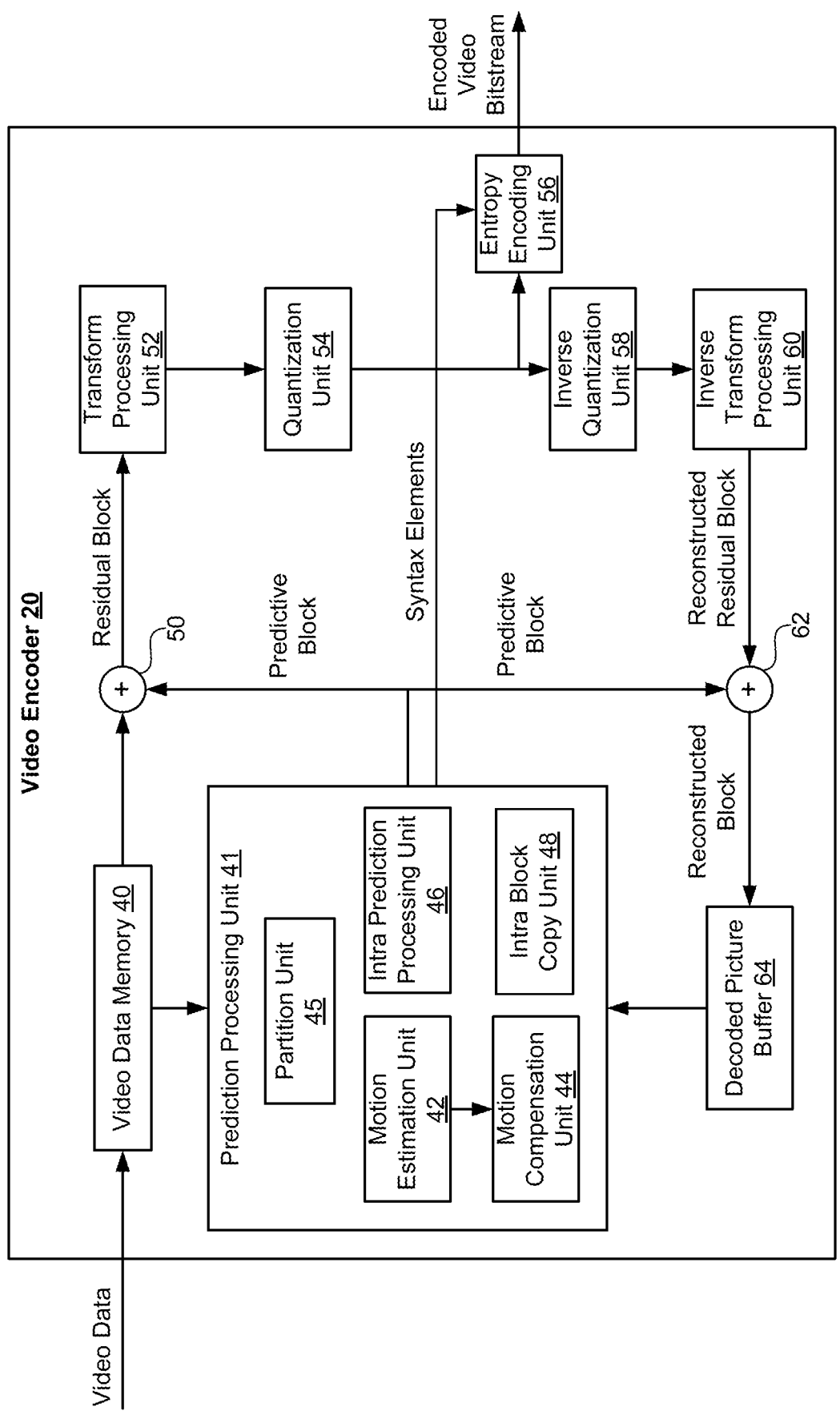
FIG. 2 is a block diagram illustrating an example video encoder in accordance with some implementations of the present disclosure.

FIG. 2 is a block diagram illustrating an example video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
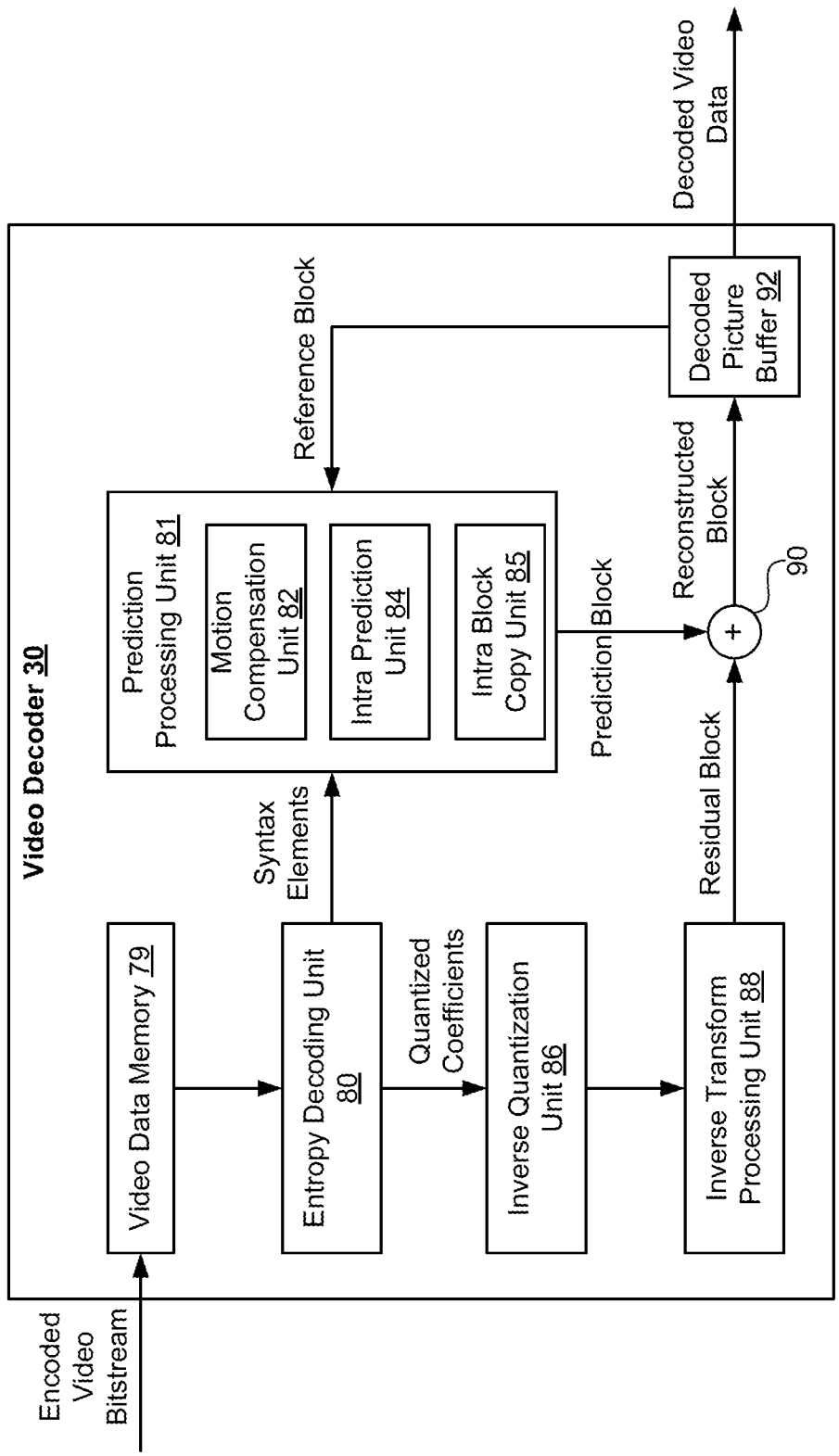
FIG. 3 is a block diagram illustrating an example video decoder in accordance with some implementations of the present disclosure.

FIG. 3 is a block diagram illustrating an example video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
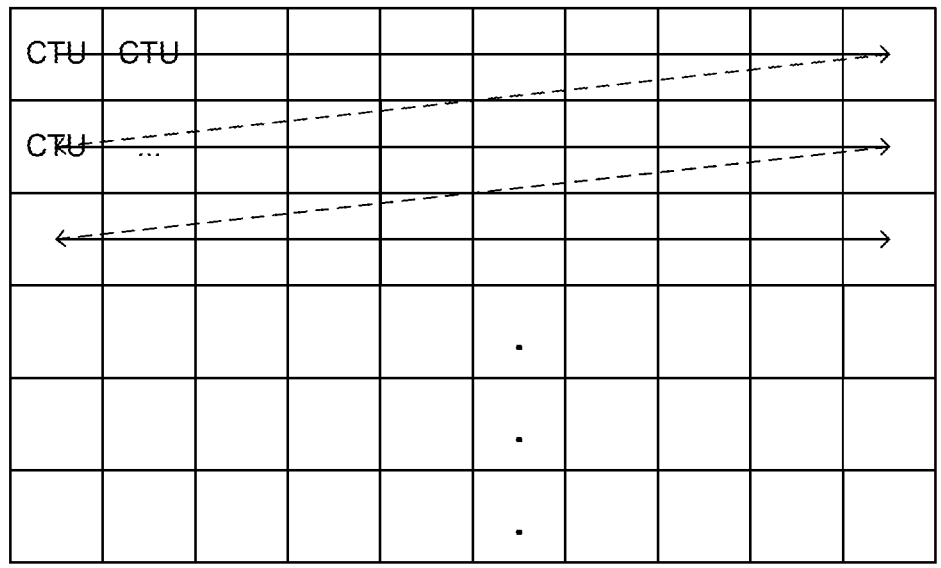
FIGS. 4A through 4E are block diagrams illustrating how a frame is recursively partitioned into multiple video blocks of different sizes and shapes in accordance with some implementations of the present disclosure.
Figure 4B:
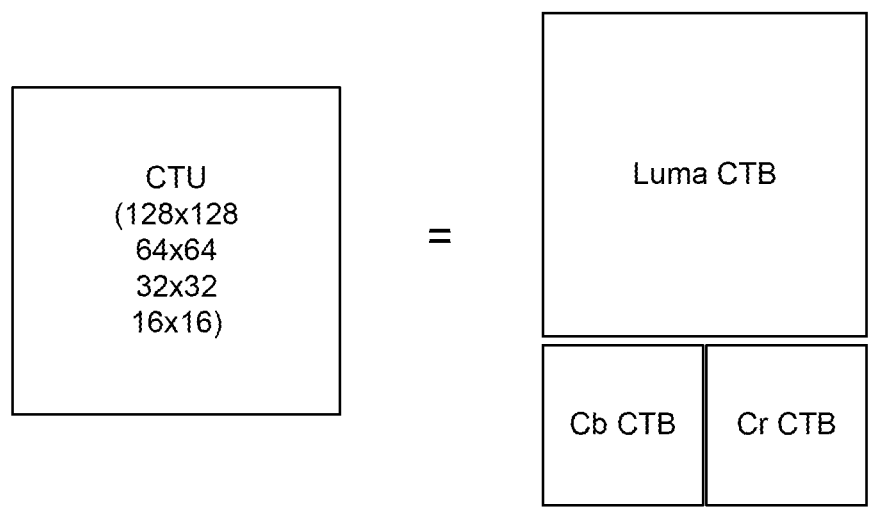

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
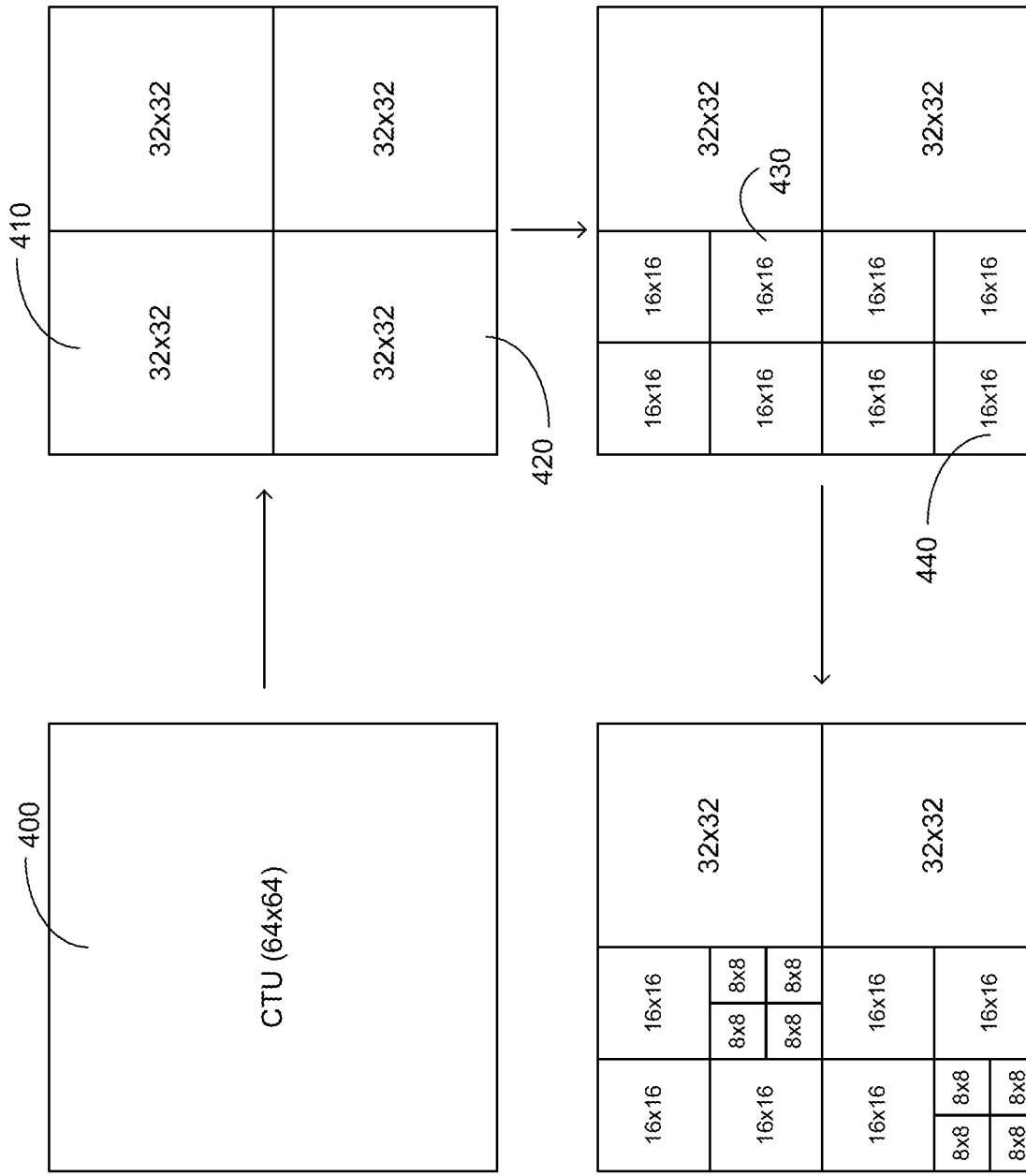
Figure 4D:
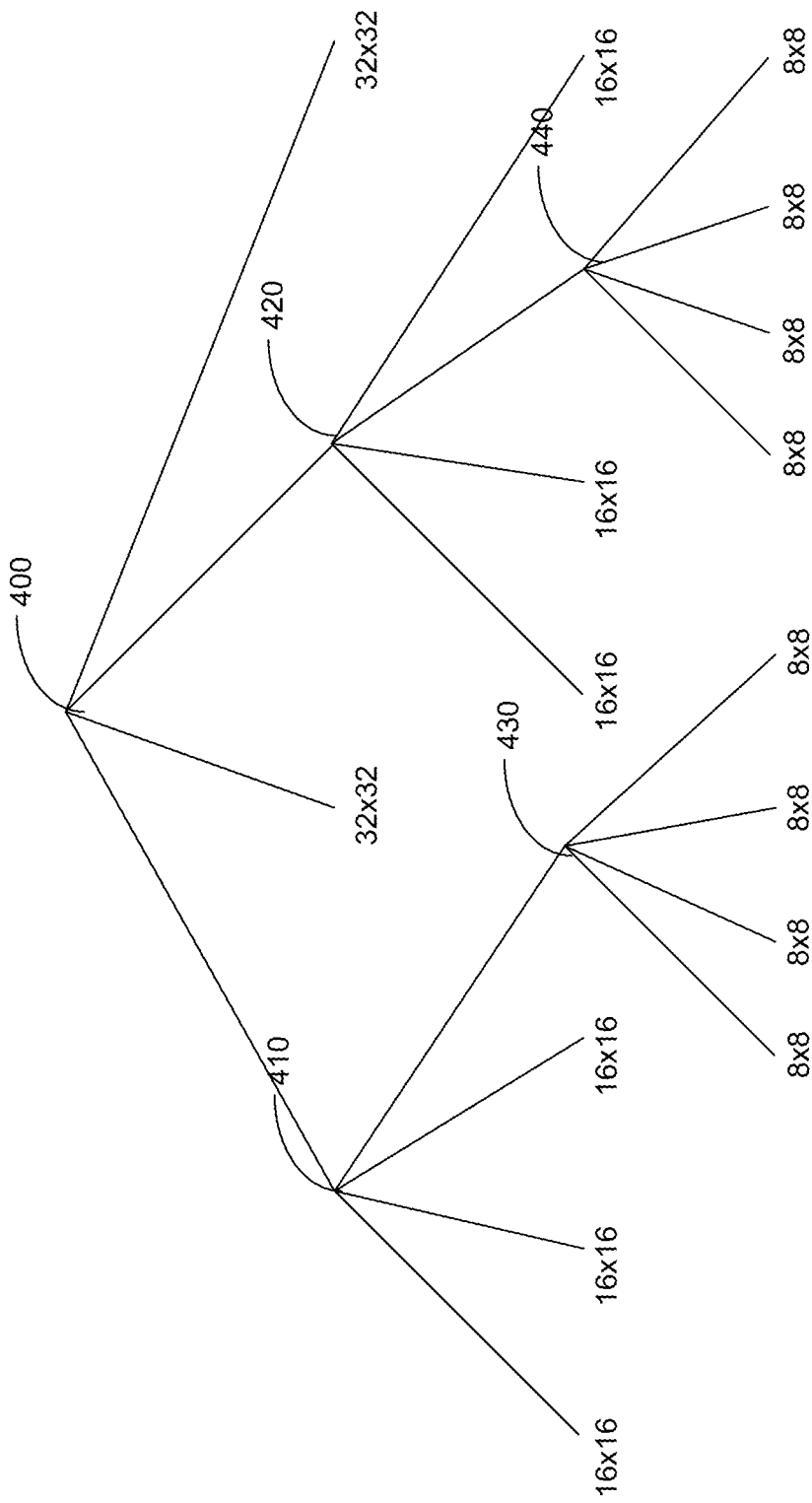
Figure 4E:
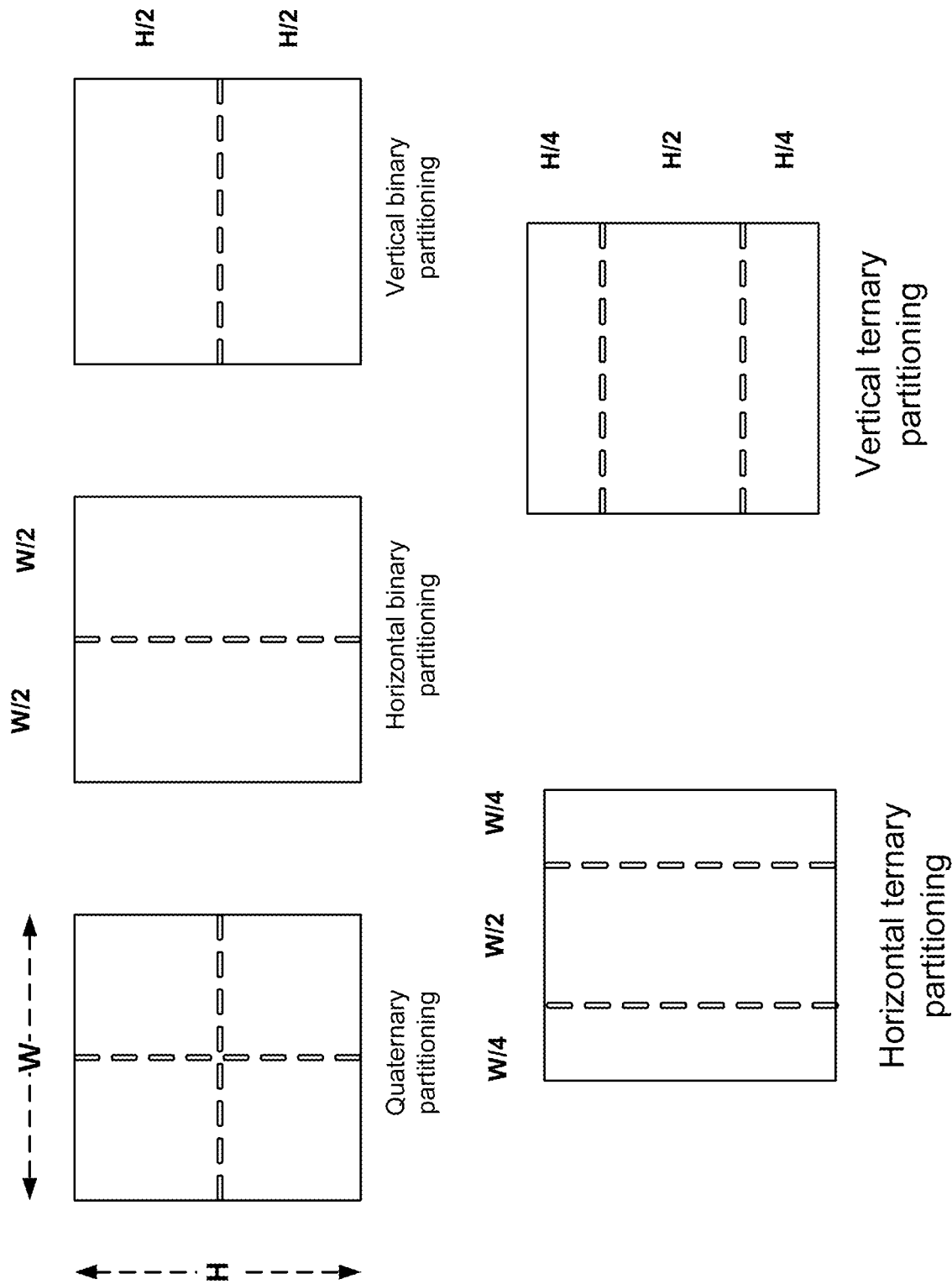

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

In general, the basic intra prediction scheme applied in the VVC is kept the same as that of the HEVC, except that several modules are further extended and/or improved, e.g., matrix weighted intra prediction (MIP) coding mode, intra sub-partition (ISP) coding mode, extended intra prediction with wide-angle intra directions, position-dependent intra prediction combination (PDPC) and 4-tap intra interpolation. The main focus of the disclosure is to improve the existing high-level syntax design in the VVC standard. The related background knowledge is elaborated in the following sections.

Like HEVC, VVC uses a Network Abstraction Layer (NAL) unit-based bitstream structure. A coded bitstream is partitioned into NAL units which, when conveyed over lossy packet networks, should be smaller than the maximum transfer unit size. Each NAL unit consists of a NAL unit header followed by the NAL unit payload. There are two conceptual classes of NAL units. Video coding layer (VCL) NAL units containing coded sample data, e.g., coded slice NAL units, whereas non-VCL NAL units that contain metadata typically belonging to more than one coded picture, or where the association with a single coded picture would be meaningless, such as parameter set NAL units, or where the information is not needed by the decoding process, such as SEI NAL units.

In VVC, a two-byte NAL unit header was introduced with the anticipation that this design is sufficient to support future extensions. The syntax and the associated semantic of the NAL unit header in the current VVC draft specification are illustrated in Table 1 and Table 2, respectively. How to read Table 1 is illustrated in the appendix section of this invention, which could also be found in the VVC specification.

TABLE 1

NAL unit header syntax

| | Descriptor |
|---|---|
| nal_unit_header( ) { | |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } | |

TABLE 2

NAL unit header semantics forbidden_zero_bit shall be equal to 0.
nuh_reserved_zero_bit shall be equal to 0. The value 1 of nuh_reserved_zero_bit may be specified in the future by ITU-T | ISO/IEC. Decoders shall ignore (i.e., remove from the bitstream and discard) NAL units with nuh_reserved_zero_bit equal to 1.
nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T | ISO/IEC.
The value of nuh_layer_id shall be the same for all VCL NAL units of a coded picture. The value of nuh_layer_id of a coded picture or a PU is the value of the nuh_layer_id of the VCL NAL units of the coded picture or the PU.
The value of nuh_layer_id for AUD, PH, EOS, and FD NAL units is constrained as follows:
- If nal_unit_type is equal to AUD_NUT, nuh_layer_id shall be equal to vps_layer_id[ 0 ]. [Ed. (YK): Check whether it's better to treat the nuh_layer_id of AUD in the same way as for DCI NAL unit, VPS, and EOB, i.e., not constrained.]
- Otherwise, when nal_unit_type is equal to PH_NUT, EOS_NUT, or FD_NUT, nuh_layer_id shall be equal to the nuh_layer_id of associated VCL NAL unit.
NOTE 1 - The value of nuh_layer_id of DCI, VPS, and EOB NAL units is not constrained. The value of nal_unit_type shall be the same for all pictures of a CVSS AU.
nal_unit_type specifies the NAL unit type, i.e., the type of RBSP data structure contained in the NAL unit as specified in Table 3.

TABLE 3

NAL unit type codes and NAL unit type classes

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture slice_layer_rbsp( ) | VCL |
| 8 | IDR_N_LP | | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DCI_NUT | Decoding capability information decoding_capability_information_rbsp( ) | non-VCL |
| 14 | VPS_NUT | Video parameter set video_parameter_set_rbsp( ) | non-VCL |

TABLE 3-continued

NAL unit type codes and NAL unit type classes

| nal_unit_type | Name of nal_unit_type | Content of NAL unit and RBSP syntax structure | NAL unit type class |
|---|---|---|---|
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 ... 31 | UNSPEC_28 ... UNSPEC_31 | Unspecified non-VCL NAL unit types | non-VCL |

VVC inherits the parameter set concept of HEVC with a few modifications and additions. Parameter sets can be either part of the video bitstream or can be received by a decoder through other means (including out-of-band transmission using a reliable channel, hard coding in encoder and decoder, and so on). A parameter set contains an identification, which is referenced, directly or indirectly, from the slice header, as discussed in more detail later. The referencing process is known as "activation." Depending on the parameter set type, the activation occurs per picture or per sequence. The concept of activation through referencing was introduced, among other reasons, because implicit activation by virtue of the position of the information in the bitstream (as common for other syntax elements of a video codec) is not available in case of out-of-band transmission.

The video parameter set (VPS) was introduced to convey information that is applicable to multiple layers as well as sub-layers. The VPS was introduced to address these shortcomings as well as to enable a clean and extensible high-level design of multilayer codecs. Each layer of a given video sequence, regardless of whether they have the same or different sequence parameter sets (SPS), refers to the same VPS. The syntax and the associated semantic of the video parameter set in the current VVC draft specification are illustrated in Table 4 and Table 5, respectively. How to read Table 4 is illustrated in the appendix section of this invention, which could also be found in the VVC specification.

TABLE 4

Video parameter set RBSP syntax

| | Descriptor |
|---|---|
| video_parameter_set_rbsp( ) { | |
|   vps_video_parameter_set_id | u(4) |
|   vps_max_layers_minus1 | u(6) |
|   vps_max_sublayers_minus1 | u(3) |
|   if( vps_max_layers_minus1 > 0 && | |
| vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   for( i = 0; i <= vps_max_layers_minus1; i++ ) { | |

TABLE 4-continued

Video parameter set RBSP syntax

| | Descriptor |
|---|---|
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) { | |
|         for( j = 0; j < i; j++ ) | |
|           vps_direct_ref_layer_flag[ i ][ j ] | u(1) |
|         max_tid_ref_present_flag[ i ] | u(1) |
|         if( max_tid_ref_present_flag[ i ] ) | |
|           max_tid_il_ref_pics_plus1[ i ] | u(3) |
|       } | |
|     } | |
|   } | |
| if( vps_max_layers_minus1 > 0 ) { | |
|   if( vps_all_independent_layers_flag ) | |
|     each_layer_is_an_ols_flag | u(1) |
|   if( !each_layer_is_an_ols_flag ) { | |
|     if( !vps_all_independent_layers_flag ) | |
|       ols_mode_idc | u(2) |
|     if( ols_mode_idc = = 2 ) { | |
|       num_output_layer_sets_minus1 | u(8) |
|       for( i = 1; i <= num_output_layer_sets_minus1; i ++) | |
|         for( j = 0; j <= vps_max_layers_minus1; j++ ) | |
|           ols_output_layer_flag[ i ][ j ] | u(1) |
|     } | |
|   } | |
| } | |
| vps_num_ptls_minus1 | u(8) |
| for( i = 0; i <= vps_num_ptls_minus1; i++ ) { | |
|   if( i > 0 ) | |
|     pt_present_flag[ i ] | u(1) |
|   if( vps_max_sublayers_minus1 > 0 && !vps_all_layers_same_num_sublayers_flag ) | |
|     ptl_max_temporal_id[ i ] | u(3) |
| } | |
| while( !byte_aligned( ) ) | |
|   vps_ptl_alignment_zero_bit /* equal to 0 */ | f(1) |
| for( i = 0; i <= vps_num_ptls_minus1; i++ ) | |
|   profile_tier_level( pt_present_flag[ i ], ptl_max_temporal_id[ i ] ) | |
| for( i = 0; i < TotalNumOlss; i++ ) | |
|   if( vps_num_ptls_minus1 > 0 ) | |

TABLE 4-continued

Video parameter set RBSP syntax

|  | Descriptor |
|---|---|
|     ols_ptl_idx[ i ] | u(8) |
|   if( !vps_all_independent_layers_flag ) |  |
|     vps_num_dpb_params | ue(v) |
|   if( vps_num_dpb_params > 0 && |  |
|     vps_max_sublayers_minus1 > 0 ) |  |
|     vps_sublayer_dpb_params_present_flag | u(1) |
|   for( i = 0; i < vps_num_dpb_params; i++ ) { |  |
|     if( vps_max_sublayers_minus1 > 0 && |  |
|     !vps_all_layers_same_num_sublayers_flag ) |  |
|       dpb_max_temporal_id[ i ] | u(3) |
|     dpb_parameters( dpb_max_temporal_id[ i ], |  |
|   vps_sublayer_dpb_params_present_flag ) |  |
|   } |  |
|   for( i = 0; i < TotalNumOlss; i++ ) { |  |
|     if( NumLayersInOls[ i ] > 1 ) { |  |
|       ols_dpb_pic_width[ i ] | ue(v) |
|       ols_dpb_pic_height[ i ] | ue(v) |
|       if( vps_num_dpb_params > 1 ) |  |
|         ols_dpb_params_idx[ i ] | ue(v) |
|     } |  |
|   } |  |
|   if( !each_layer_is_an_ols_flag ) |  |
|     vps_general_hrd_params_present_flag | u(1) |
|   if( vps_general_hrd_params_present_flag ) { |  |
|     general_hrd_parameters( ) |  |
|     if( vps_max_sublayers_minus1 > 0 ) |  |
|       vps_sublayer_cpb_params_present_flag | u(1) |
|     num_ols_hrd_params_minus1 | ue(v) |
|     for( i = 0; i <= num_ols_hrd_params_minus1; i++ ) { |  |
|       if( vps_max_sublayers_minus1 > 0 && |  |
|       !vps_all_layers_same_num_sublayers_flag ) |  |
|         hrd_max_tid[ i ] | u(3) |
|       firstSubLayer = |  |
|   vps_sublayer_cpb_params_present_flag ? 0 : |  |
|   hrd_max_tid[ i ] |  |
|       ols_hrd_parameters( firstSubLayer, |  |
|   hrd_max_tid[ i ] ) |  |
|     } |  |
|     if( num_ols_hrd_params_minus1 + 1 != |  |
|       TotalNumOlss && |  |
|       num_ols_hrd_params_minus1 > 0 ) |  |
|     for( i = 1; i < TotalNumOlss; i++ ) |  |
|       if( NumLayersInOls[ i ] > 1 ) |  |
|         ols_hrd_idx[ i ] | ue(v) |
|   } |  |
|   vps_extension_flag | u(1) |
|   if( vps_extension_flag ) |  |
|     while( more_rbsp_data( ) ) |  |
|       vps_extension_data_flag | u(1) |
|   rbsp_trailing_bits( ) |  |
| } |  |

TABLE 5

Video parameter set RBSP semantics

A VPS RBSP shall be available to the decoding process prior to it being referenced, included in at least one AU with TemporalId equal to 0 or provided through external means.
All VPS NAL units with a particular value of vps_video_parameter_set_id in a CVS shall have the same content.
vps_video_parameter_set_id provides an identifier for the VPS for reference by other syntax elements. The value of vps_video_parameter_set_id shall be greater than 0.
vps_max_layers_minus1 plus 1 specifies the maximum allowed number of layers in each CVS referring to the VPS.
vps_max_sublayers_minus1 plus 1 specifies the maximum number of temporal sublayers that may be present in a layer in each CVS referring to the VPS. The value of vps_max_sublayers_minus1 shall be in the range of 0 to 6, inclusive.
vps_all_layers_same_num_sublayers_flag equal to 1 specifies that the number of temporal sublayers is the same for all the layers in each CVS referring to the VPS. vps_all_layers_same_num sublayers_flag equal to 0 specifies that the layers in each CVS referring to the VPS may or may not have the same number of temporal sublayers. When not present, the value of vps_all_layers_same_num_sublayers_flag is inferred to be equal to 1.
vps_all_independent_layers_flag equal to 1 specifies that all layers in the CVS are independently coded without using inter-layer prediction, vps_all_independent_layers_flag equal to 0 specifies that one or more of the layers in the CVS may use inter-layer prediction. When not present, the value of vps_all_independent_layers_flag is inferred to be equal to 1.
vps_layer_id[ i ] specifies the nuh_layer_id value of the i-th layer. For any two non-negative integer values of m and n, when m is less than n, the value of vps_layer_id[ m ] shall be less than vps_layer_id[ n ].
vps_independent_layer_flag[ i ] equal to 1 specifies that the layer with index i does not use inter-layer prediction. vps_independent_layer_flag[ i ] equal to 0 specifies that the layer with index i may use inter-layer prediction and the syntax elements vps_direct_ref_layer_flag[ i ][ j ] for j in the range of 0 to i − 1, inclusive, are present in VPS. When not present, the value of vps_independent_layer_flag[ i ] is inferred to be equal to 1.
vps_direct_ref_layer_flag[ i ][ j ] equal to 0 specifies that the layer with index j is not a direct reference layer for the layer with index i. vps_direct_ref_layer_flag [ i ][ j ] equal to 1 specifies that the layer with index j is a direct reference layer for the layer with index i. When vps_direct_ref_layer_flag[ i ][ j ] is not present for i and j in the range of 0 to vps_max_layers_minus1, inclusive, it is inferred to be equal to 0. When vps_independent_layer_flag[ i ] is equal to 0, there shall be at least one value of j in the range of 0 to i − 1, inclusive, such that the value of vps_direct_ref_layer_flag[ i ][ j ] is equal to 1.

TABLE 5-continued

Video parameter set RBSP semantics

The variables NumDirectRefLayers[ i ], DirectRefLayerIdx[ i ][ d ], NumRefLayers[ i ],
RefLayerIdx[ i ][ r ], and LayerUsedAsRefLayerFlag[ j ] are derived as follows:
    for( i = 0; i <= vps_max_layers_minus1; i++ ) {
      for( j = 0; j <= vps_max_layers_minus1; j++ ) {
        dependencyFlag[ i ][ j ] = vps_direct_ref_layer_flag[ i ][ j ]
        for( k = 0; k < i; k++ )
          if( vps_direct_ref_layer_flag[ i ][ k ] && dependencyFlag[ k ][ j ] )
            dependencyFlag[ i ][ j ] = 1
      }
      LayerUsedAsRefLayerFlag[ i ] = 0
    }
    for( i = 0; i <= vps_max_layers_minus1; i++ ) {
      for( j = 0, d = 0, r = 0; j <= vps_max_layers_minus1; j++ ) {        (37)
        if( vps_direct_ref_layer_flag[ i ][ j ] ) {
          DirectRefLayerIdx[ i ][ d++ ] = j
          LayerUsedAsRefLayerFlag[ j ] = 1
        }
        if( dependencyFlag[ i ][ j ] )
          RefLayerIdx[ i ][ r++ ] = j
      }
      NumDirectRefLayers[ i ] = d
      NumRefLayers[ i ] = r
    }
The variable GeneralLayerIdx[ i ], specifying the layer index of the layer with
nuh_layer_id equal to vps_layer_id[ i ], is derived as follows:
    for( i = 0; i <= vps_max_layers_minus1; i++ )        (38)
      GeneralLayerIdx[ vps_layer_id[ i ] ] = i
For any two different values of i and j, both in the range of 0 to vps_max_layers_minus1,
inclusive, when dependencyFlag[ i ][ j ] equal to 1, it is a requirement of bitstream
conformance that the values of chroma_format_idc and bit_depth_minus8 that apply to the
i-th layer shall be equal to the values of chroma_format_idc and bit_depth_minus8,
respectively, that apply to the j-th layer.
max_tid_ref_present_flag[ i ] equal to 1 specifies that the syntax element
max_tid_il_ref_pics_plus1[ i ] is present. max_tid_ref_present_flag[ i ] equal to 0 specifies
that the syntax element max_tid_il_ref_pics_plus1[ i ] is not present.
max_tid_il_ref_pics_plus1[ i ] equal to 0 specifies that inter-layer prediction is not used
by non-IRAP pictures of the i-th layer. max_tid_il_ref_pics_plus1[ i ] greater than 0
specifies that, for decoding pictures of the i-th layer, no picture with TemporalId greater
than max_tid_il_ref_pics_plus1[ i ] − 1 is used as ILRP. When not present, the value of
max_tid_il_ref_pics_plus1[ i ] is inferred to be equal to 7.
each_layer_is_an_ols_flag equal to 1 specifies that each OLS contains only one layer and
each layer itself in a CVS referring to the VPS is an OLS with the single included layer
being the only output layer. each_layer_is_an_ols_flag equal to 0 that an OLS may contain
more than one layer. If vps_max_layers_minus1 is equal to 0, the value of
each_layer_is_an_ols_flag is inferred to be equal to 1. Otherwise, when
vps_all_independent_layers_flag is equal to 0, the value of each_layer_is_an_ols_flag is
inferred to be equal to 0.
ols_mode_idc equal to 0 specifies that the total number of OLSs specified by the VPS is
equal to vps_max_layers_minus1 + 1, the i-th OLS includes the layers with layer indices
from 0 to i, inclusive, and for each OLS only the highest layer in the OLS is output.
ols_mode_idc equal to 1 specifies that the total number of OLSs specified by the VPS is
equal to vps_max_layers_minus1 + 1, the i-th OLS includes the layers with layer indices
from 0 to i, inclusive, and for each OLS all layers in the OLS are output.
ols_mode_idc equal to 2 specifies that the total number of OLSs specified by the VPS is
explicitly signalled and for each OLS the output layers are explicitly signalled and other
layers are the layers that are direct or indirect reference layers of the output layers of the
OLS.
The value of ols_mode_idc shall be in the range of 0 to 2, inclusive. The value 3 of
ols_mode_idc is reserved for future use by ITU-T | ISO/IEC.
When vps_all_independent_layers_flag is equal to 1 and each_layer_is_an ols_flag is
equal to 0, the value of ols_mode_idc is inferred to be equal to 2.
num_output_layer_sets_minus1 plus 1 specifies the total number of OLSs specified by
the VPS when ols_mode_idc is equal to 2.
The variable TotalNumOlss, specifying the total number of OLSs specified by the VPS, is
derived as follows:
    if( vps_max_layers_minus1 = = 0 )
      TotalNumOlss = 1
    else if( each_layer_is_an_ols_flag || ols_mode_idc = = 0 ||
    ols_mode_idc = = 1 )
      TotalNumOlss = vps_max_layers_minus1 + 1        (39)
    else if( ols_mode_idc = = 2 )
      TotalNumOlss = num_output_layer_sets_minus1 + 1
ols_output_layer_flag[ i ][ j ] equal to 1 specifies that the layer with nuh_layer_id equal to
vps_layer_id[ j ] is an output layer of the i-th OLS when ols_mode_idc is equal to 2.
ols_output_layer_flag[ i ][ j ] equal to 0 specifies that the layer with nuh_layer_id equal to
vps_layer_id[ j ] is not an output layer of the i-th OLS when ols_mode_idc is equal to 2.

TABLE 5-continued

Video parameter set RBSP semantics

The variable NumOutputLayersInOls[ i ], specifying the number of output layers in the i-th
OLS, the variable NumSubLayersInLayerInOLS[ i ][ j ], specifying the number of
sublayers in the j-th layer in the i-th OLS, the variable OutputLayerIdInOls[ i ][ j ],
specifying the nuh_layer_id value of the j-th output layer in the i-th OLS, and the variable
LayerUsedAsOutputLayerFlag[ k ], specifying whether the k-th layer is used as an output
layer in at least one OLS, are derived as follows:
```
    NumOutputLayersInOls[ 0 ] = 1
    OutputLayerIdInOls[ 0 ][ 0 ] = vps_layer_id[ 0 ]
    NumSubLayersInLayerInOLS[ 0 ][ 0 ] = vps_max_sub_layers_minus1 + 1
    LayerUsedAsOutputLayerFlag[ 0 ] = 1
    for( i = 1, i <= vps_max_layers_minus1; i++ ) {
      if( each_layer_is_an_ols_flag || ols_mode_idc < 2 )
        LayerUsedAsOutputLayerFlag[ i ] = 1
      else /*( !each_layer_is_an_ols_flag && ols_mode_idc == 2 ) */
        LayerUsedAsOutputLayerFlag[ i ] = 0
    }
    for( i = 1; i < TotalNumOlss; i++ )
      if( each_layer_is_an_ols_flag || ols_mode_idc == 0 ) {
        NumOutputLayersInOls[ i ] = 1
        OutputLayerIdInOls[ i ][ 0 ] = vps_layer_id[ i ]
        for( j = 0; j <i && ( ols_mode_idc == 0 ); j++ )
          NumSubLayersInLayerInOLS[ i ][ j ] = max_tid_il_ref_pics_plus1[ i ]
        NumSubLayersInLayerInOLS[ i ][ i ] = vps_max_sub_layers_minus1 + 1
      } else if( ols_mode_idc == 1 ) {
        NumOutputLayersInOls[ i ] = i + 1
        for( j = 0; j < NumOutputLayersInOls[ i ]; j++ ) {
          OutputLayerIdInOls[ i ][ j ] = vps_layer_id[ j ]
          NumSubLayersInLayerInOLS[ i ][ j ] =
vps_max_sub_layers_minus1 + 1
        }
      } else if( ols_mode_idc == 2 ) {                                       (40)
        for( j = 0; j <= vps_max_layers_minus1; j++ ) {
          layerIncludedInOlsFlag[ i ][ j ] = 0
          NumSubLayersInLayerInOLS[ i ][ j ] = 0
        }
        for( k = 0, j = 0; k <= vps_max_layers_minus1; k++ )
          if( ols_output_layer_flag[ i ][ k ] ) {
            layerIncludedInOlsFlag[ i ][ k ] = 1
            LayerUsedAsOutputLayerFlag[ k ] = 1
            OutputLayerIdx[ i ][ j ] = k
            OutputLayerIdInOls[ i ][ j++ ] = vps_layer_id[ k ]
            NumSubLayersInLayerInOLS[ i ][ j ] =
vps_max_sub_layers_minus1 + 1
          }
        NumOutputLayersInOls[ i ] = j
        for( j = 0; j < NumOutputLayersInOls[ i ]; j++ ) {
          idx = OutputLayerIdx[ i ][ j ]
          for( k = 0; k < NumRefLayers[ idx ]; k++ ) {
            layerIncludedInOlsFlag[ i ][ RefLayerIdx[ idx ][ k ] ] = 1
            if( NumSubLayersInLayerInOLS[ i ][ RefLayerIdx[ Idx ][ k ] ] <
                max_tid_il_ref_pics_plus1[ OutputLayerIdInOls[ i ][ j ] ] )
              NumSubLayersInLayerInOLS[ i ][ RefLayerIdx[ idx ][ k ] ] =
                max_tid_il_ref_pics_plus1[ OutputLayerIdInOls[ i ][ j ] ]
          }
        }
      }
    }
```
For each value of i in the range of 0 to vps_max_layers_minus1, inclusive, the values of
LayerUsedAsRefLayerFlag[ i ] and LayerUsedAsOutputLayerFlag[ i ] shall not be both
equal to 0. In other words, there shall be no layer that is neither an output layer of at least
one OLS nor a direct reference layer of any other layer.
For each OLS, there shall be at least one layer that is an output layer. In other words, for
any value of i in the range of 0 to TotalNumOlss − 1, inclusive, the value of
NumOutputLayersInOls[ i ] shall be greater than or equal to 1.
The variable NumLayersInOls[ i ], specifying the number of layers in the i-th OLS, and the
variable LayerIdInOls[ i ][ j ], specifying the nuh_layer_id value of the j-th layer in the i-th
OLS, are derived as follows:
```
    NumLayersInOls[ 0 ] = 1
    LayerIdInOls[ 0 ][ 0 ] = vps_layer_id[ 0 ]
    for( i = 1; i < TotalNumOlss; i++ ) {
      if( each_layer_is_an_ols_flag ) {
        NumLayersInOls[ i ] = 1
        LayerIdInOls[ i ][ 0 ] = vps_layer_id[ i ]                           (41)
      } else if( ols_mode_idc == 0 || ols_mode_idc == 1 ) {
        NumLayersInOls[ i ] = i + 1
        for( j = 0; j < NumLayersInOls[ i ]; j++ )
          LayerIdInOls[ i ][ j ] = vps_layer_id[ j ]
      } else if( ols_mode_idc == 2 ) {
        for( k = 0, j = 0; k <= vps_max_layers_minus1; k++ )
```

TABLE 5-continued

Video parameter set RBSP semantics

```
                if( layerIncludedInOlsFlag[ i ][ k ] )
                    LayerIdInOls[ i ][ j++ ] = vps_layer_id[ k ]
            NumLayersInOls[ i ] = j
        }
    }
```
NOTE 1 - The 0-th OLS contains only the lowest layer (i.e., the layer with nuh_layer_id equal to vps_layer_id[ 0 ]) and for the 0-th OLS the only included layer is output.
The variable OlsLayerIdx[ i ][ j ], specifying the OLS layer index of the layer with nuh_layer_id equal to LayerIdInOls[ i ][ j ], is derived as follows:
```
        for( i = 0; i < TotalNumOlss; i++ )
            for j = 0; j < NumLayersInOls[ i ]; j++ )                                    (42)
                OlsLayerIdx[ i ][ LayerIdInOls[ i ][ j ] ] = j
```
The lowest layer in each OLS shall be an independent layer. In other words, for each i in the range of 0 to TotalNumOlss − 1, inclusive, the value of vps_independent_layer_flag[ GeneralLayerIdx[ LayerIdInOls[ i ][ 0 ] ] ] shall be equal to 1.
Each layer shall be included in at least one OLS specified by the VPS. In other words, for each layer with a particular value of nuh_layer_id nuhLayerId equal to one of vps_layer_id[ k ] for k in the range of 0 to vps_max_layers_minus1, inclusive, there shall be at least one pair of values of i and j, where i is in the range of 0 to TotalNumOlss − 1, inclusive, and j is in the range of NumLayersInOls[ i ] − 1, inclusive, such that the value of LayerIdInOls[ i ][ j ] is equal to nuhLayerId.
vps_num_ptls_minus1 plus 1 specifies the number of profile_tier_level( ) syntax structures in the VPS. The value of vps_num_ptls_minus1 shall be less than TotalNumOlss.
pt_present_flag[ i ] equal to 1 specifies that profile, tier, and general constraints information are present in the i-th profile_tier_level( ) syntax structure in the VPS. pt_present_flag[ i ] equal to 0 specifies that profile, tier, and general constraints information are not present in the i-th profile_tier_level( ) syntax structure in the VPS. The value of pt_present_flag[ 0 ] is inferred to be equal to 1. When pt_present_flag[ i ] is equal to 0, the profile, tier, and general constraints information for the i-th profile_tier_level( ) syntax structure in the VPS are inferred to be the same as that for the ( i − 1 )-th profile tier level( ) syntax structure in the VPS.
ptl_max_temporal_id[ i ] specifies the TemporalId of the highest sublayer representation for which the level information is present in the i-th profile_tier_level( ) syntax structure in the VPS. The value of ptl_max_temporal_id[ i ] shall be in the range of 0 to vps_max_sublayers_minus1, inclusive. When vps_max_sublayers_minus1 is equal to 0, the value of ptl_max_temporal_id[ i ] is inferred to be equal to 0. When vps_max_sublayers_minus1 is greater than 0 and vps_all_layers_same_num_sublayers_flag is equal to 1, the value of ptl_max_temporal_id[ i ] is inferred to be equal to vps_max_sublayers_minus1.
vps_ptl_alignment_zero_bit shall be equal to 0.
ols_ptl_idx[ i ] specifies the index, to the list of profile_tier_level( ) syntax structures in the VPS, of the profile_tier_level( ) syntax structure that applies to the i-th OLS. When present, the value of ols_ptl_idx[ i ] shall be in the range of 0 to vps_num_ptls_minus1, inclusive. When vps_num_ptls_minus1 is equal to 0, the value of ols_ptl_idx[ i ] is inferred to be equal to 0.
When NumLayersInOls[ i ] is equal to 1, the profile_tier_level( ) syntax structure that applies to the i-th OLS is also present in the SPS referred to by the layer in the i-th OLS. It is a requirement of bitstream conformance that, when NumLayersInOls[ i ] is equal to 1, the profile_tier_level( ) syntax structures signalled in the VPS and in the SPS for the i-th OLS shall be identical.
vps_num_dpb_params specifies the number of dpb_parameters( ) syntax strutcures in the VPS. The value of vps_num_dpb_params shall be in the range of 0 to 16, inclusive. When not present, the value of vps_num_dpb_params is inferred to be equal to 0.
vps_sublayer_dpb_params_present_flag is used to control the presence of max_dec_pic_buffering_minus1[ ], max_num_reorder_pics[ ], and max_latency_increase_plus1[ ] syntax elements in the dpb_parameters( ) syntax strucures in the VPS. When not present, vps_sub_dpb_params_info_present_flag is inferred to be equal to 0.
dpb_max_temporal_id[ i ] specifies the TemporalId of the highest sublayer representation for which the DPB parameters may be present in the i-th dpb_parameters( ) syntax strutcure in the VPS. The value of dpb_max_temporal_id[ i ] shall be in the range of 0 to vps_max_sublayers_minus1, inclusive. When vps_max_sublayers_minus1 is equal to 0, the value of dpb_max_temporal_id[ i ] is inferred to be equal to 0. When vps_max_sublayers_minus1 is greater than 0 and vps_all_layers_same_num_sublayers_flag is equal to 1, the value of dpb_max_temporal_id[ i ] is inferred to be equal to vps_max_sublayers_minus1.

TABLE 5-continued

Video parameter set RBSP semantics ols_dpb_pic_width[ i ] specifies the width, in units of luma samples, of each picture storage buffer for the i-th OLS.
ols_dpb_pic_height[ i ] specifies the height, in units of luma samples, of each picture storage buffer for the i-th OLS.
ols_dpb_params_idx[ i ] specifies the index, to the list of dpb_parameters( ) syntax structures in the VPS, of the dpb_parameters( ) syntax structure that applies to the i-th OLS when NumLayersInOls[ i ] is greater than 1. When present, the value of ols_dpb_params_idx[ i ] shall be in the range of 0 to vps_num_dpb_params − 1, inclusive. When ols_dpb_params_idx[ i ] is not present, the value of ols_dpb_params_idx[ i ] is inferred to be equal to 0.
When NumLayersInOls[ i ] is equal to 1, the dpb_parameters( ) syntax structure that applies to the i-th OLS is present in the SPS referred to by the layer in the i-th OLS.
vps_general_hrd_params_present_flag equal to 1 specifies that the syntax structure general_hrd_parameters( ) and other HRD parameters are present in the VPS RBSP syntax structure. vps_general_hrd_params_present_flag equal to 0 specifies that the syntax structure general_hrd_parameters( ) and other HRD parameters are not present in the VPS RBSP syntax structure. When not present, the value of vps_general_hrd_params_present_flag is inferred to be equal to 0.
When NumLayersInOls[ i ] is equal to 1, the general_hrd_parameters( ) syntax structure that applies to the i-th OLS is present in the SPS referred to by the layer in the i-th OLS.
vps_sublayer_cpb_params_present_flag equal to 1 specifies that the i-th ols_hrd_parameters( ) syntax structure in the VPS contains HRD parameters for the sublayer representations with TemporalId in the range of 0 to hrd_max_tid[ i ], inclusive.
vps_sublayer_cpb_params_present_flag equal to 0 specifies that the i-th ols_hrd_parameters( ) syntax structure in the VPS contains HRD parameters for the sublayer representation with TemporalId equal to hrd_max_tid[ i ] only. When vps_max_sublayers_minus1 is equal to 0, the value of vps_sublayer_cpb_params_present_flag is inferred to be equal to 0.
When vps_sublayer_cpb_params_present_flag is equal to 0, the HRD parameters for the sublayer representations with TemporalId in the range of 0 to hrd_max_tid[ i ] − 1, inclusive, are inferred to be the same as that for the sublayer representation with TemporalId equal to hrd_max_tid[ i ]. These include the HRD parameters starting from the fixed_pic_rate_general_flag[ i ] syntax element till the sublayer_hrd_parameters( i ) syntax structure immediately under the condition "if( general_vcl_hrd_params_present flag )" in the ols_hrd_parameters syntax structure.
num_ols_hrd_params_minus1 plus 1 specifies the number of ols_hrd_parameters( ) syntax structures present in the general_hrd_parameters( ) syntax structure when vps_general_hrd_params_present_flag is equal to 1. The value of num_ols_hrd_params_minus1 shall be in the range of 0 to TotalNumOlss − 1, inclusive.
hrd_max_tid[ i ] specifies the TemporalId of the highest sublayer representation for which the HRD parameters are contained in the i-th ols_hrd_parameters( ) syntax structure. The value of hrd_max_tid[ i ] shall be in the range of 0 to vps_max_sub_layers_minus1, inclusive. When vps_max_sublayers_minus1 is equal to 0, the value of hrd_max_tid[ i ] is inferred to be equal to 0. When vps_max_sub_layers_minus1 is greater than 0 and vps_all_layers_same_num_sublayers_flag is equal to 1, the value of hrd_max_tid[ i ] is inferred to be equal to vps_max_sublayers_minus1.
ols_hrd_idx[ i ] specifies the index, to the list of ols_hrd_parameters( ) syntax structures in the VPS, of the ols_hrd_parameters( ) syntax structure that applies to the i-th OLS when NumLayersInOls[ i ] is greater than 1. The value of ols_hrd_idx[[ i ] shall be in the range of 0 to num_ols_hrd_params_minus1, inclusive.
When NumLayersInOls[ i ] is equal to 1, the ols_hrd_parameters( ) syntax structure that applies to the i-th OLS is present in the SPS referred to by the layer in the i-th OLS.
If the value of num_ols_hrd_param_minus1 + 1 is equal to TotalNumOlss, the value of ols_hrd_idx[ i ] is inferred to be equal to i. Otherwise, when NumLayersInOls[ i ] is greater than 1 and num_ols_hrd_params_minus1 is equal to 0, the value of ols_hrd_idx[[ i ] is inferred to be equal to 0.
vps_extension_flag equal to 0 specifies that no vps_extension_data_flag syntax elements are present in the VPS RBSP syntax structure. vps_extension_flag equal to 1 specifies that there are vps_extension_data_flag syntax elements present in the VPS RBSP syntax structure.
vps_extension_data_flag may have any value. Its presence and value do not affect decoder conformance to profiles specified in this version of this Specification. Decoders conforming to this version of this Specification shall ignore all vps_extension_data_flag syntax elements.

In VVC, SPSs contain information which applies to all slices of a coded video sequence. A coded video sequence starts from an instantaneous decoding refresh (IDR) picture, or a BLA picture, or a CRA picture that is the first picture in the bitstream and includes all subsequent pictures that are not an IDR or BLA picture. A bitstream consists of one or more coded video sequences. The content of the SPS can be roughly subdivided into six categories: 1) a self-reference (its own ID); 2) decoder operation point related information (profile, level, picture size, number sub-layers, and so on); 3) enabling flags for certain tools within a profile, and associated coding tool parameters in case the tool is enabled; 4) information restricting the flexibility of structures and transform coefficient coding; 5) temporal scalability control; and 6) visual usability information (VUI), which includes HRD information. The syntax and the associated semantic of the sequence parameter set in the current VVC draft specification are illustrated in Table 6 and Table 7, respectively. How to read Table 6 is illustrated in the appendix section of this invention, which could also be found in the VVC specification.

TABLE 6

| Sequence parameter set RBSP syntax | |
|---|---|
| | Descriptor |
| seq_parameter_set_rbsp( ) { | |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   chroma_format_idc | u(2) |
|   if( chroma_format_idc = = 3 ) | |
|     separate_colour_plane_flag | u(1) |
|   res_change_in_clvs_allowed_flag | u(1) |
|   pic_width_max_in_luma_samples | ue(v) |
|   pic_height_max_in_luma_samples | ue(v) |
|   sps_conformance_window_flag | u(1) |
|   if( sps_conformance_window_flag ) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   sps_log2_ctu_size_minus5 | u(2) |
|   subpic_info_present_flag | u(1) |
|   if( subpic_info_present_flag ) { | |
|     sps_num_subpics_minus1 | ue(v) |
|     sps_independent_subpics_flag | u(1) |
|     for( i = 0; sps_num_subpics_minus1 > 0 && i <= sps_num_subpics_minus1; i++ ) { | |
|       if( i > 0 && pic_width_max_in_luma_samples > CtbSizeY ) | |
|         subpic_ctu_top_left_x[ i ] | u(v) |
|       if( i > 0 && pic_height_max_in_luma_samples > CtbSizeY ) { | |
|         subpic_ctu_top_left_y[ i ] | u(v) |
|       if( i < sps_num_subpics_minus1 && | |
|         pic_width_max_in_luma_samples > CtbSizeY ) | |
|         subpic_width_minus1[ i ] | u(v) |
|       if( i < sps_num_subpics_minus1 && | |
|         pic_height_max_in_luma_samples > CtbSizeY ) | |
|         subpic_height_minus1[ i ] | u(v) |
|       if( !sps_independent_subpics_flag) { | |
|         subpic_treated_as_pic_flag[ i ] | u(1) |
|         loop_filter_across_subpic_enabled_flag[ i ] | u(1) |
|       } | |
|     } | |
|     sps_subpic_id_len_minus1 | ue(v) |
|     subpic_id_mapping_explicitly_signalled_flag | u(1) |
|     if( subpic_id_mapping_explicitly_signalled_flag ) { | |
|       subpic_id_mapping_in_sps_flag | u(1) |
|       if( subpic_id_mapping_in_sps_flag ) | |
|         for( i = 0; i <= sps_num_subpics_minus1; i++ ) | |
|           sps_subpic_id[ i ] | u(v) |
|     } | |
|   } | |
|   bit_depth_minus8 | ue(v) |
|   sps_entropy_coding_sync_enabled_flag | u(1) |
|   if( sps_entropy_coding_sync_enabled_flag ) | |
|     sps_wpp_entry_point_offsets_present_flag | u(1) |
|   sps_weighted_pred_flag | u(1) |
|   sps_weighted_bipred_flag | u(1) |
|   log2_max_pic_order_cnt_lsb_minus4 | u(4) |
|   sps_poc_msb_flag | u(1) |
|   if( sps_poc_msb_flag ) | |
|     poc_msb_len_minus1 | ue(v) |
|   num_extra_ph_bits_bytes | u(2) |
|     extra_ph_bits_struct( num_extra_ph_bits_bytes ) | |
|   num_extra_sh_bits_bytes | u(2) |
|     extra_sh_bits_struct( num_extra_sh_bits_bytes ) | |
|   if( sps_max_sublayers_minus1 > 0 ) | |
|     sps_sublayer_dpb_params_flag | u(1) |
|   if( sps_ptl_dpb_hrd_params_present_flag ) | |
|     dpb_parameters( sps_max_sublayers_minus1, sps_sublayer_dpb_params_flag ) | |
|   long_term_ref_pics_flag | u(1) |
|   inter_layer_ref_pics_present_flag | u(1) |
|   sps_idr_rpl_present_flag | u(1) |

TABLE 6-continued

Sequence parameter set RBSP syntax

| | Descriptor |
|---|---|
| rpl1_same_as_rpl0_flag | u(1) |
| for( i = 0; i < !rpl1_same_as_rpl0_flag ? 1 : 2; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| if( ChromaArrayType != 0 ) { | |
|   sps_joint_cbcr_enabled_flag | u(1) |
|   same_qp_table_for_chroma | u(1) |
|   numQpTables = same_qp_table_for_chroma ? 1 : ( sps_joint_cbcr_enabled_flag ? 3 : 2 ) | |
|   for( i = 0; i < numQpTables; i++ ) { | |
|     qp_table_start_minus26[ i ] | se(v) |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_diff_val[ i ][ j ] | ue(v) |
|     } | |
|   } | |
| } | |
| sps_sao_enabled_flag | u(1) |
| sps_alf_enabled_flag | u(1) |
| if( sps_alf_enabled_flag && ChromaArrayType != 0 ) | |
|   sps_ccalf_enabled_flag | u(1) |
| sps_transform_skip_enabled_flag | u(1) |
| if( sps_transform_skip_enabled_flag ) { | |
|   log2_transform_skip_max_size_minus2 | ue(v) |
|   sps_bdpcm_enabled_flag | u(1) |
| } | |
| sps_ref_wraparound_enabled_flag | u(1) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| if( sps_bdof_enabled_flag ) | |
|   sps_bdof_pic_present_flag | u(1) |
| sps_smvd_enabled_flag | u(1) |
| sps_dmvr_enabled_flag | u(1) |
| if( sps_dmvr_enabled_flag) | |
|   sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
| if( chroma_format_idc == 1 ) { | |
|   sps_chroma_horizontal_collocated_flag | u(1) |
|   sps_chroma_vertical_collocated_flag | u(1) |
| } | |

TABLE 6-continued

Sequence parameter set RBSP syntax

| | Descriptor |
|---|---|
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| six_minus_max_num_merge_cand | ue(v) |
| sps_sbt_enabled_flag | u(1) |
| sps_affine_enabled_flag | u(1) |
| if( sps_affine_enabled_flag ) { | |
|   five_minus_max_num_subblock_merge_cand | ue(v) |
|   sps_affine_type_flag | u(1) |
|   if( sps_amvr_enabled_flag ) | |
|     sps_affine_amvr_enabled_flag | u(1) |
|   sps_affine_prof_enabled_flag | u(1) |
|   if( sps_affine_prof_enabled_flag ) | |
|     sps_prof_pic_present_flag | u(1) |
| } | |
| sps_palette_enabled_flag | u(1) |
| if( ChromaArrayType = = 3 && !sps_max_luma_transform_size_64_flag ) | |
|   sps_act_enabled_flag | u(1) |
| if( sps_transform_skip_enabled_flag \|\| sps_palette_enabled_flag ) | |
|   min_qp_prime_ts_minus4 | ue(v) |
| sps_bcw_enabled_flag | u(1) |
| sps_ibc_enabled_flag | u(1) |
| if( sps_ibc_enabled_flag ) | |
|   six_minus_max_num_ibc_merge_cand | ue(v) |
| sps_ciip_enabled_flag | u(1) |
| if( sps_mmvd_enabled_flag ) | |
|   sps_fpel_mmvd_enabled_flag | u(1) |
| if( MaxNumMergeCand >= 2 ) { | |
|   sps_gpm_enabled_flag | u(1) |
|   if( sps_gpm_enabled_flag && MaxNumMergeCand >= 3 ) | |
|     max_num_merge_cand_minus_max_num_gpm_cand | ue(v) |
| } | |
| sps_lmcs_enabled_flag | u(1) |
| sps_lfnst_enabled_flag | u(1) |
| sps_ladf_enabled_flag | u(1) |
| if( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| log2_parallel_merge_level_minus2 | ue(v) |
| sps_scaling_list_enabled_flag | u(1) |
| sps_dep_quant_enabled_flag | u(1) |
| if( !sps_dep_quant_enabled_flag ) | |
|   sps_sign_data_hiding_enabled_flag | u(1) |
| sps_virtual_boundaries_enabled_flag | u(1) |
| if( sps_virtual_boundaries_enabled_flag ) { | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(13) |
|   } | |
| } | |
| if( sps_ptl_dpb_hrd_params_present_flag ) { | |
|   sps_general_hrd_params_present_flag | u(1) |
|   if( sps_general_hrd_params_present_flag ) { | |
|     general_hrd_parameters( ) | |
|     if( sps_max_sublayers_minus1 > 0 ) | |
|       sps_sublayer_cpb_params_present_flag | u(1) |
|     firstSubLayer = sps_sublayer_cpb_params_present_flag ? 0 : sps_max_sublayers_minus1 | |
|     ols_hrd_parameters( firstSubLayer, sps_max_sublayers_minus1 ) | |
|   } | |
| } | |

TABLE 6-continued

Sequence parameter set RBSP syntax

| | Descriptor |
|---|---|
| field_seq_flag | u(1) |
| vui_parameters_present_flag | u(1) |
| if( vui_parameters_present_flag ) | |
|    vui_parameters( ) /* Specified in ITU-T H.SEI \| ISO/IEC 23002-7 */ | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

TABLE 7

Sequence parameter set RBSP semantics

An SPS RBSP shall be available to the decoding process prior to it being referenced, included in at least one AU with TemporalId equal to 0 or provided through external means.
All SPS NAL units with a particular value of sps_seq_parameter_set_id in a CVS shall have the same content.
sps_seq_parameter_set_id provides an identifier for the SPS for reference by other syntax elements.
SPS NAL units, regardless of the nuh_layer_id values, share the same value space of sps_seq_parameter_set_id.
Let spsLayerId be the value of the nuh_layer_id of a particular SPS NAL unit, and vclLayerId be the value of the nuh_layer_id of a particular VCL NAL unit. The particular VCL NAL unit shall not refer to the particular SPS NAL unit unless spsLayerId is less than or equal to vclLayerId and the layer with nuh_layer_id equal to spsLayerId is included in at least one OLS that includes the layer with nuh_layer_id equal to vclLayerId.
sps_video_parameter_set_id, when greater than 0, specifies the value of vps_video_parameter_set_id for the VPS referred to by the SPS.
When sps_video_parameter_set_id is equal to 0, the following applies:
   The SPS does not refer to a VPS.
   No VPS is referred to when decoding each CLVS referring to the SPS.
   The value of vps_max_layers_minus1 is inferred to be equal to 0.
   The CVS shall contain only one layer (i.e., all VCL NAL unit in the CVS shall have the same value of nuh_layer_id).
   conforming to this version of this Specification shall ignore all sps_extension_data_flag syntax elements.
   The value of GeneralLayerIdx[ nuh_layer_id ] is inferred to be equal to 0.
   The value of vps_independent_layer_flag[ GeneralLayerIdx[ nuh_layer_id ] ]is inferred to be equal to 1.
When vps_independent_layer_flag[ GeneralLayerIdx[ nuh_layer_id ] ] is equal to 1, the SPS referred to by a CLVS with a particluar nuh_layer_id value nuhLayerId shall have nuh_layer_id equal to nuhLayerId.
The value of sps_video_parameter_set_id shall be the same in all SPSs that are referred to by CLVSs in a CVS.
sps_max_sublayers_minus1 plus 1 specifies the maximum number of temporal sublayers that may be present in each CLVS referring to the SPS. The value of sps_max_sublayers_minus1 shall be in the range of 0 to vps_max_sublayers_minus1, inclusive.
sps_reserved_zero_4bits shall be equal to 0 in bitstreams conforming to this version of this Specification. Other values for sps_reserved_zero_4bits are reserved for future use by ITU-T \| ISO/IEC.
sps_ptl_dpb_hrd_params_present_flag equal to 1 specifies that a profile_tier_level( ) syntax structure and a dpb_parameters( ) syntax structure are present in the SPS, and a general_hrd_parameters( ) syntax structure and an ols_hrd parameters( ) syntax structure may also be present in the SPS. sps_ptl_dpb_hrd_params present_flag equal to 0 specifies that none of these four syntax structures is present in the SPS. The value of sps_ptl_dpb_hrd_params_present_flag shall be equal to vps_independent_layer_flag[ GeneralLayerIdx[ nuh_layer_id ] ].
gdr_enabled_flag equal to 1 specifies that GDR pictures may be present in CLVSs referring to the SPS. gdr_enabled_flag equal to 0 specifies that GDR pictures are not present in CLVSs referring to the SPS.
chroma_format_idc specifies the chroma sampling relative to the luma sampling as specified in clause 6.2.
separate_colour_plane_flag equal to 1 specifies that the three colour components of the 4:4:4 chroma format are coded separately. separate_colour_plane_flag equal to 0 specifies that the colour components are not coded separately. When separate_colour plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

TABLE 7-continued

Sequence parameter set RBSP semantics

NOTE 1 - There is no dependency in decoding processes between the colour planes
having different colour_plane_id values. For example, the decoding process of a
monochrome picture with one value of colour_plane_id does not use any data from
monochrome pictures having different values of colour_plane_id for inter prediction.
Depending on the value of separate_colour_plane_flag, the value of the variable
ChromaArray Type is assigned as follows:
  If separate_colour_plane_flag is equal to 0, ChromaArrayType is set equal to
  chroma_format idc.
  Otherwise (separate_colour_plane_flag is equal to 1), ChromaArrayType is set equal
  to 0.
res_change_in_clvs_allowed_flag equal to 1 specifies that the picture spatial resolution
may change within a CLVS referring to the SPS. res_change_in_clvs_allowed_flag equal
to 0 specifies that the picture spatial resolution does not change within any CLVS referring
to the SPS.
pic_width_max_in_luma_samples specifies the maximum width, in units of luma
samples, of each decoded picture referring to the SPS. pic_width_max_in_luma_samples
shall not be equal to 0 and shall be an integer multiple of Max( 8, MinCbSizeY ).
It is a requirement of bitstream conformance that, for any OLS with OLS index i that
contains one or more layers that refers to the SPS, the value of
pic_width_max_in_luma_samples shall be less than or equal to the value of
ols_dpb_pic_width[ i ].
pic_height_max_in_luma_samples specifies the maximum height, in units of luma
samples, of each decoded picture referring to the SPS. pic_height_max_in_luma_samples
shall not be equal to 0 and shall be an integer multiple of Max( 8, MinCbSizeY ).
It is a requirement of bitstream conformance that, for any OLS with OLS index i that
contains one or more layers that refers to the SPS, the value of
pic_height_max_in_luma_samples shall be less than or equal to the value of
ols_dpb_pic_height[ i ].
sps_conformance_window_flag equal to 1 indicates that the conformance cropping
window offset parameters follow next in the SPS. sps_conformance_window_flag equal to
0 indicates that the conformance cropping window offset parameters are not present in the
SPS.
sps_conf_win_left_offset, sps_conf_win_right_offset, sps_conf_win_top_offset, and
sps_conf_win_bottom_offset specify the cropping window that is applied to pictures with
pic_width_in_luma_samples equal to pic_width_max_in_luma_samples and
pic_height_in_luma_samples equal to pic_height_max_in_luma_samples. When
sps_conformance_window_flag is equal to 0, the values of sps_conf_win_left_offset,
sps_conf_win_right_offset, sps_conf_win_top_offset, and sps_conf_win_bottom_offset are
inferred to be equal to 0.
The conformance cropping window contains the luma samples with horizontal picture
coordinates from SubWidthC * sps_conf_win_left_offset to
pic_width_max_in_luma_samples - ( SubWidthC * sps_conf_win_right_offset + 1 ) and
vertical picture coordinates from SubHeightC * sps_conf_win_top_offset to
pic_height_max_in_luma_samples - ( SubHeightC * sps_conf_win_bottom_offset + 1),
inclusive.
The value of SubWidthC * ( sps_conf_win_left_offset + sps_conf_win_right_offset ) shall
be less than pic_width_max_in_luma_samples, and the value of
SubHeightC * ( sps_conf_win_top_offset + sps_conf_win_bottom_offset ) shall be less
than pic_height_max_in_luma_samples.
When ChromaArray Type is not equal to 0, the corresponding specified samples of the two
chroma arrays are the samples having picture coordinates ( x / SubWidthC, y / SubHeightC),
where (x, y ) are the picture coordinates of the specified luma samples.
  NOTE 2 - The conformance cropping window offset parameters are only applied at the
  output. All internal decoding processes are applied to the uncropped picture size.
sps_log2_ctu_size_minus5 plus 5 specifies the luma coding tree block size of each CTU.
The value of sps_log2_ctu_size_minus5 shall be in the range of 0 to 2, inclusive. The value
3 for sps_log2_ctu_size_minus5 is reserved for future use by ITU-T | ISO/IEC.
The variables CtbLog2SizeY and CtbSizeY are derived as follows:
  CtbLog2SizeY = sps_log2_ctu_size_minus5 + 5                                    (43)
  CtbSizeY = 1 << CtbLog2SizeY                                                   (44)
subpic_info_present_flag equal to 1 specifies that subpicture information is present for
the CLVS and there may be one or more than one subpicture in each picture of the CLVS.
subpic_info_present_flag equal to 0 specifies that subpicture information is not present for
the CLVS and there is only one subpicture in each picture of the CLVS.
When res_change_in_clvs_allowed_flag is equal to 1, the value of
subpic_info present_flag shall be equal to 0.
  NOTE 3 - When a bitstream is the result of a sub-bitstream extraction process and
  contains only a subset of the subpictures of the input bitstream to the sub-bitstream
  extraction process, it might be required to set the value of subpic_info_present_flag
  equal to 1 in the RBSP of the SPSs.
sps_num_subpics_minus1 plus 1 specifies the number of subpictures in each picture in
the CLVS. The value of sps_num_subpics_minus1 shall be in the range of 0 to
Ceil( pic_width_max_in_luma_samples ÷ CtbSizeY) *
Ceil( pic_height_max_in_luma_samples ÷ CtbSizeY) − 1, inclusive. When not present, the
value of sps_num_subpics_minus1 is inferred to be equal to 0.
sps_independent_subpics_flag equal to 1 specifies that no intra prediction, no inter
prediction and no in-loop filtering operations may be performed across any subpicture
boundary in the CLVS. sps_independent_subpics_flag equal to 0 specifies that inter

TABLE 7-continued

Sequence parameter set RBSP semantics prediction or in-loop filtering operations across the subpicture boundaries in the CLVS may be allowed. When not present, the value of sps_independent_subpics_flag is inferred to be equal to 0.

subpic_ctu_top_left_x[ i ] specifies horizontal position of top left CTU of i-th subpicture in unit of CtbSizeY. The length of the syntax element is
Ceil( Log2((pic_width_max_in_luma_samples + CtbSizeY − 1) >> CtbLog2SizeY) ) bits. When not present, the value of subpic_ctu_top_left_x[ i ] is inferred to be equal to 0.

subpic_ctu_top_left_y[ i ] specifies vertical position of top left CTU of i-th subpicture in unit of CtbSizeY. The length of the syntax element is
Ceil( Log2((pic_height_max_in_luma_samples + CtbSizeY − 1) >> CtbLog2SizeY) ) bits. When not present, the value of subpic_ctu_top_left_y[ i ] is inferred to be equal to 0.

subpic_width_minus1 [ i ] plus 1 specifies the width of the i-th subpicture in units of CtbSizeY. The length of the syntax element is
Ceil( Log2( (pic_width_max_in_luma_samples + CtbSizeY − 1) >> CtbLog2SizeY) ) bits. When not present, the value of subpic_width_minus1[ i ] is inferred to be equal to
( ( pic_width_max_in_luma_samples + CtbSizeY− 1) >> CtbLog2SizeY ) − subpic_ctu_top_left_x[ i ] − 1.

subpic_height_minus1[ i ] plus 1 specifies the height of the i-th subpicture in units of CtbSizeY. The length of the syntax element is
Ceil( Log2((pic_height_max_in_luma_samples + CtbSizeY − 1) >> CtbLog2SizeY) ) bits. When not present, the value of subpic_height_minus1[ i ] is inferred to be equal to
( ( pic_height_max_in_luma_samples + CtbSizeY− 1) >> CtbLog2SizeY ) − subpic_ctu_top_left y[ i ] − 1.

subpic_treated_as_pic_flag[ i ] equal to 1 specifies that the i-th subpicture of each coded picture in the CLVS is treated as a picture in the decoding process excluding in-loop filtering operations. subpic_treated_as_pic_flag[ i ] equal to 0 specifies that the i-th subpicture of each coded picture in the CLVS is not treated as a picture in the decoding process excluding in-loop filtering operations. When not present, the value of subpic_treated_as_pic_flag[ i ] is inferred to be equal to sps_independent_subpics_flag. When subpic_treated_as_pic_flag[ i ] is equal to 1, it is a requirement of bitstream conformance that all of the following conditions are true for each output layer and its reference layers in an OLS that includes the layer containing the i-th subpicture as an output layer:
- All pictures in the output layer and its reference layers shall have the same value of pic_width_in_luma_samples and the same value of pic_height_in_luma_samples.
- All the SPSs referred to by the output layer and its reference layers shall have the same value of sps_num_subpics_minus1 and shall have the same values of subpic_ctu_top_left_x[ j ], subpic_ctu_top_left y[ j ], subpic_width_minus 1 [ j ], subpic_height_minus1[ j ], and loop_filter_across_subpic_enabled_flag[ j ], respectively, for each value of j in the range of 0 to sps_num_subpics_minus1, inclusive.
- All pictures in each access unit in the output layer and its reference layers shall have the same value of SubpicIdVal[ j ] for each value of j in the range of 0 to sps_num_subpics_minus1, inclusive.

loop_filter_across_subpic_enabled_flag[ i ] equal to 1 specifies that in-loop filtering operations may be performed across the boundaries of the i-th subpicture in each coded picture in the CLVS. loop_filter_across_subpic_enabled_flag[ i ] equal to 0 specifies that in-loop filtering operations are not performed across the boundaries of the i-th subpicture in each coded picture in the CLVS. When not present, the value of loop_filter_across_subpic_enabled_pic_flag[ i ] is inferred to be equal to 1 − sps_independent_subpics_flag.

It is a requirement of bitstream conformance that the shapes of the subpictures shall be such that each subpicture, when decoded, shall have its entire left boundary and entire top boundary consisting of picture boundaries or consisting of boundaries of previously decoded subpictures.

sps_subpic_id_len_minus1 plus 1 specifies the number of bits used to represent the syntax element sps_subpic_id[ i ], the syntax elements pps_subpic_id[ i ], when present, and the syntax element slice_subpic_id, when present. The value of sps_subpic_id_len_minus1 shall be in the range of 0 to 15, inclusive. The value of 1 << ( sps_subpic_id_len_minus1 + 1 ) shall be greater than or equal to sps_num_subpics_minus1 + 1.

subpic_id_mapping_explicitly_signalled_flag equal to 1 specifies that the subpicture ID mapping is explicitly signalled, either in the SPS or in the PPSs referred to by coded pictures of the CLVS. subpic_id_mapping_explicitly_signalled_flag equal to 0 specifies that the subpicture ID mapping is not explicitly signalled for the CLVS. When not present, the value of subpic_id_mapping_explicitly_signalled_flag is inferred to be equal to 0.

subpic_id_mapping_in_sps_flag equal to 1 specifies that the subpicture ID mapping is signalled in the SPS when subpic_id_mapping_explicitly_signalled_flag is equal to 1. subpic_id_mapping_in_sps_flag equal to 0 specifies that subpicture ID mapping is signalled in the PPSs referred to by coded pictures of the CLVS when subpic_id_mapping_explicitly_signalled_flag is equal to 1.

sps_subpic_id[ i ] specifies the subpicture ID of the i-th subpicture. The length of the sps_subpic_id[ i ] syntax element is sps_subpic_id_len_minus1 + 1 bits.

TABLE 7-continued

Sequence parameter set RBSP semantics bit_depth_minus8 specifies the bit depth of the samples of the luma and chroma arrays, BitDepth, and the value of the luma and chroma quantization parameter range offset, QpBdOffset, as follows:

$$BitDepth = 8 + bit\_depth\_minus8 \tag{45}$$

$$QpBdOffset = 6 * bit\_depth\_minus8 \tag{46}$$

bit_depth_minus8 shall be in the range of 0 to 8, inclusive.
sps_entropy_coding_sync_enabled_flag equal to 1 specifies that a specific synchronization process for context variables is invoked before decoding the CTU that includes the first CTB of a row of CTBs in each tile in each picture referring to the SPS, and a specific storage process for context variables is invoked after decoding the CTU that includes the first CTB of a row of CTBs in each tile in each picture referring to the SPS. sps_entropy_coding_sync_enabled_flag equal to 0 specifies that no specific synchronization process for context variables is required to be invoked before decoding the CTU that includes the first CTB of a row of CTBs in each tile in each picture referring to the SPS, and no specific storage process for context variables is required to be invoked after decoding the CTU that includes the first CTB of a row of CTBs in each tile in each picture referring to the SPS.
sps_wpp_entry_point_offsets_present_flag equal to 1 specifies that signalling for entry point offsets for CTU rows may be present in the slice headers of pictures referring to the SPS when sps_entropy_coding_sync_enabled_flag is equal to 1.
sps_wpp_entry point_offsets_present_flag equal to 0 specifies that signalling for entry point offsets for CTU rows are not present in the slice headers of pictures referring to the SPS. When not present, the value of sps_wpp_entry_point_offsets_present_flag is inferred to be equal to 0.
sps_weighted_pred_flag equal to 1 specifies that weighted prediction may be applied to P slices referring to the SPS. sps_weighted pred_flag equal to 0 specifies that weighted prediction is not applied to P slices referring to the SPS.
sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS.
log2_max_pic_order_cnt_lsb_minus4 specifies the value of the variable MaxPicOrderCntLsb that is used in the decoding process for picture order count as follows:

$$MaxPicOrderCntLsb = 2^{(log2\_max\_pic\_order\_cnt\_lsb\_minus4 + 4)} \tag{47}$$

The value of log2_max pic_order_cnt_1sb_minus4 shall be in the range of 0 to 12, inclusive.
sps_poc_msb_flag equal to 1 specifies that the ph_poc_msb_present_flag syntax element is present in PHs referring to the SPS. sps_poc_msb_flag equal to 0 specifies that the ph_poc_msb_present_flag syntax element is not present in PHs referring to the SPS. poc_msb_len_minus1 plus 1 specifies the length, in bits, of the poc_msb_val syntax elements, when present in the PHs referring to the SPS. The value of poc_msb_len_minus1 shall be in the range of 0 to 32 − log2_max_pic_order_cnt_lsb_minus4 − 5, inclusive.
num_extra_ph_bits_bytes specifies the number of bytes of extra bits in the PH syntax structure for coded pictures referring to the SPS. The value of num_extra ph bits bytes shall be equal to 0 in bitstreams conforming to this version of this Specification. Although the value of num_extra_ph_bits_bytes is required to be equal to 0 in this version of this Specification, decoder conforming to this version of this Specification shall allow the value of num_extra ph_bits_bytes equal to 1 or 2 to appear in the syntax.
num_extra_sh_bits_bytes specifies the number of bytes of extra bits in the slice headers for coded pictures referring to the SPS. The value of num_extra_sh_bits_bytes shall be equal to 0 in bitstreams conforming to this version of this Specification. Although the value of num_extra_sh_bits_bytes is required to be equal to 0 in this version of this Specification, decoder conforming to this version of this Specification shall allow the value of num_extra_sh_bits_bytes equal to 1 or 2 to appear in the syntax.
sps_sublayer_dpb_params_flag is used to control the presence of max_dec_pic_buffering_minus1 [ i ], max_num_reorder pics[ i ], and max_latency_increase_plus1[ i ] syntax elements in the dpb_parameters( ) syntax strucure in the SPS. When not present, the value of sps_sub_dpb_params_info present_flag is inferred to be equal to 0.
long_term_ref_pics_flag equal to 0 specifies that no LTRP is used for inter prediction of any coded picture in the CLVS. long_term_ref pics_flag equal to 1 specifies that LTRPs may be used for inter prediction of one or more coded pictures in the CLVS.
inter_layer_ref_pics_present_flag equal to 0 specifies that no ILRP is used for inter prediction of any coded picture in the CLVS. inter_layer_ref pics present_flag equal to 1 specifies that ILRPs may be used for inter prediction of one or more coded pictures in the CLVS. When sps_video_parameter_set_id is equal to 0, the value of inter_layer_ref_pics_present_flag is inferred to be equal to 0. When vps_independent_layer_flag[ GeneralLayerIdx[ nuh_layer_id ] ] is equal to 1, the value of inter_layer_ref_pics_present_flag shall be equal to 0.
sps_idr_rpl_present_flag equal to 1 specifies that reference picture list syntax elements are present in slice headers of IDR pictures. sps_idr_rpl present_flag equal to 0 specifies that reference picture list syntax elements are not present in slice headers of IDR pictures.
rpl1_same_as_rp10_flag equal to 1 specifies that the syntax element num_ref_pic_lists_in_sps[ 1 ] and the syntax structure ref_pic_list_struct( 1, rplsIdx ) are not present and the following applies:
    The value of num_ref_pic_lists_in_sps[ 1 ] is inferred to be equal to the value of num_ref pic_lists_in_sps[ 0 ].

TABLE 7-continued

Sequence parameter set RBSP semantics

The value of each of syntax elements in ref_pic_list_struct( 1, rplsIdx ) is inferred to be equal to the value of corresponding syntax element in ref_pic_list_struct( 0, rplsIdx ) for rplsIdx ranging from 0 to num_ref_pic_lists_in_sps[ 0 ] − 1.

num_ref_pic_lists_in_sps[ i ] specifies the number of the ref_pic_list_struct( listIdx, rplsIdx ) syntax structures with listIdx equal to i included in the SPS. The value of num_ref_pic_lists_in_sps[ i ] shall be in the range of 0 to 64, inclusive.

NOTE 4 - For each value of listIdx (equal to 0 or 1), a decoder should allocate memory for a total number of num_ref_pic_lists_in_sps[ i ] + 1 ref_pic_list_struct( listIdx, rplsIdx ) syntax structures since there may be one ref_pic_list_struct( listIdx, rplsIdx ) syntax structure directly signalled in the slice headers of a current picture.

qtbtt_dual_tree_intra_flag equal to 1 specifies that, for I slices, each CTU is split into coding units with 64 × 64 luma samples using an implicit quadtree split, and these coding units are the root of two separate coding_tree syntax structure for luma and chroma. qtbtt_dual_tree_intra_flag equal to 0 specifies separate coding_tree syntax structure is not used for I slices. When qtbtt_dual_tree_intra_flag is not present, it is inferred to be equal to 0.

log2_min_luma_coding_block_size_minus2 plus 2 specifies the minimum luma coding block size. The value range of log2_min_luma_coding_block_size_minus2 shall be in the range of 0 to Min( 4, sps_log2_ctu_size_minus5 + 3), inclusive.

The variables MinCbLog2SizeY, MinCbSizeY, IbcBufWidthY, IbcBufWidthC and Vsize are derived as follows:

MinCbLog2SizeY = log2_min_luma_coding_block_size_minus2 + 2    (48)
   MinCbSizeY = 1 << MinCbLog2SizeY    (49)
   IbcBufWidthY = 256 * 128 / CtbSizeY    (50)
   IbcBufWidthC = IbcBufWidth Y / Sub WidthC    (51)
   VSize = Min( 64, CtbSizeY )    (52)

The value of MinCbSizeY shall less than or equal to VSize.

The variables CtbWidthC and CtbHeightC, which specify the width and height, respectively, of the array for each chroma CTB, are derived as follows:

If chroma_format_idc is equal to 0 (monochrome) or separate_colour_plane_flag is equal to 1, CtbWidthC and CtbHeightC are both equal to 0.
   Otherwise, CtbWidthC and CtbHeightC are derived as follows:
   CtbWidthC = CtbSizeY / SubWidthC    (53)
   CtbHeightC = CtbSizeY / SubHeightC    (54)

For log2BlockWidth ranging from 0 to 4 and for log2BlockHeight ranging from 0 to 4, inclusive, the up-right diagonal scan order array initialization process as specified in clause 6.5.2 is invoked with 1 << log2BlockWidth and 1 << log2BlockHeight as inputs, and the output is assigned to DiagScanOrder[ log2BlockWidth ][ log2BlockHeight ].

For log2BlockWidth ranging from 0 to 6 and for log2BlockHeight ranging from 0 to 6, inclusive, the horizontal and vertical traverse scan order array initialization process as specified in clause 6.5.3 is invoked with 1 << log2BlockWidth and 1 << log2BlockHeight as inputs, and the output is assigned to HorTravScanOrder[ log2BlockWidth ][ log2BlockHeight ] and VerTravScanOrder[ log2BlockWidth ][ log2BlockHeight ].

partition_constraints_override_enabled_flag equal to 1 specifies the presence of partition_constraints_override_flag in PHs referring to the SPS. partition_constraints_override_enabled_flag equal to 0 specifies the absence of partition_constraints_override_flag in PHs referring to the SPS.

sps_log2_diff_min_qt_min_cb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with slice_type equal to 2 (I) referring to the SPS. When partition_constraints_override_enabled_flag is equal to 1, the default difference can be overridden by ph_log2_diff_min_qt_min_cb_luma present in PHs referring to the SPS. The value of sps_log2_diff_min_qt_min_cb_intra_slice_luma shall be in the range of 0 to CtbLog2SizeY − MinCbLog2SizeY, inclusive. The base 2 logarithm of the minimum size in luma samples of a luma leaf block resulting from quadtree splitting of a CTU is derived as follows:

MinQtLog2SizeIntraY = sps_log2_diff_min_qt_min_cb_intra_slice_luma +
   MinCbLog2SizeY    (55)

sps_max_mtt_hierarchy_depth_intra_slice_luma specifies the default maximum hierarchy depth for coding units resulting from multi-type tree splitting of a quadtree leaf in slices with slice_type equal to 2 (I) referring to the SPS. When partition_constraints_override_enabled_flag is equal to 1, the default maximum hierarchy depth can be overridden by ph_max_mtt_hierarchy_depth_intra_slice_luma present in PHs referring to the SPS. The value of sps_max_mtt_hierarchy_depth_intra_slice_luma shall be in the range of 0 to 2*( CtbLog2SizeY − MinCbLog2SizeY ), inclusive.

sps_log2_diff_max_bt_min_qt_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) referring to the SPS. When partition_constraints_override_enabled_flag is equal to 1, the default difference can be overridden by ph_log2_diff_max_bt_min_qt_luma present in PHs referring to the SPS.

TABLE 7-continued

Sequence parameter set RBSP semantics

The value of sps_log2_diff_max_bt_min_qt_intra_slice_luma shall be in the range of 0 to CtbLog2SizeY − MinQtLog2SizeIntraY, inclusive. When sps_log2_diff_max_bt_min_qt_intra_slice_luma is not present, the value of sps_log2_diff_max_bt_min_qt_intra_slice_luma is inferred to be equal to 0.
sps_log2_diff_max_tt_min_qt_intra_slice_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) referring to the SPS. When partition_constraints_override_enabled_flag is equal to 1, the default difference can be overridden by ph_log2_diff_max_tt_min_qt_luma present in PHs referring to the SPS. The value of sps_log2_diff_max_tt_min_qt_intra_slice_luma shall be in the range of 0 to CtbLog2SizeY - MinQtLog2SizeIntraY, inclusive. When sps_log2_diff_max_tt_min_qt_intra_slice_luma is not present, the value of sps_log2_diff_max_tt_min_qt_intra_slice_luma is inferred to be equal to 0.
sps_log2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice_type equal to 0 (B) or 1 (P) referring to the SPS. When partition_constraints_override_enabled_flag is equal to 1, the default difference can be overridden by ph_log2_diff_min_qt_min_cb_luma present in PHs referring to the SPS. The value of sps_log2_diff_min_qt_min_cb_inter_slice shall be in the range of 0 to CtbLog2SizeY - MinCbLog2SizeY, inclusive. The base 2 logarithm of the minimum size in luma samples of a luma leaf block resulting from quadtree splitting of a CTU is derived as follows:

$$\text{MinQtLog2SizeInterY} = \text{sps\_log2\_diff\_min\_qt\_min\_cb\_inter slice} + \text{MinCbLog2Size Y} \quad (56)$$

sps_max_mtt_hierarchy_depth_inter_slice specifies the default maximum hierarchy depth for coding units resulting from multi-type tree splitting of a quadtree leaf in slices with slice_type equal to 0 (B) or 1 (P) referring to the SPS. When partition_constraints_override_enabled_flag is equal to 1, the default maximum hierarchy depth can be overridden by ph_max_mtt_hierarchy_depth_inter_slice present in PHs referring to the SPS. The value of sps_max_mtt_hierarchy_depth inter_slice shall be in the range of 0 to 2*( CtbLog2SizeY − MinCbLog2SizeY ), inclusive.
sps_log2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 0 (B) or 1 (P) referring to the SPS. When partition_constraints_override_enabled_flag is equal to 1, the default difference can be overridden by ph_log2_diff_max_bt_min_qt_luma present in PHs referring to the SPS. The value of sps_log2_diff_max_bt_min_qt inter slice shall be in the range of 0 to CtbLog2SizeY − MinQtLog2SizeInterY, inclusive. When sps_log2_diff_max_bt_min_qt_inter_slice is not present, the value of sps_log2_diff_max_bt_min_qt inter_slice is inferred to be equal to 0.
sps_log2_diff_max_tt_min_qt_inter_slice specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) referring to the SPS. When partition_constraints_override_enabled_flag is equal to 1, the default difference can be overridden by ph_log2_diff_max_tt_min_qt_luma present in PHs referring to the SPS. The value of sps_log2_diff_max_tt_min_qt_inter_slice shall be in the range of 0 to CtbLog2SizeY - MinQtLog2SizeInterY, inclusive. When sps_log2_diff_max_tt_min_qt_inter_slice is not present, the value of sps_log2_diff_max_tt_min_qt inter_slice is inferred to be equal to 0.
sps_log2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL TREE CHROMA and the base 2 logarithm of the minimum coding block size in luma samples for chroma CUs with treeType equal to DUAL_TREE_CHROMA in slices with slice_type equal to 2 (I) referring to the SPS. When partition_constraints_override_enabled_flag is equal to 1, the default difference can be overridden by ph_log2_diff_min_qt_min_cb_chroma present in PHs referring to the SPS. The value of sps_log2_diff_min_qt_min_cb_intra_slice_chroma shall be in the range of 0 to CtbLog2SizeY - MinCbLog2SizeY, inclusive. When not present, the value of sps_log2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

$$\text{MinQtLog2SizeIntraC} = \text{sps\_log2\_diff\_min\_qt\_min\_cb\_intra slice chroma} + \text{MinCbLog2SizeY} \quad (57)$$

sps_max_mtt_hierarchy_depth_intra_slice_chroma specifies the default maximum hierarchy depth for chroma coding units resulting from multi-type tree splitting of a chroma quadtree leaf with treeType equal to DUAL_TREE_CHROMA in slices with slice_type equal to 2 (I) referring to the SPS. When partition_constraints_override_enabled_flag is equal to 1, the default maximum hierarchy depth can be overridden by ph_max_mtt_hierarchy_depth_chroma present in PHs referring

TABLE 7-continued

Sequence parameter set RBSP semantics to the SPS. The value of sps_max_mtt_hierarchy_depth_intra_slice_chroma shall be in the range of 0 to 2*( CtbLog2SizeY − MinCbLog2SizeY ), inclusive. When not present, the value of sps_max_mtt_hierarchy_depth_intra_slice_chroma is inferred to be equal to 0.
sps_log2_diff_max_bt_min_qt_intra_slice_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_enabled_flag is equal to 1, the default difference can be overridden by ph_log2_diff_max_bt_min_qt_chroma present in PHs referring to the SPS. The value of sps_log2_diff_max_bt_min_qt_intra_slice_chroma shall be in the range of 0 to CtbLog2SizeY - MinQtLog2SizeIntraC, inclusive. When sps_log2_diff_max_bt_min_qt_intra_slice_chroma is not present, the value of sps_log2_diff_max_bt_min_qt_intra_slice_chroma is inferred to be equal to 0.
sps_log2_diff_max_tt_min_qt_intra_slice_chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (I) referring to the SPS. When partition_constraints_override_enabled_flag is equal to 1, the default difference can be overridden by ph_log2_diff_max_tt_min_qt_chroma present in PHs referring to the SPS. The value of sps_log2_diff_max_tt_min_qt_intra_slice_chroma shall be in the range of 0 to CtbLog2SizeY - MinQtLog2SizeIntraC, inclusive. When sps_log2_diff_max_tt_min_qt_intra_slice_chroma is not present, the value of sps_log2_diff_max_tt_min_qt_intra_slice_chroma is inferred to be equal to 0.
sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32.
When CtbSizeY is less than 64, the value of sps_max_luma_transform_size_64_flag shall be equal to 0.
The variables MinTbLog2SizeY, MaxTbLog2SizeY, MinTbSizeY, and MaxTbSizeY are derived as follows:

$$\text{MinTbLog2SizeY} = 2 \tag{58}$$
$$\text{MaxTbLog2SizeY} = \text{sps\_max\_luma\_transform\_size\_64\_flag} \;?\; 6 : 5 \tag{59}$$
$$\text{MinTbSizeY} = 1 \ll \text{MinTbLog2SizeY} \tag{60}$$
$$\text{MaxTbSizeY} = 1 \ll \text{MaxTbLog2SizeY} \tag{61}$$

sps_joint_cbcr_enabled_flag equal to 0 specifies that the joint coding of chroma residuals is disabled. sps_joint_cbcr_enabled_flag equal to 1 specifies that the joint coding of chroma residuals is enabled. When not present, the value of sps_joint_cbcr_enabled_flag is inferred to be equal to 0.
same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1. same_qp_table_for_chroma equal to 0 specifies that chroma QP mapping tables, two for Cb and Cr, and one additional for joint Cb-Cr when sps_joint_cbcr_enabled_flag is equal to 1, are signalled in the SPS. When same_qp_table_for_chroma is not present in the bitstream, the value of same_qp_table_for_chroma is inferred to be equal to 1.
qp_table_start_minus26[ i ] plus 26 specifies the starting luma and chroma QP used to describe the i-th chroma QP mapping table. The value of qp_table_start_minus26[ i ] shall be in the range of -26 - QpBdOffset to 36 inclusive. When qp_table_start_minus26[ i ] is not present in the bitstream, the value of qp_table_start_minus26[ i ] is inferred to be equal to 0.
num_points_in_qp_table_minus1[ i ] plus 1 specifies the number of points used to describe the i-th chroma QP mapping table. The value of num_points_in_qp_table_minus1 [ i ] shall be in the range of 0 to 63 + QpBdOffset, inclusive. When num_points_in_qp_table_minus1[ 0 ] is not present in the bitstream, the value of num_points_in_qp_table_minus1[ 0 ] is inferred to be equal to 0.
delta_qp_in_val_minus1[ i ][ j ] specifies a delta value used to derive the input coordinate of the j-th pivot point of the i-th chroma QP mapping table. When delta_qp_in_val_minus1[ 0 ][ j ] is not present in the bitstream, the value of delta_qp_in_val_minus1[ 0 ][ j ] is inferred to be equal to 0.
delta_qp_diff_val[ i ][ j ] specifies a delta value used to derive the output coordinate of the j-th pivot point of the i-th chroma QP mapping table.
The i-th chroma QP mapping table ChromaQpTable[ i ] for i = 0..numQpTables − 1 is derived as follows:

```
qpInVal[ i ][ 0 ] = qp_table_start_minus26[ i ] + 26
qpOutVal[ i ][ 0 ] = qpIn Val[ i ][ 0 ]
for(j = 0; j <= num_points_in_qp_table_minus1[ i ]; j++ ) {
   qpIn Val[ i ][ j + 1 ] = qpIn Val[ i ][ j ] + delta_qp_in_val_minus1[ i ][ j ] + 1
   qpOutVal[ i ][ j + 1 ] = qpOutVal[ i ][ j ] +
( delta_qp_in_val_minus1 [ i ][ j ] ^ delta_qp_diff_val[ i ][ j ] )
}
ChromaQpTable[ i ][ qpIn Val[ i ][ 0 ] ] = qpOutVal[ i ][ 0 ]
for( k = qpInVal[ i ][ 0 ] - 1; k >= -QpBdOffset; k--)
   ChromaQpTable[ i ][ k ] = Clip3(-QpBdOffset, 63,
```

TABLE 7-continued

Sequence parameter set RBSP semantics

```
  ChromaQpTable[ i ][ k + 1 ] − 1)                                              (62)
  for(j = 0; j <= num_points_in_qp_table_minus1 [ i ]; j++ ) {
    sh = ( delta_qp_in_val_minus1[ i ][ j ] + 1 ) >> 1
    for( k = qpIn Val[ i ][ j ] + 1, m = 1; k <= qpInval[ i ][ j + 1 ]; k++, m++ )
      ChromaQpTable[ i ][ k ] = ChromaQpTable[ i ][ qpIn Val[ i ][ j ] ] +
        ( ( qpOutVal[ i ][j + 1] − qpOutVal[ i ][ j ] ) * m + sh ) /
  ( delta_qp_in_val_minus1[ i ][ j ] + 1)
  }
  for( k = qpIn Val[ i ][ num_points_in_qp_table_minus1[ i ] + 1] + 1; k <= 63; k++ )
  ChromaQpTable[ i ][ k ] = Clip3( −QpBdOffset, 63, ChromaQpTable[ i ][ k − 1 ] +1 )
```
When same_qp_table_for_chroma is equal to 1, ChromaQpTable[ 1 ][ k ] and
ChromaQpTable[ 2 ][ k ] are set equal to ChromaQpTable[ 0 ][ k ] for k in the range of
−QpBdOffset to 63, inclusive.
It is a requirement of bitstream conformance that the values of qpIn Val[ i ][ j ] and
qpOutVal[ i ][ j ] shall be in the range of −QpBdOffset to 63, inclusive for i in the range of
0 to numQpTables − 1, inclusive, and j in the range of 0 to
num_points_in_qp_table_minus1 [ i ] + 1, inclusive.
sps_sao_enabled_flag equal to 1 specifies that the sample adaptive offset process is
applied to the reconstructed picture after the deblocking filter process.
sps_sao_enabled_flag equal to 0 specifies that the sample adaptive offset process is not
applied to the reconstructed picture after the deblocking filter process.
sps_alf_enabled_flag equal to 0 specifies that the adaptive loop filter is disabled.
sps_alf_enabled_flag equal to 1 specifies that the adaptive loop filter is enabled.
sps_ccalf_enabled_flag equal to 0 specifies that the cross-component adaptive loop filter
is disabled. sps_ccalf_enabled_flag equal to 1 specifies that the cross-component adaptive
loop filter may be enabled.
sps_transform_skip_enabled_flag equa to 1 specifies that transform_skip_flag may be
present in the transform unit syntax. sps_transform_skip_enabled_flag equal to 0 specifies
that transform_skip_flag is not present in the transform unit syntax.
log2_transform_skip_max_size_minus2 specifies the maximum block size used for
transform skip, and shall be in the range of 0 to 3, inclusive.
The variable MaxTsSize is set equal to
1 << ( log2_transform_skip_max_size_minus2 + 2).
sps_bdpcm_enabled_flag equal to 1 specifies that intra_bdpcm_luma_flag and
intra_bdpcm_chroma_flag may be present in the coding unit syntax for intra coding units.
sps_bdpcm_enabled_flag equal to 0 specifies that intra_bdpcm_luma_flag and
intra_bdpcm_chroma_flag are not present in the coding unit syntax for intra coding units.
When not present, the value of sps_bdpcm_enabled_flag is inferred to be equal to 0.
sps_ref_wraparound_enabled_flag equal to 1 specifies that horizontal wrap-around
motion compensation is applied in inter prediction. sps_ref_wraparound_enabled_flag
equal to 0 specifies that horizontal wrap-around motion compensation is not applied. When
the value of ( CtbSizeY / MinCbSizeY + 1) is greater than ( pic_width_in_luma_samples /
MinCbSizeY − 1 ), where pic_width_in_luma_samples is the value of
pic_width_in_luma_samples in any PPS that refers to the SPS, the value of
sps_ref_wraparound_enabled_flag shall be equal to 0.
sps_temporal_mvp_enabled_flag equal to 1 specifies that temporal motion vector
predictors may be used in the CLVS. sps_temporal_mvp_enabled_flag equal to 0 specifies
that temporal motion vector predictors are not used in the CLVS.
sps_sbtmvp_enabled_flag equal to 1 specifies that subblock-based temporal motion
vector predictors may be used in decoding of pictures with all slices having slice_type not
equal to I in the CLVS. sps_sbtmvp_enabled_flag equal to 0 specifies that subblock-based
temporal motion vector predictors are not used in the CLVS. When
sps_sbtmvp_enabled_flag is not present, it is inferred to be equal to 0.
sps_amvr_enabled_flag equal to 1 specifies that adaptive motion vector difference
resolution is used in motion vector coding. amvr_enabled_flag equal to 0 specifies that
adaptive motion vector difference resolution is not used in motion vector coding.
sps_bdof_enabled_flag equal to 0 specifies that the bi-directional optical flow inter
prediction is disabled. sps_bdof_enabled_flag equal to 1 specifies that the bi-directional
optical flow inter prediction is enabled.
sps_bdof_pic_present_flag equal to 1 specifies that ph_disable_bdof_flag is present in
PHs referring to the SPS. sps_bdof_pic_present_flag equal to 0 specifies that
ph_disable_bdof_flag is not present in PHs referring to the SPS. When
sps_bdof_pic_present_flag is not present, the value of sps_bdof_pic_present_flag is
inferred to be equal to 0.
sps_smvd_enabled_flag equal to 1 specifies that symmetric motion vector difference may
be used in motion vector decoding. sps_smvd_enabled_flag equal to 0 specifies that
symmetric motion vector difference is not used in motion vector coding.
sps_dmvr_enabled_flag equal to 1 specifies that decoder motion vector refinement based
inter bi-prediction is enabled. sps_dmvr_enabled_flag equal to 0 specifies that decoder
motion vector refinement based inter bi-prediction is disabled.
sps_dmvr_pic_present_flag equal to 1 specifies that ph_disable_dmvr_flag is present in
PHs referring to the SPS. sps_dmvr pic present_flag equal to 0 specifies that
ph_disable_dmvr_flag is not present in PHs referring to the SPS. When
sps_dmvr_pic_present_flag is not present, the value of sps_dmvr pic_present_flag is
inferred to be equal to 0.
sps_mmvd_enabled_flag equal to 1 specifies that merge mode with motion vector
difference is enabled. sps_mmvd_enabled_flag equal to 0 specifies that merge mode with
motion vector difference is disabled.

TABLE 7-continued

Sequence parameter set RBSP semantics sps_isp_enabled_flag equal to 1 specifies that intra prediction with subpartitions is enabled. sps_isp_enabled_flag equal to 0 specifies that intra prediction with subpartitions is disabled.
sps_mrl_enabled_flag equal to 1 specifies that intra prediction with multiple reference lines is enabled. sps_mrl_enabled_flag equal to 0 specifies that intra prediction with multiple reference lines is disabled.
sps_mip_enabled_flag equal to 1 specifies that matrix-based intra prediction is enabled. sps_mip_enabled_flag equal to 0 specifies that matrix-based intra prediction is disabled.
sps_cclm_enabled_flag equal to 0 specifies that the cross-component linear model intra prediction from luma component to chroma component is disabled. sps_cclm_enabled_flag equal to 1 specifies that the cross-component linear model intra prediction from luma component to chroma componenent is enabled. When sps_cclm_enabled_flag is not present, it is inferred to be equal to 0.
sps_chroma_horizontal_collocated_flag equal to 1 specifies that prediction processes operate in a manner designed for chroma sample positions that are not horizontally shifted relative to corresponding luma sample positions. sps_chroma_horizontal_collocated_flag equal to 0 specifies that prediction processes operate in a manner designed for chroma sample positions that are shifted to the right by 0.5 in units of luma samples relative to corresponding luma sample positions. When sps_chroma_horizontal_collocated_flag is not present, it is inferred to be equal to 1.
sps_chroma_vertical_collocated_flag equal to 1 specifies that prediction processes operate in a manner designed for chroma sample positions that are not vertically shifted relative to corresponding luma sample positions. sps_chroma_vertical_collocated_flag equal to 0 specifies that prediction processes operate in a manner designed for chroma sample positions that are shifted downward by 0.5 in units of luma samples relative to corresponding luma sample positions. When sps_chroma_vertical_collocated_flag is not present, it is inferred to be equal to 1.
sps_mts_enabled_flag equal to 1 specifies that sps_explicit_mts_intra_enabled flag is present in the sequence parameter set RBSP syntax and sps_explicit_mts_inter_enabled_flag is present in the sequence parameter set RBSP syntax. sps_mts_enabled_flag equal to 0 specifies that sps_explicit_mts_intra_enabled_flag is not present in the sequence parameter set RBSP syntax and sps_explicit_mts_inter_enabled_flag is not present in the sequence parameter set RBSP syntax.
sps_explicit_mts_intra_enabled_flag equal to 1 specifies that mts_idx may be present in intra coding unit syntax. sps_explicit_mts_intra_enabled_flag equal to 0 specifies that mts_idx is not present in intra coding unit syntax. When not present, the value of sps_explicit_mts_intra_enabled_flag is inferred to be equal to 0.
sps_explicit_mts_inter_enabled_flag equal to 1 specifies that mts_idx may be present in inter coding unit syntax. sps_explicit_mts_inter_enabled_flag equal to 0 specifies that mts_idx is not present in inter coding unit syntax. When not present, the value of sps_explicit_mts_inter_enabled_flag is inferred to be equal to 0.
six_minus_max_num_merge_cand specifies the maximum number of merging motion vector prediction (MVP) candidates supported in the SPS subtracted from 6. The value of six_minus_max_num_merge_cand shall be in the range of 0 to 5, inclusive.
The maximum number of merging MVP candidates, MaxNumMergeCand, is derived as follows:

$$\text{MaxNumMergeCand} = 6 - \text{six\_minus\_max\_num\_merge\_cand} \qquad (63)$$

sps_sbt_enabled_flag equal to 0 specifies that subblock transform for inter-predicted CUs is disabled. sps_sbt_enabled_flag equal to 1 specifies that subblock transform for inter-predicteds CU is enabled.
sps_affine_enabled_flag specifies whether affine model based motion compensation can be used for inter prediction. If sps_affine_enabled_flag is equal to 0, the syntax shall be constrained such that no affine model based motion compensation is used in the CLVS, and inter_affine_flag and cu_affine_type_flag are not present in coding unit syntax of the CLVS. Otherwise (sps_affine_enabled_flag is equal to 1), affine model based motion compensation can be used in the CLVS.
five_minus_max_num_subblock_merge_cand specifies the maximum number of subblock-based merging motion vector prediction candidates supported in the SPS subtracted from 5. The value of five_minus_max_num_subblock_merge_cand shall be in the range of 0 to 5, inclusive.
sps_affine_type_flag specifies whether 6-parameter affine model based motion compensation can be used for inter prediction. If sps_affine_type_flag is equal to 0, the syntax shall be constrained such that no 6-parameter affine model based motion compensation is used in the CLVS, and cu_affine_type_flag is not present in coding unit syntax in the CLVS. Otherwise (sps_affine_type_flag is equal to 1), 6-parameter affine model based motion compensation can be used in the CLVS. When not present, the value of sps_affine_type_flag is inferred to be equal to 0.
sps_affine_amvr_enabled_flag equal to 1 specifies that adaptive motion vector difference resolution is used in motion vector coding of affine inter mode. sps_affine_amvr_enabled_flag equal to 0 specifies that adaptive motion vector difference resolution is not used in motion vector coding of affine inter mode. When not present, the value of sps_affine_amvr_enabled_flag is inferred to be equal to 0.
sps_affine_prof_enabled_flag specifies whether the prediction refinement with optical flow can be used for affine motion compensation. If sps_affine_prof_enabled_flag is equal to 0, the affine motion compensation shall not be refined with optical flow. Otherwise (sps_affine_prof_enabled_flag is equal to 1), the affine motion compensation can be TABLE 7-continued Sequence parameter set RBSP semantics refined with optical flow. When not present, the value of sps_affine_prof_enabled_flag is inferred to be equal to 0.
sps_prof_pic_present_flag equal to 1 specifies that ph_disable_prof_flag is present in PHs referring to the SPS. sps_prof_pic_present_flag equal to 0 specifies that ph_disable_prof_flag is not present in PHs referring to the SPS. When sps_prof pic present_flag is not present, the value of sps_prof pic_present_flag is inferred to be equal to 0.
sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled_flag is not present, it is inferred to be equal to 0.
sps_act_enabled_flag equal to 1 specifies that adaptive colour transform may be used and the cu_act_enabled_flag may be present in the coding unit syntax. sps_act_enabled_flag equal to 0 speifies that adaptive colour transform is not used and cu_act_enabled_flag is not present in the coding unit syntax. When sps_act_enabled_flag is not present, it is inferred to be equal to 0.
min_qp_prime_ts_minus4 specifies the minimum allowed quantization parameter for transform skip mode as follows:
    QpPrimeTsMin = 4 + min_qp_prime_ts_minus4     (64)
The value of min_qp_prime_ts_minus4 shall be in the range of 0 to 48, inclusive.
sps_bcw_enabled_flag specifies whether bi-prediction with CU weights can be used for inter prediction. If sps_bcw_enabled_flag is equal to 0, the syntax shall be constrained such that no bi-prediction with CU weights is used in the CLVS, and bcw_idx is not present in coding unit syntax of the CLVS. Otherwise (sps_bcw_enabled_flag is equal to 1), bi-prediction with CU weights can be used in the CLVS.
sps_ibc_enabled_flag equal to 1 specifies that the IBC prediction mode may be used in decoding of pictures in the CLVS. sps_ibc_enabled_flag equal to 0 specifies that the IBC prediction mode is not used in the CLVS. When sps_ibc_enabled_flag is not present, it is inferred to be equal to 0.
six_minus_max_num_ibc_merge_cand, when sps_ibc_enabled_flag is equal to 1, specifies the maximum number of IBC merging block vector prediction (BVP) candidates supported in the SPS subtracted from 6. The value of six minus_max_num_ibc_merge_cand shall be in the range of 0 to 5, inclusive.
The maximum number of IBC merging BVP candidates, MaxNumIbcMergeCand, is derived as follows:
   if( sps_ibc_enabled_flag )
     MaxNumIbcMergeCand = 6 − six_minus_max_num_ibc_merge_cand     (65)
   else
     MaxNumIbcMergeCand = 0
sps_ciip_enabled_flag specifies that ciip_flag may be present in the coding unit syntax for inter coding units. sps_ciip_enabled_flag equal to 0 specifies that ciip_flag is not present in the coding unit syntax for inter coding units.
sps_fpel_mmvd_enabled_flag equal to 1 specifies that merge mode with motion vector difference is using integer sample precision. sps_fpel_mmvd_enabled_flag equal to 0 specifies that merge mode with motion vector difference can use fractional sample precision.
sps_gpm_enabled_flag specifies whether geometric partition based motion compensation can be used for inter prediction. sps_gpm_enabled_flag equal to 0 specifies that the syntax shall be constrained such that no geometric partition based motion compensation is used in the CLVS, and merge_gpm_partition_idx, merge_gpm_idx0, and merge_gpm_idx1 are not present in coding unit syntax of the CLVS. sps_gpm_enabled_flag equal to 1 specifies that geometric partition based motion compensation can be used in the CLVS. When not present, the value of sps_gpm_enabled_flag is inferred to be equal to 0.
max_num_merge_cand_minus_max_num_gpm_cand specifies the maximum number of geometric partitioning merge mode candidates supported in the SPS subtracted from MaxNumMergeCand.
The maximum number of geometric partitioning merge mode candidates, MaxNumGpmMergeCand, is derived as follows:
   if( sps_gpm_enabled_flag && MaxNumMergeCand >= 3)
     MaxNumGpmMergeCand = MaxNumMergeCand −
       max_num_merge_cand_minus_max_num_gpm_cand     (66)
   else if( sps_gpm_enabled_flag && MaxNumMergeCand == 2)
     MaxNumGpmMergeCand = 2
   else
     MaxNumGpmMergeCand = 0
The value of MaxNumGpmMergeCand shall be in the range of 2 to MaxNumMergeCand, inclusive.
sps_lmcs_enabled_flag equal to 1 specifies that luma mapping with chroma scaling is used in the CLVS. sps_lmcs_enabled_flag equal to 0 specifies that luma mapping with chroma scaling is not used in the CLVS.
sps_lfnst_enabled_flag equal to 1 specifies that lfnst_idx may be present in intra coding unit syntax. sps_lfnst_enabled_flag equal to 0 specifies that lfnst_idx is not present in intra coding unit syntax.
sps_ladf_enabled_flag equal to 1, specifies that sps_num_ladf_intervals_minus2, sps_ladf_lowest_interval_qp_offset, sps_ladf_qp_offset[ i ], and sps_ladf_delta_threshold_minus1 [ i ] are present in the SPS.
sps_num_ladf_intervals_minus2 plus 1 specifies the number of sps_ladf_delta_threshold_minus1[ i ] and sps_ladf_qp_offset[ i ] syntax elements that are TABLE 7-continued Sequence parameter set RBSP semantics present in the SPS. The value of sps_num_ladf_intervals_minus2 shall be in the range of 0
to 3, inclusive.
sps_ladf_lowest_interval_qp_offset specifies the offset used to derive the variable qP as
specified in clause 8.8.3.6.1. The value of sps_ladf_lowest_interval_qp_offset shall be in
the range of −63 to 63, inclusive.
sps_ladf_qp_offset[ i ] specifies the offset array used to derive the variable qP as specified
in clause 8.8.3.6.1. The value of sps_ladf_qp_offset[ i ] shall be in the range of −63 to 63,
inclusive.
sps_ladf_delta_threshold_minus1 [ i ] is used to compute the values of
SpsLadfIntervalLowerBound[ i ], which specifies the lower bound of the i-th luma
intensity level interval. The value of sps_ladf_delta_threshold_minus1 [ i ] shall be in the
range of 0 to $2^{BitDepth} - 3$, inclusive.
The value of SpsLadfIntervalLowerBound[ 0 ] is set equal to 0.
For each value of i in the range of 0 to sps_num_ladf intervals_minus2, inclusive, the
variable SpsLadfIntervalLowerBound[ i + 1 ] is derived as follows:
    SpsLadfIntervalLowerBound[ i + 1 ] = SpsLadfIntervalLowerBound[ i ]    (67)
                     + sps_ladf_delta_threshold_minus1[ i ] + 1
log2_parallel_merge_level_minus2 plus 2 specifies the value of the variable
Log2ParMrgLevel, which is used in the derivation process for spatial merging candidates
as specified in clause 8.5.2.3, the derivation process for motion vectors and reference
indices in subblock merge mode as specified in clause 8.5.5.2, and to control the invocation
of the updating process for the history-based motion vector predictor list in clause 8.5.2.1.
The value of log2_parallel_merge_level_minus2 shall be in the range of 0 to
CtbLog2SizeY - 2, inclusive. The variable Log2ParMrgLevel is derived as follows:
    Log2ParMrgLevel = log2_parallel_merge_level_minus2 + 2    (68)
sps_scaling_list_enabled_flag equal to 1 specifies that a scaling list is used for the scaling
process for transform coefficients. sps_scaling_list_enabled_flag equal to 0 specifies that
scaling list is not used for the scaling process for transform coefficients.
sps_dep_quant_enabled_flag equal to 0 specifies that dependent quantization is disabled
for pictures referring to the SPS. sps_dep_quant_enabled_flag equal to 1 specifies that
dependent quantization may be enabled for pictures referring to the SPS.
sps_sign_data_hiding_enabled_flag equal to 0 specifies that sign bit hiding is disabled
for pictures referring to the SPS. sps_sign_data_hiding_enabled_flag equal to 1 specifies
that sign bit hiding may be enabled for pictures referring to the SPS. When
sps_sign_data_hiding_enabled_flag is not present, it is inferred to be equal to 0.
sps_virtual_boundaries_enabled_flag equal to 1 specifies that disabling in-loop filtering
across virtual boundaries may be applied in the coded pictures in the CLVS.
sps_virtual_boundaries_enabled_flag equal to 0 specifies that disabling in-loop filtering
across virtual boundaries is not applied in the coded pictures in the CLVS. In-loop filtering
operations include the deblocking filter, sample adaptive offset filter, and adaptive loop
filter operations.
sps_virtual_boundaries_present_flag equal to 1 specifies that information of virtual
boundaries is signalled in the SPS. sps_virtual_boundaries_present_flag equal to 0
specifies that information of virtual boundaries is not signalled in the SPS. When there is
one or more than one virtual boundaries signalled in the SPS, the in-loop filtering
operations are disabled across the virtual boundaries in pictures referring to the SPS. In-
loop filtering operations include the deblocking filter, sample adaptive offset filter, and
adaptive loop filter operations.
It is a requirement of bitstream conformance that when the value of
res_change_in_clvs_allowed_flag is equal to 1, the value of
sps_virtual_boundaries present_flag shall be equal to 0.
sps_num_ver_virtual_boundaries specifies the number of
sps_virtual_boundaries_pos_x[ i ] syntax elements that are present in the SPS. When
sps_num_ver_virtual_boundaries is not present, it is inferred to be equal to 0.
sps_virtual_boundaries_pos_x[ i ] specifies the location of the i-th vertical virtual
boundary in units of luma samples divided by 8. The value of
sps_virtual_boundaries_pos_x[ i ] shall be in the range of 1 to
Ceil( pic_width_in_luma_samples ÷ 8) − 1, inclusive.
sps_num_hor_virtual_boundaries specifies the number of
sps_virtual_boundaries_pos_y[ i ] syntax elements that are present in the SPS. When
sps_num_hor_virtual_boundaries is not present, it is inferred to be equal to 0.
When sps_virtual_boundaries_enabled_flag is equal to 1 and
sps_virtual_boundaries_present_flag is equal to 1, the sum of
sps_num_ver_virtual_boundaries and sps_num_hor_virtual_boundaries shall be greater
than 0.
sps_virtual_boundaries_pos_y[ i ] specifies the location of the i-th horizontal virtual
boundary in units of luma samples divided by 8. The value of
sps_virtual_boundaries_pos_y[ i ] shall be in the range of 1 to
Ceil( pic_height_in_luma_samples ÷ 8) − 1, inclusive.
sps_general_hrd_params_present_flag equal to 1 specifies that the syntax structure
general_hrd_parameters( ) is present in the SPS RBSP syntax structure.
sps_general_hrd_params_present_flag equal to 0 specifies that the syntax structure
general_hrd_parameters( ) is not present in the SPS RBSP syntax structure.
sps_sublayer_cpb_params_present_flag equal to 1 specifies that the syntax structure
old_hrd_parameters( ) in the SPS RBSP includes HRD parameters for sublayer
representations with TemporalId in the range of 0 to sps_max_sublayers_minus1,
inclusive. sps_sublayer_cpb_params_present_flag equal to 0 specifies that the syntax
structure ols_hrd parameters( ) in the SPS RBSP includes HRD parameters for the TABLE 7-continued Sequence parameter set RBSP semantics sublayer representation with TemporalId equal to sps_max_sublayers_minus1 only. When sps_max_sublayers_minus1 is equal to 0, the value of
sps_sublayer_cpb_params_present_flag is inferred to be equal to 0.
When sps_sublayer_cpb_params_present_flag is equal to 0, the HRD parameters for the sublayer representations with TemporalId in the range of 0 to
sps_max_sublayers_minus1 − 1, inclusive, are inferred to be the same as that for the sublayer representation with TemporalId equal to sps_max_sublayers_minus1. These include the HRD parameters starting from the fixed_pic_rate_general_flag[ i ] syntax element till the sublayer_hrd_parameters( i ) syntax structure immediately under the condition "if( general_vcl_hrd_params_present_flag )" in the ols_hrd_parameters syntax structure.
field_seq_flag equal to 1 indicates that the CLVS conveys pictures that represent fields.
field_seq_flag equal to 0 indicates that the CLVS conveys pictures that represent frames.
When general_frame_only_constraint_flag is equal to 1, the value of field_seq_flag shall be equal to 0.
When field_seq_flag is equal to 1, a frame-field information SEI message shall be present for every coded picture in the CLVS.
   NOTE 5 - The specified decoding process does not treat pictures that represent fields or frames differently. A sequence of pictures that represent fields would therefore be coded with the picture dimensions of an individual field. For example, pictures that represent 1080i fields would commonly have cropped output dimensions of 1920 × 540, while the sequence picture rate would commonly express the rate of the source fields (typically between 50 and 60 Hz), instead of the source frame rate (typically between 25 and 30 Hz).
vui_parameters_present_flag equal to 1 specifies that the syntax structure
vui_parameters( ) is present in the SPS RBSP syntax structure.
vui_parameters_present_flag equal to 0 specifies that the syntax structure
vui_parameters( ) is not present in the SPS RBSP syntax structure.
sps_extension_flag equal to 0 specifies that no sps_extension_data_flag syntax elements are present in the SPS RBSP syntax structure. sps_extension_flag equal to 1 specifies that there are sps_extension_data_flag syntax elements present in the SPS RBSP syntax structure.
sps_extension_data_flag may have any value. Its presence and value do not affect decoder conformance to profiles specified in this version of this Specification. Decoders conforming to this version of this Specification shall ignore all sps_extension_data_flag syntax elements.

VVC's picture parameter set (PPS) contains such information which could change from picture to picture. The PPS includes information roughly comparable what was part of the PPS in HEVC, including: 1) a self-reference; 2) initial picture control information such as initial quantization parameter (QP), a number of flags indicating the use of, or presence of, certain tools or control information in the slice header; and 3) tiling information. The syntax and the associated semantic of the sequence parameter set in current VVC draft specification is illustrated in Table 8 and Table 9, respectively. How to read the Table 8 is illustrated in the appendix section of this invention which could also be found in the VVC specification.

TABLE 8

Picture parameter set RBSP syntax

| | Descriptor |
|---|---|
| pic_parameter_set_rbsp( ) { | |
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag ) { | |
|     pps_conf_win_left_offset | ue(v) |
|     pps_conf_win_right_offset | ue(v) |
|     pps_conf_win_top_offset | ue(v) |
|     pps_conf_win_bottom_offset | ue(v) |
|   } | |
|   scaling_window_explicit_signalling_flag | u(1) |
|   if( scaling_window_explicit_signalling_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   subpic_id_mapping_in_pps_flag | u(1) |
|   if( subpic_id_mapping_in_pps_flag ) { | |

TABLE 8-continued

Picture parameter set RBSP syntax

| | Descriptor |
|---|---|
|     pps_num_subpics_minus1 | ue(v) |
|     pps_subpic_id_len_minus1 | ue(v) |
|     for( i = 0; i <= pps_num_subpic_minus1; i++ ) | |
|         pps_subpic_id[ i ] | u(v) |
| } | |
| no_pic_partition_flag | u(1) |
| if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1;i ++ ) | |
|         tile_column_width_minus1[ i ] | ue(v) |
|     for( i = 0; i <= num_exp_tile_rows_minus1; i++ ) | |
|         tile_row_height_minus1[ i ] | ue(v) |
|     if( NumTilesInPic > 1 ) | |
|         rect_slice_flag | u(1) |
|     if( rect_slice_flag ) | |
|         single_slice_per_subpic_flag | u(1) |
|     if( rect_slice_flag && !single slice_per_subpic_flag ) { | |
|         num_slices_in_pic_minus1 | ue(v) |
|         if( num_slices_in_pic_minus1 > 0 ) | |
|             tile_idx_delta_present_flag | u(1) |
|         for( i = 0; i < num_slices_in_pic_minus1; i++ ) { | |
|             if( NumTileColumns > 1 ) | |
|                 slice_width_in_tiles_minus1[ i ] | ue(v) |
|             if( NumTileRows > 1 &&  ( tile_idx_delta_present_flag \|\| | |
|                 SliceTopLeftTileIdx[ i ] % NumTileColumns  = =  0 ) ) | |
|                 slice_height_in_tiles_minus1[ i ] | ue(v) |
|             if( slice_width_in_tiles_minus1[ i ]  = =  0 && | |
|                 slice_height_in_tiles_minus1[ i ]  = =  0  && | |
|                 RowHeight[ SliceTopLeftTileIdx[ i ] / NumTileColumns ] > 1 ) | |
| { | |
|                 num_exp_slices_in_tile[ i ] | ue(v) |
|                 for( j = 0; j < num_exp_slices_in_tile[ i ]; j++ ) | |
|                     exp_slice_height_in_ctus_minus1[ i ][ j ] | ue(v) |
|                 i  +=  NumSlicesInTile[ i ] − 1 | |
|             } | |
|             if( tile idx_delta_present_flag  &&  i < | |
| num_slices_in_pic_minus1 ) | |
|                 tile_idx_delta[ i ] | se(v) |
|         } | |
|     } | |
|     loop_filter_across_tiles_enabled_flag | u(1) |
|     loop_filter_across_slices_enabled_flag | u(1) |
| } | |
| cabac_init_present_flag | u(1) |
| for( i = 0; i < 2; i++ ) | |
|     num_ref_idx_default_active_minus1[ i ] | ue(v) |
| rpl1_idx_present_flag | u(1) |
| init_qp_minus26 | se(v) |
| cu_qp_delta_enabled_flag | u(1) |
| pps_chroma_tool_offsets_present_flag | u(1) |
| if( pps_chroma_tool_offsets_present_flag ) { | |
|     pps_cb_qp_offset | se(v) |
|     pps_cr_qp_offset | se(v) |
|     pps_joint_cbcr_qp_offset_present_flag | u(1) |
|     if( pps_joint_cbcr_qp_offset_present_flag ) | |
|         pps_joint_cbcr_qp_offset_value | se(v) |
|     pps_slice_chroma_qp_offsets_present_flag | u(1) |
|     pps_cu_chroma_qp_offset_list_enabled_flag | u(1) |
| } | |
| if( pps_cu_chroma_qp_offset_list_enabled_flag ) { | |
|     chroma_qp_offset_list_len_minus1 | ue(v) |
|     for( i = 0; i  <=  chroma_qp_offset_list_len_minus1; i++ ) { | |
|         cb_qp_offset_list[ i ] | se(v) |
|         cr_qp_offset_list[ i ] | se(v) |
|         if( pps_joint_cbcr_qp_offset_present_flag ) | |
|             joint_cbcr_qp_offset_list[ i ] | se(v) |
|     } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|     deblocking_filter_override_enabled_flag | u(1) |

TABLE 8-continued

| Picture parameter set RBSP syntax | |
|---|---|
| | Descriptor |
|     pps_deblocking_filter_disabled_flag | u(1) |
|     if( !pps_deblocking_filter_disabled_flag ) { | |
|         pps_beta_offset_div2 | se(v) |
|         pps_tc_offset_div2 | se(v) |
|         pps_cb_beta_offset_div2 | se(v) |
|         pps_cb_tc_offset_div2 | se(v) |
|         pps_cr_beta_offset_div2 | se(v) |
|         pps_cr_tc_offset_div2 | se(v) |
|     } | |
|   } | |
|   rpl_info_in_ph_flag | u(1) |
|   if( deblocking_filter_override_enabled_flag ) | |
|     dbf_info_in_ph_flag | u(1) |
|   sao_info_in_ph_flag | u(1) |
|   alf_info_in_ph_flag | u(1) |
|   if( ( pps_weighted_pred_flag  \|\|  pps_weighted_bipred_flag )  && rpl_info_in_ph_flag ) | |
|     wp_info_in_ph_flag | u(1) |
|   qp_delta_info_in_ph_flag | u(1) |
|   pps_ref_wraparound_enabled_flag | u(1) |
|   if( pps_ref_wraparound_enabled_flag ) | |
|     pps_ref_wraparound_offset | ue(v) |
|   picture_header_extension_present_flag | u(1) |
|   slice_header_extension_present_flag | u(1) |
|   pps_extension_flag | u(1) |
|   if( pps_extension_flag ) | |
|     while( more_rbsp_data( ) ) | |
|         pps_extension_data_flag | u(1) |
|   rbsp_trailing_bits( ) | |
| } | |

TABLE 9

| Picture parameter set RBSP semantics |
|---|
| A PPS RBSP shall be available to the decoding process prior to it being referenced, included in at least one AU with TemporalId less than or equal to the TemporalId of the PPS NAL unit or provided through external means.<br>All PPS NAL units with a particular value of pps_pic_parameter_set_id within a PU shall have the same content.<br>pps_pic_parameter_set_id identifies the PPS for reference by other syntax elements. The value of pps_pic_parameter_set_id shall be in the range of 0 to 63, inclusive.<br>PPS NAL units, regardless of the nuh_layer_id values, share the same value space of pps_pic_parameter_set_id.<br>Let ppsLayerId be the value of the nuh_layer_id of a particular PPS NAL unit, and vclLayerId be the value of the nuh_layer_id of a particular VCL NAL unit. The particular VCL NAL unit shall not refer to the particular PPS NAL unit unless ppsLayerId is less than or equal to vclLayerId and the layer with nuh_layer_id equal to ppsLayerId is included in at least one OLS that includes the layer with nuh_layer_id equal to vclLayerId.<br>pps_seq_parameter_set_id specifies the value of sps_seq_parameter_set_id for the SPS. The value of pps_seq_parameter_set_id shall be in the range of 0 to 15, inclusive. The value of pps_seq_parameter_set_id shall be the same in all PPSs that are referred to by coded pictures in a CLVS.<br>mixed_nalu_types_in_pic_flag equal to 1 specifies that each picture referring to the PPS has more than one VCL NAL unit, the VCL NAL units do not have the same value of nal_unit_type, and the picture is not an IRAP picture. mixed_nalu_types_in_pic_flag equal to 0 specifies that each picture referring to the PPS has one or more VCL NAL units and the VCL NAL units of each picture refering to the PPS have the same value of nal_unit_type.<br>When no_mixed_nalu_types_in_pic_constraint_flag is equal to 1, the value of mixed_nalu_types_in pic_flag shall be equal to 0.<br>For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:<br>   The slice shall belong to a subpicture subpicA for which the value of the corresponding<br>   subpic_treated_as_pic_flag[ i ] is equal to 1.<br>   The slice shall not belong to a subpicture of picA containing VCL NAL units with<br>   nal_unit_type not equal to nalUnitTypeA.<br>   If nalUnitTypeA is equal to CRA, for all the following PUs following the current<br>   picture in the CLVS in decoding order and in output order, neither RefPicList[ 0 ] nor<br>   RefPicList[ 1 ] of a slice in subpicA in those PUs shall include any picture preceding<br>   picA in decoding order in an active entry. |

TABLE 9-continued

Picture parameter set RBSP semantics

Otherwise (i.e., nalUnitTypeA is equal to IDR_W_RADL or IDR_N_LP), for all the
PUs in the CLVS following the current picture in decoding order, neither
RefPicList[ 0 ] nor RefPicList[ 1 ] of a slice in subpicA in those PUs shall include any
picture preceding picA in decoding order in an active entry.
   NOTE 1
      mixed_nalu_types_in_pic_flag equal to 1 indicates that pictures referring
      to the PPS contain slices with different NAL unit types, e.g., coded pictures
      originating from a subpicture bitstream merging operation for which encoders have
      to ensure matching bitstream structure and further alignment of parameters of the
      original bitstreams. One example of such alignments is as follows: When the value
      of sps_idr_rpl_present_flag is equal to 0 and mixed_nalu_types_in_pic_flag is equal
      to 1, a picture referring to the PPS cannot have slices with nal_unit_type equal to
      IDR_W_RADL or IDR_N_LP.
pic_width_in_luma_samples specifies the width of each decoded picture referring to the
PPS in units of luma samples. pic_width_in_luma_samples shall not be equal to 0, shall be
an integer multiple of Max( 8, MinCbSizeY ), and shall be less than or equal to
pic_width_max_in_luma_samples.
When res_change_in_clvs_allowed_flag equal to 0, the value of
pic_width_in_luma_samples shall be equal to pic_width_max_in_luma_samples.
pic_height_in_luma_samples specifies the height of each decoded picture referring to the
PPS in units of luma samples. pic_height_in_luma_samples shall not be equal to 0 and
shall be an integer multiple of Max( 8, MinCbSizeY ), and shall be less than or equal to
pic_height_max_in_luma_samples.
When res_change_in_clvs_allowed_flag equal to 0, the value of
pic_height_in_luma_samples shall be equal to pic_height_max_in_luma_samples.
The variables PicWidthInCtbsY, PicHeightInCtbsY, PicSizeInCtbsY,
PicWidthInMinCbsY, PicHeightInMinCbsY, PicSizeInMinCbsY, PicSizeInSamplesY,
PicWidthInSamplesC and PicHeightInSamplesC are derived as follows:

PicWidthInCtbsY = Ceil( pic_width_in_luma_samples ÷ CtbSizeY )    (69)

PicHeightInCtbsY = Ceil( pic_height_in_luma_samples ÷ CtbSizeY )    (70)

PicSizeInCtbsY = PicWidthInCtbsY * PicHeightInCtbsY    (71)

PicWidthInMinCbsY = pic_width_in_luma_samples / MinCbSizeY    (72)

PicHeightInMinCbsY = pic_height_in_luma_samples / MinCb SizeY    (73)

PicSizeInMinCbsY = PicWidthInMinCbsY * PicHeightInMinCbsY    (74)

PicSizeInSamplesY = pic_width_in_luma_samples * pic_height_in_luma_samples    (75)

PicWidthInSamplesC = pic_width_in_luma_samples / Sub WidthC    (76)

(77)

PicHeightInSamplesC = pic_height_in_luma_samples / SubHeightC
pps_conformance_window_flag equal to 1 indicates that the conformance cropping
window offset parameters follow next in the PPS. pps_conformance_window_flag equal to
0 indicates that the conformance cropping window offset parameters are not present in the
PPS.
pps_conf_win_left_offset, pps_conf_win_right_offset, pps_conf_win_top_offset, and
pps_conf_win_bottom_offset specify the samples of the pictures in the CLVS that are
output from the decoding process, in terms of a rectangular region specified in picture
coordinates for output. When pps_conformance_window_flag is equal to 0, the values of
pps_conf_win_left_offset, pps_conf_win_right_offset, pps_conf_win_top_offset, and
pps_conf_win_bottom_offset are inferred to be equal to 0.
The conformance cropping window contains the luma samples with horizontal picture
coordinates from SubWidthC * pps_conf_win_left_offset to
pic_width_in_luma_samples − ( SubWidthC * pps_conf_win_right_offset + 1 ) and
vertical picture coordinates from SubHeightC * pps_conf_win_top_offset to
pic_height_in_luma_samples − ( SubHeightC * pps_conf_win_bottom_offset + 1 ),
inclusive.
The value of SubWidthC * ( pps_conf_win_left_offset + pps_conf_win_right_offset ) shall
be less than pic_width_in_luma_samples, and the value of
SubHeightC * (pps_conf_win_top_offset + pps_conf_win_bottom_offset ) shall be less
than pic_height_in_luma_samples.
When ChromaArrayType is not equal to 0, the corresponding specified samples of the two
chroma arrays are the samples having picture coordinates ( x / SubWidthC, y / SubHeightC ),
where ( x, y ) are the picture coordinates of the specified luma samples.
   NOTE 2
      The conformance cropping window offset parameters are only applied at the
      output. All internal decoding processes are applied to the uncropped picture size.
Let ppsA and ppsB be any two PPSs referring to the same SPS. It is a requirement of
bitstream conformance that, when ppsA and ppsB have the same the values of
pic_width_in_luma_samples and pic_height_in_luma_samples, respectively, ppsA and
ppsB shall have the same values of pps_conf_win_left_offset, pps_conf_win_right_offset,
pps_conf_win_top_offset, and pps_conf_win_bottom_offset, respectively.

TABLE 9-continued

Picture parameter set RBSP semantics

When pic_width_in_luma_samples is equal to pic_width_max_in_luma_samples and pic_height_in_luma_samples is equal to pic_height_max_in_luma_samples, it is a requirement of bitstream conformance that pps_conf_win_left_offset, pps_conf_win_right_offset, pps_conf_win_top_offset, and pps_conf_win_bottom_offset, are equal to sps_conf_win_left_offset, sps_conf_win_right_offset, sps_conf_win_top_offset, and sps_conf_win_bottom_offset, respectively.
scaling_window_explicit_signalling_flag equal to 1 specifies that the scaling window offset parameters are present in the PPS. scaling_window_explicit_signalling_flag equal to 0 specifies that the scaling window offset parameters are not present in the PPS. When res_change_in_clvs_allowed_flag is equal to 0, the value of scaling_window_explicit_signalling_flag shall be equal to 0.
scaling_win_left_offset, scaling_win_right_offset, scaling_win_top_offset, and scaling_win_bottom_offset specify the offsets that are applied to the picture size for scaling ratio calculation. When not present, the values of scaling_win_left_offset, scaling_win_right_offset, scaling_win_top_offset, and scaling_win_bottom_offset are inferred to be equal to pps_conf_win_left_offset, pps_conf_win_right_offset, pps_conf_win_top_offset, and pps_conf_win_bottom_offset, respectively.
The value of SubWidthC * ( scaling_win_left_offset + scaling_win_right_offset ) shall be less than pic_width_in_luma_samples, and the value of
SubHeightC * ( scaling_win_top_offset + scaling_win_bottom_offset ) shall be less than pic_height_in_luma_samples.
The variables PicOutputWidthL and PicOutputHeightL are derived as follows:

$$\text{PicOutputWidthL} = \text{pic\_width\_in\_luma\_samples} - \text{SubWidthC} * ( \text{scaling\_win\_right\_offset} + \text{scaling\_win\_left\_offset} ) \qquad (78)$$

$$\text{PicOutputHeightL} = \text{pic\_height\_in\_luma\_samples} - \text{SubWidthC} * ( \text{scaling\_win\_bottom\_offset} + \text{scaling\_win\_top\_offset} ) \qquad (79)$$

Let refPicOutputWidthL and refPicOutputHeightL be the PicOutputWidthL and PicOutputHeightL, respectively, of a reference picture of a current picture referring to this PPS. Is a requirement of bitstream conformance that all of the following conditions are satisfied:
  PicOutputWidthL * 2 shall be greater than or equal to refPicWidthInLumaSamples.
  PicOutputHeightL * 2 shall be greater than or equal to refPicHeightInLumaSamples.
  PicOutputWidthL shall be less than or equal to refPicWidthInLumaSamples * 8.
  PicOutputHeightL shall be less than or equal to refPicHeightInLumaSamples * 8.
  PicOutputWidthL * pic_width_max_in_luma_samples shall be greater than or equal to refPicOutputWidthL * (pic_width_in_luma_samples − Max( 8, MinCbSizeY )).
  PicOutputHeightL * pic_height_max_in_luma_samples shall be greater than or equal to refPicOutputHeightL * (pic_height_in_luma_samples − Max( 8, MinCbSizeY )).
output_flag_present_flag equal to 1 indicates that the pic_output_flag syntax element is present in PHs referring to the PPS. output_flag_present_flag equal to 0 indicates that the pic_output_flag syntax element is not present in PHs referring to the PPS.
subpic_id_mapping_in_pps_flag equal to 1 specifies that the subpicture ID mapping is signalled in the PPS. subpic_id_mapping_in_pps_flag equal to 0 specifies that the subpicture ID mapping is not signalled in the PPS. If subpic_id_mapping_explicitly_signalled_flag is 0 or subpic_id_mapping_in_sps_flag is equal to 1, the value of subpic_id_mapping_in_pps_flag shall be equal to 0. Otherwise (subpic_id_mapping_explicitly_signalled_flag is equal to 1 and subpic_id_mapping_in_sps_flag is equal to 0), the value of subpic_id_mapping_in_pps_flag shall be equal to 1.
pps_num_subpics_minus1 shall be equal to sps_num_subpics_minus1.
pps_subpic_id_len_minus1 shall be equal to sps_subpic_id_len_minus1.
pps_subpic_id[ i ] specifies the subpicture ID of the i-th subpicture. The length of the pps_subpic_id[ i ] syntax element is pps_subpic_id_len_minus1 + 1 bits.
The variable SubpicIdVal[ i ], for each value of i in the range of 0 to sps_num_subpics_minus1, inclusive, is derived as follows:

(80)

for( i = 0; i <= sps_num_subpics_minus1; i++ )
      if( subpic_id_mapping_explicitly_signalled_flag )
        SubpicIdVal[ i ] = subpic_id_mapping_in_pps_flag ? pps_subpic_id[ i ] : sps_subpic_id[ i ]
      else
        SubpicIdVal[ i ] = i It is a requirement of bitstream conformance that both of the following constraints apply:
  For any two differenty values of i and j in the range of 0 to sps_num_subpics_minus1, inclusive, SubpicIdVal[ i ] shall not be equal to SubpicIdVal[ j ].
  When the current picture is not the first picture of the CLVS, for each value of i in the range of 0 to sps_num_subpics_minus1, inclusive, if the value of SubpicIdVal[ i ] is not equal to the value of SubpicIdVal[ i ] of the previous picture in decoding order in the same layer, the nal_unit_type for all coded slice NAL units of the subpicture in the current picture with subpicture index i shall be equal to a particular value in the range of IDR_W_RADL to CRA_NUT, inclusive.
no_pic_partition_flag equal to 1 specifies that no picture partitioning is applied to each picture referring to the PPS. no_pic_partition_flag equal to 0 specifies each picture referring to the PPS may be partitioned into more than one tile or slice.
It is a requirement of bitstream conformance that the value of no_pic_partition_flag shall be the same for all PPSs that are referred to by coded pictures within a CLVS.

TABLE 9-continued

Picture parameter set RBSP semantics

It is a requirement of bitstream conformance that the value of no_pic_partition_flag shall not be equal to 1 when the value of sps_num_subpics_minus1 + 1 is greater than 1.
pps_log2_ctu_size_minus5 plus 5 specifies the luma coding tree block size of each CTU. pps_log2_ctu_size_minus5 shall be equal to sps_log2_ctu_size_minus5.
num_exp_tile_columns_minus1 plus 1 specifies the number of explicitly provided tile column widths. The value of num_exp_tile_columns_minus1 shall be in the range of 0 to PicWidthInCtbsY − 1, inclusive. When no_pic_partition_flag is equal to 1, the value of num_exp_tile_columns_minus1 is inferred to be equal to 0.
num_exp_tile_rows_minus1 plus 1 specifies the number of explicitly provided tile row heights. The value of num_exp_tile_rows_minus1 shall be in the range of 0 to PicHeightInCtbsY − 1, inclusive. When no_pic_partition_flag is equal to 1, the value of num_tile_rows_minus1 is inferred to be equal to 0.
tile_column_width_minus1[ i ] plus 1 specifies the width of the i-th tile column in units of CTBs for i in the range of 0 to num_exp_tile_columns_minus1 − 1, inclusive. tile_column_width_minus1[ num_exp_tile_columns_minus1 ] is used to derive the width of the tile columns with index greater than or equal to num_exp_tile_columns_minus1 as specified in clause 6.5.1. The value of tile_column_width_minus1 [ i ] shall be in the range of 0 to PicWidthInCtbsY v 1, inclusive. When not present, the value of tile_column_width_minus1[ 0 ] is inferred to be equal to PicWidthInCtbsY − 1.
tile_row_height_minus1[ i ] plus 1 specifies the height of the i-th tile row in units of CTBs for i in the range of 0 to num_exp_tile_rows_minus1 − 1, inclusive. tile_row_height_minus1[ num_exp_tile_rows_minus1 ] is used to derive the height of the tile rows with index greater than or equal to num_exp_tile_rows_minus1 as specified in clause 6.5.1. The value of tile_row_height_minus1 [ i ] shall be in the range of 0 to PicHeightInCtbsY − 1, inclusive. When not present, the value of tile_row_height_minus1[ 0 ] is inferred to be equal to PicHeightInCtbsY − 1.
rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag shall be equal to 1.
single_slice_per_subpic_flag equal to 1 specifies that each subpicture consists of one and only one rectangular slice. single_slice_per_subpic_flag equal to 0 specifies that each subpicture may consist of one or more rectangular slices. When not present, the value of single_slice_per_subpic_flag is inferred to be equal to 0.
slices in each picture referring to the PPS. The value of num_slices_in_pic_minus1 shall be in the range of 0 to MaxSlicesPerPicture − 1, inclusive, where MaxSlicesPerPicture is specified in Annex A. When no_pic_partition_flag is equal to 1, the value of num_slices_in_pic_minus1 is inferred to be equal to 0. When single_slice_per_subpic_flag is equal to 1, the value of num_slices_in_pic_minus1 is inferred to be equal to sps_num_subpics_minus1.
tile_idx_delta_present_flag equal to 0 specifies that tile_idx_delta[ i ] syntax elements are not present in the PPS and all pictures referring to the PPS are partitioned into rectangular slice rows and rectangular slice columns in slice raster order. tile_idx_delta_present_flag equal to 1 specifies that tile_idx_delta[ i ] syntax elements may be present in the PPS and all rectangular slices in pictures referring to the PPS are specified in the order indicated by the values of the tile_idx_delta[ i ] in increasing values of i. When not present, the value of tile_idx_delta_present_flag is inferred to be equal to 0.
slice_width_in_tiles_minus1[ i ] plus 1 specifies the width of the i-th rectangular slice in units of tile columns. The value of slice_width_in_tiles_minus1[ i ] shall be in the range of 0 to NumTileColumns − 1, inclusive.
When i is less than num_slices_in_pic_minus1 and NumTileColumns is equal to 1, the value of slice_width_in_tiles_minus1[ i ] is inferred to be equal to 0.
slice_height_in_tiles_minus1[ i ] plus 1 specifies the height of the i-th rectangular slice in units of tile rows when num_exp_slices_in_tile[ i ] is equal to 0. The value of slice_height_in_tiles_minus1 [ i ] shall be in the range of 0 to NumTileRows − 1, inclusive. When i is less than num_slices_in_pic_minus1 and slice_height_in_tiles_minus1 [ i ] is not present, it is inferred to be equal to NumTileRows  = =  1 ? 0 : slice_height_in_tiles_minus1 [ i − 1 ].
num_exp_slices_in_tile[ i ] specifies the number of explicitly provided slice heights for the slices in the tile containing the i-th slice (i.e., the tile with tile index equal to SliceTopLeftTileIdx[ i ]). The value of num_exp_slices_in_tile[ i ] shall be in the range of 0 to RowHeight[ SliceTopLeftTileIdx[ i ] / Num TileColumns ] − 1, inclusive. When not present, the value of num_exp_slices_in_tile[ i ] is inferred to be equal to 0.
  NOTE 3
  If num_exp_slices_in_tile[ i ] is equal to 0, the tile containing the i-th slice is
  not split into multiple slices. Otherwise (num_exp_slices_in_tile[ i ] is greater than 0),
  the tile containing the i-th slice may or may not be split into multiple slices.
exp_slice_height_in_ctus_minus1[ i ][ j ] plus 1 specifies the height of the j-th rectangular slice in the tile containing the i-th slice in units of CTU rows. The value of exp_slice_height_in_ctus_minus1 [ i ][ j ] shall be in the range of 0 to RowHeight[ SliceTopLeftTileIdx[ i ] / Num TileColumns ] − 1, inclusive.
tile_idx_delta[ i ] specifies the difference between the tile index of the tile containing the first CTU in the ( i + 1 )-th rectangular slice and the tile index of the tile containing the first CTU in the i-th rectangular slice. The value of tile_idx_delta[ i ] shall be in the range of − NumTilesInPic + 1 to NumTilesInPic − 1, inclusive. When not present, the value of tile_idx_delta[ i ] is inferred to be equal to 0. When present, the value of tile_idx_delta[ i ] shall not be equal to 0.

TABLE 9-continued

Picture parameter set RBSP semantics loop_filter_across_tiles_enabled_flag equal to 1 specifies that in-loop filtering operations
may be performed across tile boundaries in pictures referring to the PPS.
loop_filter_across_tiles_enabled_flag equal to 0 specifies that in-loop filtering operations
are not performed across tile boundaries in pictures referring to the PPS. The in-loop
filtering operations include the deblocking filter, sample adaptive offset filter, and adaptive
loop filter operations. When not present, the value of loop_filter_across_tiles_enabled_flag
is inferred to be equal to 1.
loop_filter_across_slices_enabled_flag equal to 1 specifies that in-loop filtering
operations may be performed across slice boundaries in pictures referring to the PPS.
loop_filter_across_slice_enabled_flag equal to 0 specifies that in-loop filtering operations
are not performed across slice boundaries in pictures referring to the PPS. The in-loop
filtering operations include the deblocking filter, sample adaptive offset filter, and adaptive
loop filter operations. When not present, the value of
loop_filter_across_slices_enabled_flag is inferred to be equal to 0.
cabac_init_present_flag equal to 1 specifies that cabac_init_flag is present in slice
headers referring to the PPS. cabac_init_present_flag equal to 0 specifies that
cabac_init_flag is not present in slice headers referring to the PPS.
num_ref_idx_default_active_minus1[ i ] plus 1, when i is equal to 0, specifies the
inferred value of the variable NumRefIdxActive[ 0 ] for P or B slices with
num_ref_idx_active_override_flag equal to 0, and, when i is equal to 1, specifies the
inferred value of NumRefIdxActive[ 1 ] for B slices with
num_ref_idx_active_override_flag equal to 0. The value of
num_ref_idx_default_active_minus1 [ i ] shall be in the range of 0 to 14, inclusive.
rpl1_idx_present_flag equal to 0 specifies that rpl_sps_flag[ 1 ] and rpl_idx[ 1 ] are not
present in the PH syntax structures or the slice headers for pictures referring to the PPS.
rpl1_idx_present_flag equal to 1 specifies that rpl_sps_flag[ 1 ] and rpl_idx[ 1 ] may be
present in the PH syntax structures or the slice headers for pictures referring to the PPS.
init_qp_minus26 plus 26 specifies the initial value of SliceQp$_Y$ for each slice referring to
the PPS. The initial value of SliceQp$_Y$ is modified at the picture level when a non-zero
value of ph_qp_delta is decoded or at the slice level when a non-zero value of
slice_qp_delta is decoded. The value of init_qp_minus26 shall be in the range of −
(26 + QpBdOffset ) to +37, inclusive.
cu_qp_delta_enabled_flag equal to 1 specifies that the
ph_cu_qp_delta_subdiv_intra_slice and ph_cu_qp_delta_subdiv_inter_slice syntax
elements are present in PHs referring to the PPS and cu_qp_delta_abs may be present in
the transform unit syntax. cu_qp_delta_enabled_flag equal to 0 specifies that the
ph_cu_qp_delta_subdiv_intra_slice and ph_cu_qp_delta_subdiv_inter_slice syntax
elements are not present in PHs referring to the PPS and cu_qp_delta_abs is not present in
the transform unit syntax.
pps_chroma_tool_offsets_present_flag equal to 1 specifies that chroma tool offsets
related syntax elements are present in the PPS RBSP syntax structure.
pps_chroma_tool_offsets_present_flag equal to 0 specifies that chroma tool offsets related
syntax elements are not present in in the PPS RBSP syntax structure. When
ChromaArrayType is equal to 0, the value of pps_chroma_tool_offsets present_flag shall
be equal to 0.
pps_cb_qp_offset and pps_cr_qp_offset specify the offsets to the luma quantization
parameter Qp'$_Y$ used for deriving Qp'$_{Cb}$ and Qp'$_{Cr}$, respectively. The values of
pps_cb_qp_offset and pps_cr_qp_offset shall be in the range of −12 to +12, inclusive.
When ChromaArray Type is equal to 0, pps_cb_qp_offset and pps_cr_qp_offset are not
used in the decoding process and decoders shall ignore their value. When not present, the
values of pps_cb_qp_offset and pps_cr_qp_offset are inferred to be equalt to 0.
pps_joint_cbcr_qp_offset_present_flag equal to 1 specifies that
pps_joint_cbcr_qp_offset_value and joint_cbcr_qp_offset_list[ i ] are present in the PPS
RBSP syntax structure. pps_joint_cbcr_qp_offset_present_flag equal to 0 specifies that
pps_joint_cbcr_qp_offset_value and joint_cbcr_qp_offset_list[ i ] are not present in the
PPS RBSP syntax structure. When ChromaArray Type is equal to 0 or
sps_joint_cbcr_enabled_flag is equal to 0, the value of
pps_joint_cbcr_qp_offset present_flag shall be equal to 0. When not present, the value of
pps_joint_cbcr_qp_offset_present_flag is inferred to be equal to 0.
pps_joint_cbcr_qp_offset_value specifies the offset to the luma quantization parameter
Qp'$_Y$ used for deriving Qp'$_{CbCr}$. The value of pps_joint_cbcr_qp_offset_value shall be in the
range of −12 to +12, inclusive. When ChromaArrayType is equal to 0 or
sps_joint_cbcr_enabled_flag is equal to 0, pps_joint_cbcr_qp_offset_value is not used in
the decoding process and decoders shall ignore its value. When
pps_joint_cbcr_qp_offset_present_flag is equal to 0, pps_joint_cbcr_qp_offset_value is not
present and is inferred to be equal to 0.
pps_slice_chroma_qp_offsets_present_flag equal to 1 specifies that the
slice_cb_qp_offset and slice_cr_qp_offset syntax elements are present in the associated
slice headers. pps_slice_chroma_qp_offsets_present_flag equal to 0 specifies that the
slice_cb_qp_offset and slice_cr_qp_offset syntax elements are not present in the associated
slice headers. When not present, the value of pps_slice_chroma_qp_offsets_present_flag is
inferred to be equal to 0.
pps_cu_chroma_qp_offset_list_enabled_flag equal to 1 specifies that the
ph_cu_chroma_qp_offset_subdiv_intra_slice and
ph_cu_chroma_qp_offset_subdiv_inter_slice syntax elements are present in PHs referring
to the PPS and cu_chroma_qp_offset_flag may be present in the transform unit syntax and
the palette coding syntax. pps_cu_chroma_qp_offset_list_enabled_flag equal to 0 specifies
that the ph_cu_chroma_qp_offset_subdiv_intra slice and TABLE 9-continued Picture parameter set RBSP semantics ph_cu_chroma_qp_offset_subdiv_inter_slice syntax elements are not present in PHs
referring to the PPS and the cu_chroma_qp_offset_flag is not present in the transform unit
syntax and the palette coding syntax. When not present, the value of
pps_cu_chroma_qp_offset_list_enabled_flag is inferred to be equal to 0.
chroma_qp_offset_list_len_minus1 plus 1 specifies the number of cb_qp_offset_list[ i ],
cr_qp_offset_list[ i ], and joint_cbcr_qp_offset_list[ i ], syntax elements that are present in
the PPS RBSP syntax structure. The value of chroma_qp_offset_list_len_minus1 shall be
in the range of 0 to 5, inclusive.
cb_qp_offset_list[ i ],cr_qp_offset_list[ i ], and joint_cbcr_qp_offset_list[ i ], specify
offsets used in the derivation of $Qp'_{Cb}$, $Qp'_{Cr}$, and $Qp'_{CbCr}$, respectively. The values of
cb_qp_offset_list[ i ], cr_qp_offset_list[ i ], and joint_cbcr_qp_offset_list[ i ] shall be in the
range of −12 to +12, inclusive. When pps_joint_cbcr_qp_offset_present_flag is equal to 0,
joint_cbcr_qp_offset_list[ i ] is not present and it is inferred to be equal to 0.
pps_weighted_pred_flag equal to 0 specifies that weighted prediction is not applied to P
slices referring to the PPS. pps_weighted_pred_flag equal to 1 specifies that weighted
prediction is applied to P slices referring to the PPS. When sps_weighted_pred_flag is
equal to 0, the value of pps_weighted_pred_flag shall be equal to 0.
pps_weighted_bipred_flag equal to 0 specifies that explicit weighted prediction is not
applied to B slices referring to the PPS. pps_weighted_bipred_flag equal to 1 specifies that
explicit weighted prediction is applied to B slices referring to the PPS. When
sps_weighted_bipred_flag is equal to 0, the value of pps_weighted_bipred_flag shall be
equal to 0.
deblocking_filter_control_present_flag equal to 1 specifies the presence of deblocking
filter control syntax elements in the PPS. deblocking_filter_control_present_flag equal to 0
specifies the absence of deblocking filter control syntax elements in the PPS.
deblocking_filter_override_enabled_flag equal to 1 specifies the presence of
ph_deblocking_filter_override_flag in the PHs referring to the PPS or
slice_deblocking_filter_override_flag in the slice headers referring to the PPS.
deblocking_filter_override_enabled_flag equal to 0 specifies the absence of
ph_deblocking_filter_override_flag in PHs referring to the PPS or
slice_deblocking_filter_override_flag in slice headers referring to the PPS. When not
present, the value of deblocking_filter_override_enabled_flag is inferred to be equal to 0.
pps_deblocking_filter_disabled_flag equal to 1 specifies that the operation of deblocking
filter is not applied for slices referring to the PPS in which
slice_deblocking_filter_disabled_flag is not present. pps_deblocking_filter_disabled_flag
equal to 0 specifies that the operation of the deblocking filter is applied for slices referring
to the PPS in which slice_deblocking_filter_disabled_flag is not present. When not present,
the value of pps_deblocking_filter_disabled_flag is inferred to be equal to 0.
pps_beta_offset_div2 and pps_tc_offset_div2 specify the default deblocking parameter
offsets for β and tC (divided by 2) that are applied to the luma component for slices
referring to the PPS, unless the default deblocking parameter offsets are overridden by the
deblocking parameter offsets present in the picture headers or the slice headers of the slices
referring to the PPS. The values of pps_beta_offset_div2 and pps_tc_offset_div2 shall both
be in the range of −12 to 12, inclusive. When not present, the values of
pps_beta_offset_div2 and pps_tc_offset_div2 are both inferred to be equal to 0.
pps_cb_beta_offset_div2 and pps_cb_tc_offset_div2 specify the default deblocking
parameter offsets for β and tC (divided by 2) that are applied to the Cb component for
slices referring to the PPS, unless the default deblocking parameter offsets are overridden
by the deblocking parameter offsets present in the picture headers or the slice headers of
the slices referring to the PPS. The values of pps_cb_beta_offset_div2 and
pps_cb_tc_offset_div2 shall both be in the range of −12 to 12, inclusive. When not present,
the values of pps_cb_beta_offset_div2 and pps_cb_tc_offset_div2 are both inferred to be
equal to 0.
pps_cr_beta_offset_div2 and pps_cr_tc_offset_div2 specify the default deblocking
parameter offsets for β and tC (divided by 2) that are applied to the Cr component for slices
referring to the PPS, unless the default deblocking parameter offsets are overridden by the
deblocking parameter offsets present in the picture headers or the slice headers of the slices
referring to the PPS. The values of pps_cr_beta_offset_div2 and pps_cr_tc_offset_div2
shall both be in the range of −12 to 12, inclusive. When not present, the values of
pps_cr_beta_offset_div2 and pps_cr_tc_offset_div2 are both inferred to be equal to 0.
rpl_info_in_ph_flag equal to 1 specifies that reference picture list information is present
in the PH syntax structure and not present in slice headers referring to the PPS that do not
contain a PH syntax structure. rpl_info_in_ph_flag equal to 0 specifies that reference
picture list information is not present in the PH syntax structure and may be present in slice
headers referring to the PPS that do not contain a PH syntax structure.
dbf_info_in_ph_flag equal to 1 specifies that deblocking filter information is present in
the PH syntax structure and not present in slice headers referring to the PPS that do not
contain a PH syntax structure. dbf_info_in_ph_flag equal to 0 specifies that deblocking
filter information is not present in the PH syntax structure and may be present in slice
headers referring to the PPS that do not contain a PH syntax structure. When not present,
the value of dbf_info_in_ph_flag is inferred to be equal to 0.
sao_info_in_ph_flag equal to 1 specifies that SAO filter information is present in the PH
syntax structure and not present in slice headers referring to the PPS that do not contain a
PH syntax structure. sao_info_in_ph_flag equal to 0 specifies that SAO filter information
is not present in the PH syntax structure and may be present in slice headers referring to the
PPS that do not contain a PH syntax structure.
alf_info_in_ph_flag equal to 1 specifies that ALF information is present in the PH syntax
structure and not present in slice headers referring to the PPS that do not contain a PH TABLE 9-continued Picture parameter set RBSP semantics syntax structure. alf_info_in_ph_flag equal to 0 specifies that ALF information is not present in the PH syntax structure and may be present in slice headers referring to the PPS that do not contain a PH syntax structure.
wp_info_in_ph_flag equal to 1 specifies that weighted prediction information may be present in the PH syntax structure and not present in slice headers referring to the PPS that do not contain a PH syntax structure. wp_info_in_ph_flag equal to 0 specifies that weighted prediction information is not present in the PH syntax structure and may be present in slice headers referring to the PPS that do not contain a PH syntax structure. When not present, the value of wp_info_in_ph_flag is inferred to be equal to 0.
qp_delta_info_in_ph_flag equal to 1 specifies that QP delta information is present in the PH syntax structure and not present in slice headers referring to the PPS that do not contain a PH syntax structure. qp_delta_info_in_ph_flag equal to 0 specifies that QP delta information is not present in the PH syntax structure and may be present in slice headers referring to the PPS that do not contain a PH syntax structure.
pps_ref_wraparound_enabled_flag equal to 1 specifies that horizontal wrap-around motion compensation is applied in inter prediction. pps_ref_wraparound_enabled_flag equal to 0 specifies that horizontal wrap-around motion compensation is not applied. When the value of CtbSizeY / MinCbSizeY + 1 is greater than pic_width_in_luma_samples / MinCbSizeY − 1, the value of pps_ref_wraparound_enabled_flag shall be equal to 0. When sps_ref_wraparound_enabled_flag is equal to 0, the value of pps_ref_wraparound_enabled_flag shall be equal to 0.
pps_ref_wraparound_offset plus ( CtbSizeY / MinCbSizeY ) + 2 specifies the offset used for computing the horizontal wrap-around position in units of MinCbSizeY luma samples. The value of pps_ref_wraparound_offset shall be in the range of 0 to ( pic_width_in_luma_samples / MinCbSizeY ) − ( CtbSizeY / MinCbSizeY ) − 2, inclusive.
The variable PpsRefWraparoundOffset is set equal to pps_ref_wraparound_offset+( CtbSizeY / MinCbSizeY ) + 2.
picture_header_extension_present_flag equal to 0 specifies that no PH extension syntax elements are present in PHs referring to the PPS. picture_header_extension_present_flag equal to 1 specifies that PH extension syntax elements are present in PHs referring to the PPS. picture_header_extension_present_flag shall be equal to 0 in bitstreams conforming to this version of this Specification.
slice_header_extension_present_flag equal to 0 specifies that no slice header extension syntax elements are present in the slice headers for coded pictures referring to the PPS. slice_header_extension_present_flag equal to 1 specifies that slice header extension syntax elements are present in the slice headers for coded pictures referring to the PPS. slice_header_extension present_flag shall be equal to 0 in bitstreams conforming to this version of this Specification.
pps_extension_flag equal to 0 specifies that no pps_extension_data_flag syntax elements are present in the PPS RBSP syntax structure. pps_extension_flag equal to 1 specifies that there are pps_extension_data_flag syntax elements present in the PPS RBSP syntax structure.
pps_extension_data_flag may have any value. Its presence and value do not affect decoder conformance to profiles specified in this version of this Specification. Decoders conforming to this version of this Specification shall ignore all pps_extension_data_flag syntax elements.

The slice header contains information that can change from slice to slice, as well as such picture-related information that is relatively small or relevant only for a certain slice or picture types. The size of the slice header may be noticeably bigger than the PPS, particular when there are tile or wavefront entry point offsets in the slice header and RPS, prediction weights, or reference picture list modifications are explicitly signaled. The syntax and the associated semantic of the sequence parameter set in the current VVC draft specification are illustrated in Table 10 and Table 11, respectively. How to read Table 10 is illustrated in the appendix section of this invention, which could also be found in the VVC specification.

TABLE 10

| Picture header structure syntax | |
|---|---|
| | Descriptor |
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |

TABLE 10-continued

Picture header structure syntax

| | Descriptor |
|---|---|
|   no_output_of_prior_pics_flag | u(1) |
| if( gdr_pic_flag ) | |
|   recovery_poc_cnt | ue(v) |
| for( i = 0; i < Num_ExtraPhBits; i++ ) | |
|   ph_extra_bit[ i ] | u(1) |
| if( sps_poc_msb_flag ) { | |
|   ph_poc_msb_present_flag | u(1) |
|   if( ph_poc_msb_present_flag ) | |
|     poc_msb_val | u(v) |
| } | |
| if( sps_alf_enabled_flag  &&  alf_info_in_ph_flag ) { | |
|   ph_alf_enabled_flag | u(1) |
|   if( ph_alf_enabled_flag ) { | |
|     ph_num_alf_aps_ids_luma | u(3) |
|     for( i = 0; i < ph_num_alf_aps_ids_luma; i++ ) | |
|       ph_alf_aps_id_luma[ i ] | u(3) |
|     if( ChromaArrayType  !=  0 ) | |
|       ph_alf_chroma_idc | u(2) |
|     if( ph_alf_chroma_idc > 0 ) | |
|       ph_alf_aps_id_chroma | u(3) |
|     if( sps_ccalf_enabled_flag ) { | |
|       ph_cc_alf_cb_enabled_flag | u(1) |
|       if( ph_cc_alf_cb_enabled_flag ) | |
|         ph_cc_alf_cb_aps_id | u(3) |
|       ph_cc_alf_cr_enabled_flag | u(1) |
|       if( ph_cc_alf_cr_enabled_flag ) | |
|         ph_cc_alf_cr_aps_id | u(3) |
|     } | |
|   } | |
| } | |
| if( sps_lmcs_enabled_flag ) { | |
|   ph_lmcs_enabled_flag | u(1) |
|   if( ph_lmcs_enabled_flag ) { | |
|     ph_lmcs_aps_id | u(2) |
|     if( ChromaArrayType  !=  0 ) | |
|       ph_chroma_residual_scale_flag | u(1) |
|   } | |
| } | |
| if( sps_scaling_list_enabled_flag ) { | |
|   ph_scaling_list_present_flag | u(1) |
|   if( ph_scaling_list_present_flag ) | |
|     ph_scaling_list_aps_id | u(3) |
| } | |
| if( sps_virtual_boundaries_enabled_flag  && !sps_virtual_boundaries_present_flag ) { | |
|   ph_virtual_boundaries_present_flag | u(1) |
|   if( ph_virtual_boundaries_present_flag ) { | |
|     ph_num_ver_virtual_boundaries | u(2) |
|     for( i = 0; i < ph_num_ver_virtual_boundaries; i++ ) | |
|       ph_virtual_boundaries_pos_x[ i ] | u(13) |
|     ph_num_hor_virtual_boundaries | u(2) |
|     for( i = 0; i < ph_num_hor_virtual_boundaries; i++ ) | |
|       ph_virtual_boundaries_pos_y[ i ] | u(13) |
|   } | |
| } | |
| if( output_flag_present_flag ) | |
|   pic_output_flag | u(1) |
| if( rpl_info_in_ph_flag ) | |
|   ref_pic_lists( ) | |
| if( partition_constraints_override_enabled_flag ) | |
|   partition_constraints_override_flag | u(1) |
| if( ph_intra_slice_allowed_flag ) { | |
|   if( partition_constraints_override_flag ) { | |
|     ph_log2_diff_min_qt_min_cb_intra_slice_luma | ue(v) |
|     ph_max_mtt_hierarchy_depth_intra_slice_luma | ue(v) |
|     if( ph_max_mtt_hierarchy_depth_intra_slice_luma  !=  0 ) { | |
|       ph_log2_diff_max_bt_min_qt_intra_slice_luma | ue(v) |
|       ph_log2_diff_max_tt_min_qt_intra_slice_luma | ue(v) |
|     } | |
|     if( qtbtt_dual_tree_intra_flag ) { | |
|       ph_log2_diff_min_qt_min_cb_intra_slice_chroma | ue(v) |
|       ph_max_mtt_hierarchy_depth_intra_slice_chroma | ue(v) |
|       if( ph_max_mtt_hierarchy_depth_intra_slice_chroma  !=  0 ) { | |
|         ph_log2_diff_max_bt_min_qt_intra_slice_chroma | ue(v) |
|         ph_log2_diff_max_tt_min_qt_intra_slice_chroma | ue(v) |
|       } | |

TABLE 10-continued

Picture header structure syntax

| | Descriptor |
|---|---|
|     } | |
|   } | |
|   if( cu_qp_delta_enabled_flag ) | |
|     ph_cu_qp_delta_subdiv_intra_slice | ue(v) |
|   if( pps_cu_chroma_qp_offset_list_enabled_flag ) | |
|     ph_cu_chroma_qp_offset_subdiv_intra_slice | ue(v) |
| } | |
| if( ph_inter_slice_allowed_flag ) { | |
|   if( partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( cu_qp_delta_enabled_flag ) | |
|     ph_cu_qp_delta_subdiv_inter_slice | ue(v) |
|   if( pps_cu_chroma_qp_offset_list_enabled_flag ) | |
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && rpl_info_in_ph_flag ) { | |
|       ph_collocated_from_l0_flag | u(1) |
|       if( (ph_collocated_from_l0_flag && | |
|         num_ref_entries[ 0 ][ RplsIdx[ 0 ] ] > 1 ) \|\| | |
|         ( !ph_collocated_from_l0_flag && | |
|         num_ref_entries[ 1 ][ RplsIdx[ 1 ] ] > 1 ) ) | |
|       ph_collocated_ref_idx | ue(v) |
|     } | |
|   } | |
|   mvd_l1_zero_flag | u(1) |
|   if( sps_fpel_mmvd_enabled_flag ) | |
|     ph_fpel_mmvd_enabled_flag | u(1) |
|   if( sps_bdof_pic_present_flag ) | |
|     ph_disable_bdof_flag | u(1) |
|   if( sps_dmvr_pic_present_flag ) | |
|     ph_disable_dmvr_flag | u(1) |
|   if( sps_prof_pic_present_flag ) | |
|     ph_disable_prof_flag | u(1) |
|   if( ( pps_weighted_pred_flag \|\| pps_weighted_bipred_flag ) && wp_info_in_ph_flag ) | |
|     pred_weight_table( ) | |
| } | |
| if( qp_delta_info_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( sps_dep_quant_enabled_flag ) | |
|   ph_dep_quant_enabled_flag | u(1) |
| if( sps_sign_data_hiding_enabled_flag && !ph_dep_quant_enabled_flag ) | |
|   pic_sign_data_hiding_enabled_flag | u(1) |
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |
|     } | |
|   } | |
| } | |
| if( picture_header_extension_present_flag ) { | |
|   ph_extension_length | ue(v) |
|   for( i = 0; i < ph_extension_length; i++) | |

TABLE 10-continued

| Picture header structure syntax | |
|---|---|
| | Descriptor |
|     ph_extension_data_byte[ i ]<br>  }<br>} | u(8) |

TABLE 11

| Picture header structure semantics |
|---|

The PH syntax structure contains information that is common for all slices of the coded picture associated with the PH syntax structure.
gdr_or_irap_pic_flag equal to 1 specifies that the current picture is a GDR or IRAP picture. gdr_or_irap_pic_flag equal to 0 specifies that the current picture may or may not be a GDR or IRAP picture.
gdr_pic_flag equal to 1 specifies the picture associated with the PH is a GDR picture. gdr pic_flag equal to 0 specifies that the picture associated with the PH is not a GDR picture. When not present, the value of gdr_pic_flag is inferred to be equal to 0. When gdr_enabled_flag is equal to 0, the value of gdr pic_flag shall be equal to 0.
ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1.
ph_intra_slice_allowed_flag equal to 0 specifies that all coded slices of the picture have slice_type equal to 0 or 1. ph_intra_slice_allowed_flag equal to 1 specifies that there may or may not be one or more coded slices in the picture that have slice_type equal to 2. When not present, the value of ph_intra_slice_allowed_flag is inferred to be equal to 1.
    NOTE 1 - For bitstreams that are suppposed to work subpicure based bitstream merging without the need of changing PH NAL units, the encoder is expected to set the values of both ph_inter_slice_allowed_flag and ph_intra_slice_allowed_flag equal to 1.
    non_reference_picture_flag equal to 1 specifies the picture associated with the PH is never used as a reference picture. non_reference_picture_flag equal to 0 specifies the picture associated with the PH may or may not be used as a reference picture.
ph_pic_parameter_set_id specifies the value of pps_pic_parameter_set_id for the PPS in use. The value of ph_pic_parameter_set_id shall be in the range of 0 to 63, inclusive.
It is a requirement of bitstream conformance that the value of TemporalId of the PH shall be greater than or equal to the value of TemporalId of the PPS that has pps_pic_parameter_set_id equal to ph_pic_parameter_set_id.
ph_pic_order_cnt_lsb specifies the picture order count modulo MaxPicOrderCntLsb for the current picture. The length of the ph_pic_order_cnt_lsb syntax element is log2_max_pic_order_cnt_lsb_minus4 + 4 bits. The value of the ph_pic_order_cnt_lsb shall be in the range of 0 to MaxPicOrderCntLsb − 1, inclusive.
no_output_of_prior_pics_flag affects the output of previously-decoded pictures in the DPB after the decoding of a CLVSS picture that is not the first picture in the bitstream as specified in Annex C.
recovery_poc_cnt specifies the recovery point of decoded pictures in output order. If the current picture is a GDR picture that is associated with the PH, and there is a picture picA that follows the current GDR picture in decoding order in the CLVS that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb − 1, inclusive.
When the current picture is a GDR picture, the variable RpPicOrderCntVal is derived as follows:
$$RpPicOrderCntVal = PicOrderCntVal + recovery\_poc\_cnt \quad (81)$$
    NOTE 2 - When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.
ph_extra_bit[ i ] may be equal to 1 or 0. Decoders conforming to this version of this Specification shall ignore the value of ph_extra_bit[ i ]. Its value does not affect decoder conformance to profiles specified in this version of specification.
ph_poc_msb_present_flag equal to 1 specifies that the syntax element poc_msb_val is present in the PH. ph_poc_msb_present_flag equal to 0 specifies that the syntax element poc_msb_val is not present in the PH. When vps_independent_layer_flag[ GeneralLayerIdx[ nuh_layer_id ] ]is equal to 0 and there is a picture in the current AU in a reference layer of the current layer, the value of ph_poc_msb_present_flag shall be equal to 0.
poc_msb_val specifies the POC MSB value of the current picture. The length of the syntax element poc_msb_val is poc_msb_len_minus1 + 1 bits.
ph_alf_enabled_flag equal to 1 specifies that adaptive loop filter is enabled for all slices associated with the PH and may be applied to Y, Cb, or Cr colour component in the TABLE 11-continued Picture header structure semantics slices. ph_alf_enabled_flag equal to 0 specifies that adaptive loop filter may be disabled for
one, or more, or all slices associated with the PH. When not present, ph_alf_enabled_flag
is inferred to be equal to 0.
ph_num_alf_aps_ids_luma specifies the number of ALF APSs that the slices associated
with the PH refers to.
ph_alf_aps_id_luma[ i ] specifies the adaptation_parameter_set_id of the i-th ALF APS
that the luma component of the slices associated with the PH refers to.
The value of alf_luma_filter_signal_flag of the APS NAL unit having aps_params_type
equal to ALF_APS and adaptation_parameter_set_id equal to ph_alf_aps_id_luma[ i ] shall
be equal to 1.
The TemporalId of the APS NAL unit having aps_params_type equal to ALF_APS and
adaptation_parameter_set_id equal to ph_alf_aps_id_luma[ i ] shall be less than or equal to
the TemporalId of the picture associated with the PH.
ph_alf_chroma_idc equal to 0 specifies that the adaptive loop filter is not applied to Cb
and Cr colour components. ph_alf_chroma_idc equal to 1 indicates that the adaptive loop
filter is applied to the Cb colour component. ph_alf_chroma_idc equal to 2 indicates that
the adaptive loop filter is applied to the Cr colour component. ph_alf_chroma_idc equal to
3 indicates that the adaptive loop filter is applied to Cb and Cr colour components. When
ph_alf_chroma_idc is not present, it is inferred to be equal to 0.
ph_alf_aps_id_chroma specifies the adaptation_parameter_set_id of the ALF APS that
the chroma component of the slices associated with the PH refers to.
The value of alf_chroma_filter_signal_flag of the APS NAL unit having aps_params_type
equal to ALF_APS and adaptation_parameter_set_id equal to ph_alf_aps_id_chroma shall
be equal to 1.
The TemporalId of the APS NAL unit having aps_params_type equal to ALF_APS and
adaptation_parameter_set_id equal to ph_alf_aps_id_chroma shall be less than or equal to
the TemporalId of the picture associated with the PH.
ph_cc_alf_cb_enabled_flag equal to 1 specifies that cross-component filter for Cb colour
component is enabled for all slices associated with the PH and may be applied to Cb colour
component in the slices. ph_cc_alf_cb_enabled_flag equal to 0 specifies that cross-
component filter for Cb colour component may be disabled for one, or more, or all slices
associated with the PH. When not present, ph_cc_alf_cb_enabled_flag is inferred to be
equal to 0.
ph_cc_alf_cb_aps_id specifies the adaptation_parameter_set_id of the ALF APS that the
Cb colour component of the slices associated with the PH refers to.
The value of alf_cc_cb_filter_signal_flag of the APS NAL unit having aps_params_type
equal to ALF_APS and adaptation_parameter_set_id equal to ph_cc_alf_cb_aps_id shall
be equal to 1.
The TemporalId of the APS NAL unit having aps_params_type equal to ALF_APS and
adaptation_parameter_set_id equal to ph_cc_alf_cb_aps_id shall be less than or equal to
the TemporalId of the picture associated with the PH.
ph_cc_alf_cr_enabled_flag equal to 1 specifies that cross-compoent filter for Cr colour
component is enabled for all slices associated with the PH and may be applied to Cr colour
component in the slices. ph_cc_alf_cr_enabled_flag equal to 0 specifies that cross-
component filter for Cr colour component may be disabled for one, or more, or all slices
associated with the PH. When not present, ph_cc_alf_cr_enabled_flag is inferred to be
equal to 0.
ph_cc_alf_cr_aps_id specifies the adaptation_parameter_set_id of the ALF APS that the
Cr colour component of the slices associated with the PH refers to.
The value of alf_cc_cr_filter_signal flag of the APS NAL unit having aps_params_type
equal to ALF_APS and adaptation parameter_set_id equal to ph_cc_alf_cr_aps_id shall be
equal to 1.
The TemporalId of the APS NAL unit having aps_params_type equal to ALF_APS and
adaptation_parameter_set_id equal to ph_cc_alf_cr_aps_id shall be less than or equal to the
TemporalId of the picture associated with the PH.
ph_lmcs_enabled_flag equal to 1 specifies that luma mapping with chroma scaling is
enabled for all slices associated with the PH. ph_lmcs_enabled_flag equal to 0 specifies
that luma mapping with chroma scaling may be disabled for one, or more, or all slices
associated with the PH. When not present, the value of ph_lmcs_enabled_flag is inferred to
be equal to 0.
ph_lmcs_aps_id specifies the adaptation_parameter_set_id of the LMCS APS that the
slices associated with the PH refers to. The TemporalId of the APS NAL unit having
aps_params_type equal to LMCS_APS and adaptation_parameter_set_id equal to
ph_lmcs_aps_id shall be less than or equal to the TemporalId of the picture associated with
PH.
ph_chroma_residual_scale_flag equal to 1 specifies that chroma residual scaling is
enabled for the all slices associated with the PH. ph_chroma_residual_scale_flag equal to 0
specifies that chroma residual scaling may be disabled for one, or more, or all slices
associated with the PH. When ph_chroma_residual_scale_flag is not present, it is inferred
to be equal to 0.
ph_scaling_list_present_flag equal to 1 specifies that the scaling list data used for the
slices associated with the PH is derived based on the scaling list data contained in the
referenced scaling list APS. ph_scaling_list_present_flag equal to 0 specifies that the
scaling list data used for the slices associated with the PH is set to be equal to 16. When not
present, the value of ph_scaling_list_present_flag is inferred to be equal to 0.
ph_scaling_list_aps_id specifies the adaptation_parameter_set_id of the scaling list APS.
The TemporalId of the APS NAL unit having aps_params_type equal to SCALING_APS
and adaptation_parameter_set_id equal to ph_scaling_list_aps_id shall be less than or equal TABLE 11-continued Picture header structure semantics to the TemporalId of the picture associated with PH.
ph_virtual_boundaries_present_flag equal to 1 specifies that information of virtual
boundaries is signalled in the PH. ph_virtual_boundaries_present_flag equal to 0 specifies
that information of virtual boundaries is not signalled in the PH. When there is one or more
than one virtual boundaries signalled in the PH, the in-loop filtering operations are disabled
across the virtual boundaries in the picture. The in-loop filtering operations include the
deblocking filter, sample adaptive offset filter, and adaptive loop filter operations. When
not present, the value of ph_virtual_boundaries_present_flag is inferred to be equal to 0.
It is a requirement of bitstream conformance that, when subpic_info_present_flag is equal
to 1, the value of ph_virtual_boundaries_present_flag shall be equal to 0.
The variable VirtualBoundariesPresentFlag is derived as follows:
   VirtualBoundariesPresentFlag = 0
   if( sps_virtual_boundaries_enabled_flag )
     VirtualBoundariesPresentFlag = sps_virtual_boundaries_present_flag | |
       ph_virtual_boundaries_present_flag
    (82)
ph_num_ver_virtual_boundaries specifies the number of
ph_virtual_boundaries_pos_x[ i ] syntax elements that are present in the PH. When
ph_num_ver_virtual_boundaries is not present, it is inferred to be equal to 0.
The variable NumVerVirtualBoundaries is derived as follows:
   Num VerVirtualBoundaries = 0
   if( sps_virtual_boundaries_enabled_flag )
     Num Ver VirtualBoundaries = sps_virtual_boundaries_present_flag ?
       sps_num_ver_virtual_boundaries : ph_num_ver_virtual_boundaries (83)
ph_virtual_boundaries_pos_x[ i ] specifies the location of the i-th vertical virtual
boundary in units of luma samples divided by 8. The value of
ph_virtual_boundaries_pos_x[ i ] shall be in the range of 1 to
Ceil( pic_width_in_luma_samples + 8 ) − 1, inclusive.
The list VirtualBoundariesPosX[ i ] for i ranging from 0 to Num VerVirtualBoundaries − 1,
inclusive, in units of luma samples, specifying the locations of the vertical virtual
boundaries, is derived as follows:
   for( i = 0; i < Num Ver VirtualBoundaries; i++)
     VirtualBoundariesPosX[ i ] = ( sps_virtual_boundaries_present_flag ?
       sps_virtual_boundaries_pos_x[ i ] : ph_virtual_boundaries_pos_x[ i ]
   ) * 8 (84)
The distance between any two vertical virtual boundaries shall be greater than or equal to
CtbSizeY luma samples.
ph_num_hor_virtual_boundaries specifies the number of
ph_virtual_boundaries_pos_y[ i ] syntax elements that are present in the PH. When
ph_num_hor_virtual_boundaries is not present, it is inferred to be equal to 0.
The parameter NumHorVirtualBoundaries is derived as follows:
   NumHorVirtualBoundaries = 0
   if( sps_virtual_boundaries_enabled_flag )
     NumHor VirtualBoundaries = sps_virtual_boundaries_present_flag ?
       sps_num_hor_virtual_boundaries : ph_num_hor_virtual_boundaries     (85)
When sps_virtual_boundaries_enabled_flag is equal to 1 and
ph_virtual_boundaries_present_flag is equal to 1, the sum of
ph_num_ver_virtual_boundaries and ph_num_hor_virtual_boundaries shall be greater than
0.
ph_virtual_boundaries_pos_y[ i ] specifies the location of the i-th horizontal virtual
boundary in units of luma samples divided by 8. The value of
ph_virtual_boundaries_pos_y[ i ] shall be in the range of 1 to
Ceil( pic_height_in_luma_samples +8) − 1, inclusive.
The list VirtualBoundariesPosY[ i ] for i ranging from 0 to NumHorVirtualBoundaries − 1,
inclusive, in units of luma samples, specifying the locations of the horizontal virtual
boundaries, is derived as follows:
   for( i = 0; i < NumHor VirtualBoundaries; i++)
     VirtualBoundariesPosY[ i ] = ( sps_virtual_boundaries present_flag ?
       sps_virtual_boundaries pos_y[ i ] :
   ph_virtual_boundaries_pos_y[ i ] ) * 8 (86)
The distance between any two horizontal virtual boundaries shall be greater than or equal
to CtbSizeY luma samples.
pic_output_flag affects the decoded picture output and removal processes as specified in
Annex C. When pic_output_flag is not present, it is inferred to be equal to 1.
partition_constraints_override_flag equal to 1 specifies that partition constraint
parameters are present in the PH. partition_constraints_override_flag equal to 0 specifies
that partition constraint parameters are not present in the PH. When not present, the value
of partition_constraints_override_flag is inferred to be equal to 0.
ph_log2_diff_min_qt_min_cb_intra_slice_luma specifies the difference between the
base 2 logarithm of the minimum size in luma samples of a luma leaf block resulting from
quadtree splitting of a CTU and the base 2 logarithm of the minimum coding block size in
luma samples for luma CUs in the slices with slice_type equal to 2 (I) associated with the
PH. The value of ph_log2_diff_min_qt_min_cb_intra_slice_luma shall be in the range of 0
to CtbLog2SizeY − MinCbLog2SizeY, inclusive. When not present, the value of
ph_log2_diff_min_qt_min_cb_luma is inferred to be equal to
sps_log2_diff_min_qt_min_cb_intra_slice_luma.
ph_max_mtt_hierarchy_depth_intra_slice_luma specifies the maximum hierarchy
depth for coding units resulting from multi-type tree splitting of a quadtree leaf in slices

TABLE 11-continued

Picture header structure semantics with slice_type equal to 2 (I) associated with the PH. The value of ph_max_mtt_hierarchy_depth_intra_slice_luma shall be in the range of 0 to 2*( CtbLog2SizeY − MinCbLog2SizeY ), inclusive. When not present, the value of ph_max_mtt_hierarchy_depth_intra slice_luma is inferred to be equal to sps_max_mtt_hierarchy_depth_intra_slice_luma.
ph_log2_diff_max_bt_min_qt_intra_slice_luma specifies the difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) associated with the PH. The value of ph_log2_diff_max_bt_min_qt_intra_slice_luma shall be in the range of 0 to CtbLog2SizeY − MinQtLog2SizeIntraY, inclusive. When not present, the value of ph_log2_diff_max_bt_min_qt_intra_slice luma is inferred to be equal to sps_log2_diff_max_bt_min_qt_intra_slice_luma.
ph_log2_diff_max_tt_min_qt_intra_slice_luma specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) associated with the PH. The value of ph_log2_diff_max_tt_min_qt_intra_slice_luma shall be in the range of 0 to CtbLog2SizeY − MinQtLog2SizeIntraY, inclusive. When not present, the value of ph_log2_diff_max_tt_min_qt_intra_slice_luma is inferred to be equal to sps_log2_diff_max_tt_min_qt_intra_slice luma.
ph_log2_diff_min_qt_min_cb_intra_slice_chroma specifies the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) associated with the PH. The value of ph_log2_diff_min_qt_min_cb_intra_slice_chroma shall be in the range of 0 to CtbLog2SizeY − MinCbLog2SizeY, inclusive. When not present, the value of ph_log2_diff_min_qt_min_cb_intra_slice_chroma is inferred to be equal to sps_log2_diff_min_qt_min_cb_intra_slice_chroma.
ph_max_mtt_hierarchy_depth_intra_slice_chroma specifies the maximum hierarchy depth for chroma coding units resulting from multi-type tree splitting of a chroma quadtree leaf with treeType equal to DUAL_TREE_CHROMA in slices with slice_type equal to 2 (I) associated with the PH. The value of ph_max_mtt_hierarchy_depth_intra_slice_chroma shall be in the range of 0 to 2*( CtbLog2SizeY − MinCbLog2SizeY ), inclusive. When not present, the value of ph_max_mtt_hierarchy_depth_intra_slice_chroma is inferred to be equal to sps_max_mtt_hierarchy_depth_intra_slice_chroma.
ph_log2_diff_max_bt_min_qt_intra_slice_chroma specifies the difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) associated with the PH. The value of ph_log2_diff_max_bt_min_qt_intra_slice_chroma shall be in the range of 0 to CtbLog2SizeY − MinQtLog2SizeIntraC, inclusive. When not present, the value of ph_log2_diff_max_bt_min_qt_intra_slice_chroma is inferred to be equal to sps_log2_diff_max_bt_min_qt_intra_slice_chroma.
ph_log2_diff_max_tt_min_qt_intra_slice_chroma specifies the difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (I) associated with the PH. The value of ph_log2_diff_max_tt_min_qt_intra_slice_chroma shall be in the range of 0 to CtbLog2SizeY − MinQtLog2SizeIntraC, inclusive. When not present, the value of ph_log2_diff_max_tt_min_qt_intra_slice_chroma is inferred to be equal to sps_log2_diff_max_tt_min_qt_intra_slice_chroma
ph_cu_qp_delta_subdiv_intra_slice specifies the maximum cbSubdiv value of coding units in intra slice that convey cu_qp_delta_abs and cu_qp_delta_sign_flag. The value of ph_cu_qp_delta_subdiv_intra_slice shall be in the range of 0 to
2 * ( CtbLog2SizeY − MinQtLog2SizeIntraY + ph_max_mtt_hierarchy_depth_intra_slice_luma ), inclusive.
When not present, the value of ph_cu_qp_delta_subdiv_intra_slice is inferred to be equal to 0.
ph_cu_chroma_qp_offset_subdiv_intra_slice specifies the maximum cbSubdiv value of coding units in intra slice that convey cu_chroma_qp_offset_flag. The value of ph_cu_chroma_qp_offset_subdiv_intra_slice shall be in the range of 0 to
2 * ( CtbLog2SizeY − MinQtLog2SizeIntraY + ph_max_mtt_hierarchy_depth_intra_slice_luma ), inclusive.
When not present, the value of ph_cu_chroma_qp_offset_subdiv_intra_slice is inferred to be equal to 0.
ph_log2_diff_min_qt_min_cb_inter_slice specifies the difference between the base 2 logarithm of the minimum size in luma samples of a luma leaf block resulting from quadtree splitting of a CTU and the base 2 logarithm of the minimum luma coding block size in luma samples for luma CUs in the slices with slice_type equal to 0 (B) or 1 (P) associated with the PH. The value of ph_log2_diff_min_qt_min_cb_inter_slice shall be in

TABLE 11-continued

Picture header structure semantics the range of 0 to CtbLog2SizeY − MinCbLog2SizeY, inclusive. When not present, the value of ph_log2_diff_min_qt_min_cb_luma is inferred to be equal to sps_log2_diff_min_qt_min_cb_inter_slice.
ph_max_mtt_hierarchy_depth_inter_slice specifies the maximum hierarchy depth for coding units resulting from multi-type tree splitting of a quadtree leaf in slices with slice_type equal to 0 (B) or 1 (P) associated with the PH. The value of ph_max_mtt_hierarchy_depth_inter_slice shall be in the range of 0 to 2*( CtbLog2SizeY − MinCbLog2SizeY ), inclusive. When not present, the value of ph_max_mtt_hierarchy_depth_inter_slice is inferred to be equal to sps_max_mtt_hierarchy_depth_inter_slice.
ph_log2_diff_max_bt_min_qt_inter_slice specifies the difference between the base 2 logarithm of the maximum size (width or height) in luma samples of a luma coding block that can be split using a binary split and the minimum size (width or height) in luma samples of a luma leaf block resulting from quadtree splitting of a CTU in the slices with slice_type equal to 0 (B) or 1 (P) associated with the PH. The value of ph_log2_diff_max_bt_min_qt_inter_slice shall be in the range of 0 to CtbLog2SizeY − MinQtLog2SizeInterY, inclusive. When not present, the value of ph_log2_diff_max_bt_min_qt inter_slice is inferred to be equal to sps_log2_diff_max_bt_min qt inter_slice.
ph_log2_diff_max_tt_min_qt_inter_slice specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) associated with the PH. The value of ph_log2_diff_max_tt_min_qt_inter_slice shall be in the range of 0 to CtbLog2SizeY − MinQtLog2SizeInterY, inclusive. When not present, the value of ph_log2_diff_max_tt_min_qt_inter_slice is inferred to be equal to sps_log2_diff_max_tt_min_qt_inter_slice.
ph_cu_qp_delta_subdiv_inter_slice specifies the maximum cbSubdiv value of coding units that in inter slice convey cu_qp_delta_abs and cu_qp_delta_sign_flag. The value of ph_cu_qp_delta_subdiv_inter_slice shall be in the range of 0 to
2 * ( CtbLog2SizeY − MinQtLog2SizeInterY + ph_max_mtt_hierarchy_depth_inter_slice ), inclusive.
When not present, the value of ph_cu_qp_delta_subdiv_inter_slice is inferred to be equal to 0.
ph_cu_chroma_qp_offset_subdiv_inter_slice specifies the maximum cbSubdiv value of coding units in inter slice that convey cu_chroma_qp_offset_flag. The value of ph_cu_chroma_qp_offset_subdiv_inter_slice shall be in the range of 0 to
2 * ( CtbLog2SizeY − MinQtLog2SizeInterY + ph_max_mtt_hierarchy_depth_inter_slice ), inclusive.
When not present, the value of ph_cu_chroma_qp_offset_subdiv_inter_slice is inferred to be equal to 0.
ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH.
When not present, the value of ph_temporal_mvp_enabled_flag is inferred to be equal to 0.
When no reference picture in the DPB has the same spatial resolution as the current picture, the value of ph_temporal_mvp_enabled_flag shall be equal to 0.
The maximum number of subblock-based merging MVP candidates, MaxNumSubblockMergeCand, is derived as follows:
    if( sps_affine_enabled_flag )
      MaxNumSubblockMergeCand = 5 −
    five_minus_max_num_subblock_merge_cand                                    (87)
    else
      MaxNumSubblockMergeCand =
    sps_sbtmvp_enabled_flag && ph_temporal_mvp_enable_flag
The value of MaxNumSubblockMergeCand shall be in the range of 0 to 5, inclusive.
ph_collocated_from_l0_flag equal to 1 specifies that the collocated picture used for temporal motion vector prediction is derived from reference picture list 0.
ph_collocated_from_l0_flag equal to 0 specifies that the collocated picture used for temporal motion vector prediction is derived from reference picture list 1.
ph_collocated_ref_idx specifies the reference index of the collocated picture used for temporal motion vector prediction.
When ph_collocated_from_l0_flag is equal to 1, ph_collocated_ref_idx refers to an entry in reference picture list 0, and the value of ph_collocated_ref_idx shall be in the range of 0 to num_ref_entries[ 0 ][ RplsIdx[ 0 ] ] − 1, inclusive.
When ph_collocated_from_l0_flag is equal to 0, ph_collocated_ref_idx refers to an entry in reference picture list 1, and the value of ph_collocated_ref_idx shall be in the range of 0 to num_ref_entries[ 1 ][ RplsIdx[ 1 ] ] − 1, inclusive.
When not present, the value of ph_collocated_ref_idx is inferred to be equal to 0.
mvd_l1_zero_flag equal to 1 indicates that the mvd_coding( x0, y0, 1 ) syntax structure is not parsed and MvdL1[ x0 ][ y0 ][ compIdx ] and
MvdCpL1[ x0 ][ y0 ][ cpIdx ][ compIdx ] are set equal to 0 for compIdx = 0..1 and cpIdx = 0..2. mvd_l1_zero_flag equal to 0 indicates that the mvd_coding( x0, y0, 1 ) syntax structure is parsed.

TABLE 11-continued

Picture header structure semantics ph_fpel_mmvd_enabled_flag equal to 1 specifies that merge mode with motion vector
difference uses integer sample precision in the slices associated with the PH.
ph_fpel_mmvd_enabled_flag equal to 0 specifies that merge mode with motion vector
difference can use fractional sample precision in the slices associated with the PH. When
not present, the value of ph_fpel_mmvd_enabled_flag is inferred to be 0.
ph_disable_bdof_flag equal to 1 specifies that bi-directional optical flow inter prediction
based inter bi-prediction is disabled in the slices associated with the PH.
ph_disable_bdof_flag equal to 0 specifies that bi-directional optical flow inter prediction
based inter bi-prediction may or may not be enabled in the slices associated with the PH.
When ph_disable_bdof_flag is not present, the following applies:
If sps_bdof_enabled_flag is equal to 1, the value of ph_disable_bdof flag is inferred to
be equal to 0.
Otherwise (sps_bdof_enabled_flag is equal to 0), the value of ph_disable_bdof flag is
inferred to be equal to 1.
ph_disable_dmvr_flag equal to 1 specifies that decoder motion vector refinement based
inter bi-prediction is disabled in the slices associated with the PH. ph_disable_dmvr_flag
equal to 0 specifies that decoder motion vector refinement based inter bi-prediction may or
may not be enabled in the slices associated with the PH.
When ph_disable_dmvr_flag is not present, the following applies:
If sps_dmvr_enabled_flag is equal to 1, the value of ph_disable_dmvr_flag is inferred to
be equal to 0.
Otherwise (sps_dmvr_enabled_flag is equal to 0), the value of ph_disable_dmvr_flag is
inferred to be equal to 1.
ph_disable_prof_flag equal to 1 specifies that prediction refinement with optical flow is
disabled in the slices associated with the PH. ph_disable_prof_flag equal to 0 specifies that
prediction refinement with optical flow may or may not be enabled in the slices associated
with the PH.
When ph_disable_prof_flag is not present, the following applies:
If sps_affine_prof_enabled_flag is equal to 1, the value of ph_disable prof_flag is
inferred to be equal to 0.
Otherwise (sps_affine_prof_enabled_flag is equal to 0), the value of
ph_disable_prof_flag is inferred to be equal to 1.
ph_qp_delta specifies the initial value of $Qp_Y$ to be used for the coding blocks in the
picture until modified by the value of CuQpDelta Val in the coding unit layer.
When qp_delta_info_in_ph_flag is equal to 1, the initial value of the $Qp_Y$ quantization
parameter for all slices of the picture, $SliceQp_Y$, is derived as follows:
$SliceQp_Y$ = 26 + init_qp_minus26 +
ph_qp_delta (88)
The value of $SliceQp_Y$ shall be in the range of −QpBdOffset to +63, inclusive.
ph_joint_cbcr_sign_flag specifies whether, in transform units with
tu_joint_cbcr_residual_flag[ x0 ][ y0 ] equal to 1, the collocated residual samples of both
chroma components have inverted signs. When tu_joint_cbcr_residual_flag[ x0 ][ y0 ]
equal to 1 for a transform unit, ph_joint_cbcr_sign_flag equal to 0 specifies that the sign of
each residual sample of the Cr (or Cb) component is identical to the sign of the collocated
Cb (or Cr) residual sample and ph_joint_cbcr_sign_flag equal to 1 specifies that the sign of
each residual sample of the Cr (or Cb) component is given by the inverted sign of the
collocated Cb (or Cr) residual sample.
ph_sao_luma_enabled_flag equal to 1 specifies that SAO is enabled for the luma
component in all slices associated with the PH; ph_sao_luma_enabled_flag equal to 0
specifies that SAO for the luma component may be disabled for one, or more, or all slices
associated with the PH. When ph_sao_luma_enabled_flag is not present, it is inferred to be
equal to 0.
ph_sao_chroma_enabled_flag equal to 1 specifies that SAO is enabled for the chroma
component in all slices associated with the PH; ph_sao_chroma_enabled_flag equal to 0
specifies that SAO for chroma component may be disabled for one, or more, or all slices
associated with the PH. When ph_sao_chroma_enabled_flag is not present, it is inferred to
be equal to 0.
ph_dep_quant_enabled_flag equal to 0 specifies that dependent quantization is disabled
for the current picture. ph_dep_quant_enabled_flag equal to 1 specifies that dependent
quantization is enabled for the current picture. When ph_dep_quant_enabled_flag is not
present, it is inferred to be equal to 0.
pic_sign_data_hiding_enabled_flag equal to 0 specifies that sign bit hiding is disabled
for the current picture. pic_sign_data_hiding_enabled_flag equal to 1 specifies that sign bit
hiding is enabled for the current picture. When pic_sign_data_hiding_enabled_flag is not
present, it is inferred to be equal to 0.
ph_deblocking_filter_override_flag equal to 1 specifies that deblocking parameters are
present in the PH. ph_deblocking_filter_override_flag equal to 0 specifies that deblocking
parameters are not present in the PH. When not present, the value of
ph_deblocking_filter_override_flag is inferred to be equal to 0.
ph_deblocking_filter_disabled_flag equal to 1 specifies that the operation of the
deblocking filter is not applied for the slices associated with the PH.
ph_deblocking_filter_disabled_flag equal to 0 specifies that the operation of the
deblocking filter is applied for the slices associated with the PH. When
ph_deblocking_filter_disabled_flag is not present, it is inferred to be equal to
pps_deblocking_filter_disabled_flag.
ph_beta_offset_div2 and ph_tc_offset_div2 specify the deblocking parameter offsets for
β and tC (divided by 2) that are applied to the luma component for the slices associated
with the PH. The values of ph_beta_offset_div2 and ph_tc_offset_div2 shall both be in the TABLE 11-continued Picture header structure semantics range of −12 to 12, inclusive. When not present, the values of ph_beta_offset_div2 and ph_tc_offset_div2 are inferred to be equal to pps_beta_offset_div2 and pps_tc_offset_div2, respectively.
ph_cb_beta_offset_div2 and ph_cb_tc_offset_div2 specify the deblocking parameter offsets for β and tC (divided by 2) that are applied to the Cb component for the slices associated with the PH. The values of ph_cb_beta_offset_div2 and ph_cb_to_offset_div2 shall both be in the range of −12 to 12, inclusive. When not present, the values of ph_cb_beta_offset_div2 and ph_cb_tc_offset_div2 are inferred to be equal to pps_cb_beta_offset_div2 and pps_cb_tc_offset_div2, respectively.
ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 shall both be in the range of −12 to 12, inclusive. When not present, the values of ph_cr_beta_offset_div2 and ph_cr_tc_offset_div2 are inferred to be equal to pps_cr_beta_offset_div2 and pps_cr_tc_offset_div2, respectively.
ph_extension_length specifies the length of the PH extension data in bytes, not including the bits used for signalling ph_extension_length itself. The value of ph_extension_length shall be in the range of 0 to 256, inclusive. When not present, the value of ph_extension_length is inferred to be equal to 0.
ph_extension_data_byte may have any value. Decoders conforming to this version of this Specification shall ignore the value of ph_extension_data_byte. Its value does not affect decoder conformance to profiles specified in this version of specification.

In current VVC, when there are similar syntax elements for intra and inter prediction, respectively, in some places, the syntax elements related to inter prediction are defined prior to those related to intra prediction. Such an order may not be preferable, given the fact that intra prediction is allowed in all picture/slice types while inter prediction is not. It would be beneficial from a standardization point of view to always define intra prediction related syntaxes prior to those for inter prediction.

It is also observed that in the current VVC, some syntax elements that are highly correlated to each other are defined at different places in a spread manner. It would also be beneficial from a standardization point of view to group some syntaxes together.

In this disclosure, to address the issues as pointed out in the "problem statement" section, methods are provided to simplify and/or further improve the existing design of the high-level syntax. It is noted that the invented methods could be applied independently or jointly.

In this disclosure, it is designed to rearrange the syntax elements so that the intra prediction related syntax elements are defined before those related to inter prediction. According to the disclosure, the partition constraint syntax elements are grouped by prediction type, with intra prediction related first, followed by inter prediction related. In one embodiment, the order of the partition constraint syntax elements in SPS is consistent with the order of the partition constraint syntax elements in the picture header. An example of the decoding process on VVC Draft is illustrated in Table 12 below. The changes to the VVC Draft are shown using italicized font.

TABLE 12

Designed sequence parameter set RBSP syntax

| | Descriptor |
|---|---|
| seq_parameter_set_rbsp( ) { | |
| ... | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| *if( qtbtt_dual_tree_intra_flag ) {* | |
|   *sps_log2_diff_min_qt_min_cb_intra_slice_chroma* | *ue(v)* |
|   *sps_max_mtt_hierarchy_depth_intra_slice_chroma* | *ue(v)* |
|   *if( sps_max_mtt_hierarchy_depth_intra_slice_chroma != 0 ) {* | |
|     *sps_log2_diff_max_bt_min_qt_intra_slice_chroma* | *ue(v)* |
|     *sps_log2_diff_max_tt_min_qt_intra_slice_chroma* | *ue(v)* |
|   *}* | |
| *}* | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |

TABLE 12-continued

Designed sequence parameter set RBSP syntax

| | Descriptor |
|---|---|
| ... | |
| } | |

Figure 5:
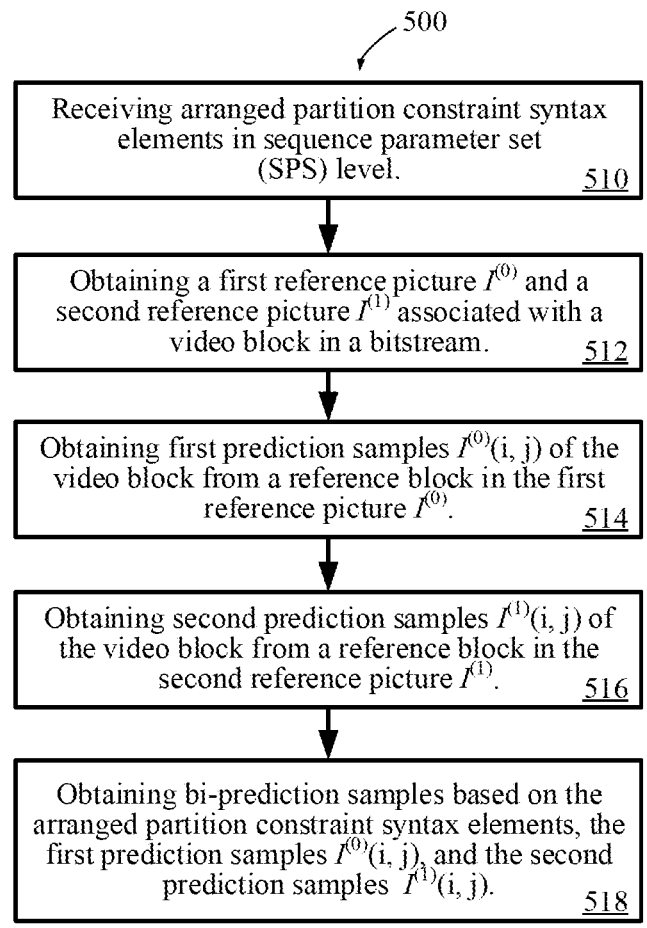
FIG. 5 is a flowchart illustrating an example method for decoding a video signal in accordance with some implementations of the present disclosure.

FIG. 5 is a flowchart 500 illustrating an example method for decoding a video signal in accordance with some implementations of the present disclosure. The method may be, for example, applied to a decoder.

In step 510, the decoder may receive arranged partition constraint syntax elements in SPS level. The arranged partition constraint syntax elements are arranged so that intra prediction related syntax elements are defined before inter prediction related syntax elements.

In step 512, the decoder may obtain a first reference picture) $I^{(0)}$ and a second reference picture $I^{(1)}$ associated with a video block in a bitstream. The first reference picture) $I^{(0)}$ is before a current picture and the second reference picture $I^{(1)}$ is after the current picture in display order.

In step 514, the decoder may obtain first prediction samples) $I^{(0)}(i, j)$ of the video block from a reference block in the first reference picture) $I^{(0)}$. The i and j represent a coordinate of one sample with the current picture.

In step 516, the decoder may obtain second prediction samples $I^{(1)}(i, j)$ of the video block from a reference block in the second reference picture $I^{(1)}$.

In step 518, the decoder may obtain bi-prediction samples based on the arranged partition constraint syntax elements, the first prediction samples $I^{(0)}(i, j)$, and the second prediction samples $I^{(1)}(i, j)$.

Figure 6:
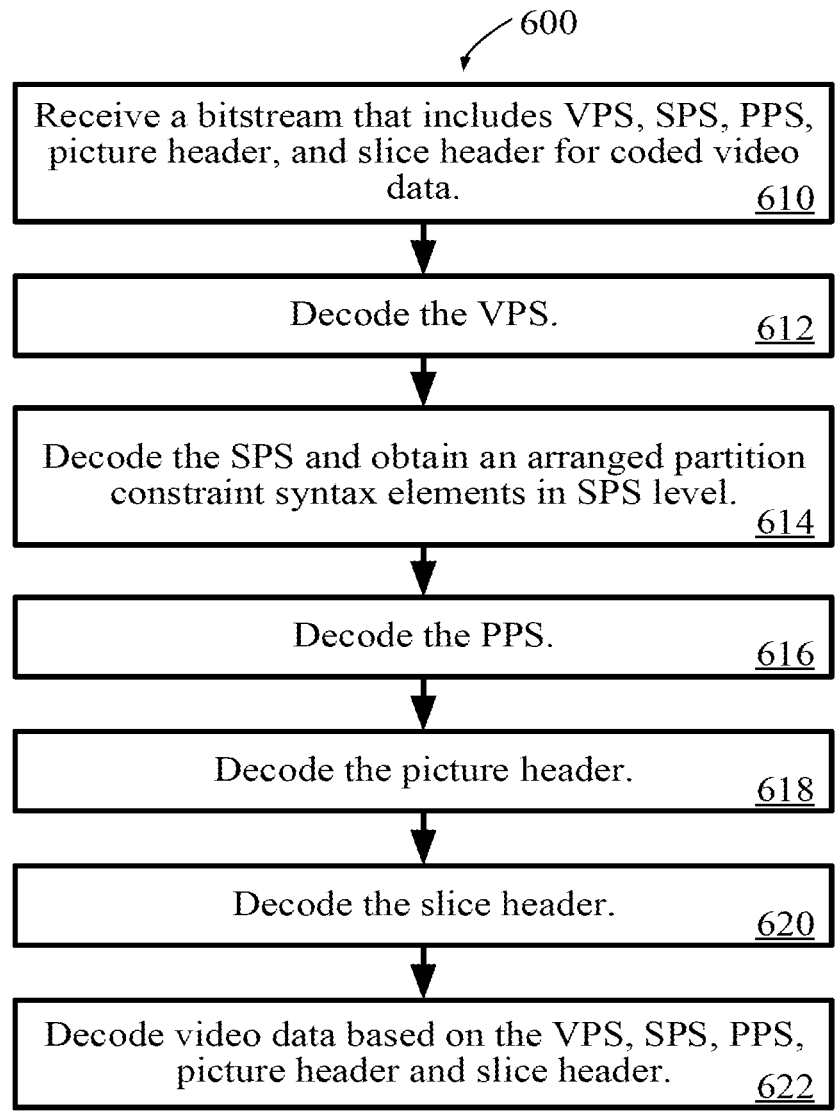
FIG. 6 is a flowchart illustrating an example method for decoding a video signal in accordance with some implementations of the present disclosure.

FIG. 6 is a flowchart 600 illustrating an example method for decoding a video signal in accordance with some implementations of the present disclosure. The method may be, for example, applied to a decoder. In step 610, the decoder may receive a bitstream that includes VPS, SPS, PPS, picture header, and slice header for coded video data. In step 612, the decoder may decode the VPS. In step 614, the decoder may decode the SPS and obtain an arranged partition constraint syntax elements in SPS level. In step 616, the decoder may decode the PPS. In step 618, the decoder may decode the picture header. In step 620, the decoder may decode the slice header. In step 622, the decoder may decode the video data based on VPS, SPS, PPS, picture header and slice header.

In this disclosure, it is designed to group the syntax elements related to dual-tree chroma type. In one embodiment, the partition constraint syntax elements for dual-tree chroma in SPS should be signaled together under dual-tree chroma cases. An example of the decoding process on VVC Draft is illustrated in Table 13 below. The changes to the VVC Draft are shown using italicized font.

TABLE 13

Designed sequence parameter set RBSP syntax

| | Descriptor |
|---|---|
| seq_parameter_set_rbsp( ) { | |
| ... | |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   sps_log2_diff_min_qt_min_cb_inter_slice | ue(v) |
|   sps_max_mtt_hierarchy_depth_inter_slice | ue(v) |
|     if( sps_max_mtt_hierarchy_depth_inter_slice != 0 ) { | |
|       sps_log2_diff_max_bt_min_qt_inter_slice | ue(v) |
|       sps_log2_diff_max_tt_min_qt_inter_slice | ue(v) |
|   } | |
|   *if( ChromaArrayType != 0 ) {* | |
|     qtbtt_dual_tree_intra_flag | *u(1)* |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
|   *}* | |
| ... | |
| } | |

If also considering defining intra prediction related syntaxes prior to those related to inter prediction, according to the method of the disclosure, another example of the decoding process on VVC Draft is illustrated in table 14 below. The changes to the VVC Draft are shown using italicized font.

TABLE 14

Designed sequence parameter set RBSP syntax

|  | Descriptor |
|---|---|
| seq_parameter_set_rbsp( ) { | |
| ... | |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   *if( ChromaArrayType != 0 ) {* | |
|     *qtbtt_dual_tree_intra_flag* | *u(1)* |
|     *if( qtbtt_dual_tree_intra_flag ) {* | |
|       *sps_log2_diff_min_qt_min_cb_intra_slice_chroma* | *ue(v)* |
|       *sps_max_mtt_hierarchy_depth_intra_slice_chroma* | *ue(v)* |
|       *if( sps_max_mtt_hierarchy_depth_intra_slice_chroma != 0 )* | |
|       *{* | |
|         *sps_log2_diff_max_bt_min_qt_ intra_slice_chroma* | *ue(v)* |
|         *sps_log2_diff_max_tt_min_qt_intra_slice_chroma* | *ue(v)* |
|       *}* | |
|     *}* | |
|   *}* | |
|   sps_log2_diff_min_qt_min_cb_inter_slice | ue(v) |
|   sps_max_mtt_hierarchy_depth_inter_slice | ue(v) |
|   if( sps_max_mtt_hierarchy_depth_inter_slice != 0 ) { | |
|     sps_log2_diff_max_bt_min_qt_inter_slice | ue(v) |
|     sps_log2_diff_max_tt_min_qt_inter_slice | ue(v) |
|   } | |
|   ... | |
| } | |

As mentioned in the earlier description, according to the current VVC, intra prediction is allowed in all picture/slice types while inter prediction is not. According to this disclosure, it is designed to add a flag in VVC syntax at a certain coding level to indicate if inter prediction is used or not in a sequence, picture and/or slice. In case inter prediction is not used, inter prediction related syntaxes are not signaled at the corresponding coding level, e.g., sequence, picture and/or slice level.

In one example, according to the method of the disclosure, a flag is added in SPS to indicate if inter prediction is used in coding the current video sequence. In case it is not used, inter prediction related syntax elements are not signaled in SPS. An example of the decoding process on VVC Draft is illustrated in Table 15 below. The changes to the VVC Draft are shown using italicized font.

TABLE 15

Designed sequence parameter set RBSP syntax

|  | Descriptor |
|---|---|
| seq_parameter_set_rbsp( ) { | |
| ... | |
|   *sps_inter_slice_used_flag* | *u(1)* |
|   if( ChromaArrayType != 0 ) | |
|     qtbtt_dual_tree_intra_flag | u(1) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |

TABLE 15-continued

Designed sequence parameter set RBSP syntax

| | Descriptor |
|---|---|
|    sps_log2_diff_max_tt_min_qt_intra_slice_luma | ue(v) |
| } | |
| if( sps_inter_slice_used_flag != 0 ) { | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|    sps_log2_diff_max_bt_min_qt_inter_slice | ue(v) |
|    sps_log2_diff_max_tt_min_qt_inter_slice | ue(v) |
| } | |
| } | |
| if( qtbtt_dual_tree_intra_flag ) { | |
|    sps_log2_diff_min_qt_min_cb_intra_slice_chroma | ue(v) |
|    sps_max_mtt_hierarchy_depth_intra_slice_chroma | ue(v) |
|    if( sps_max_mtt_hierarchy_depth_intra_slice_chroma != 0 ) { | |
|      sps_log2_diff_max_bt_min_qt_intra_slice_chroma | ue(v) |
|      sps_log2_diff_max_tt_min_qt_intra_slice_chroma | ue(v) |
|    } | |
| } | |
| ... | |
| } | |

Sequence Parameter Set RBSP Semantics sps_inter_slice_used_flag equal to 0 specifies that all coded slices of the video sequence have slice type equal to 2. sps_inter_slice_used_flag equal to 1 specifies that there may or may not be one or more coded slices in the video sequence that have slice type equal to 0 or 1.

In some embodiments, the syntax elements are arranged so that the similar functions, e.g. intra tools, inter tools, screen content tools, transform tools, quantization tools, loop filter tools and/or partition tools, related syntax elements are grouped in VVC syntax at certain coding level, e.g. sequence, picture and/or slice level. According to some embodiments, the syntax elements in the sequence parameter set (SPS) are arranged so that the similar function related syntax elements are grouped. An example of the decoding process for VVC is illustrated in table 16 below. The table 16 shows syntax at SPS level that groups syntax elements with similar functions.

TABLE 16

Syntax at SPS level that groups syntax elements with similar functions.

| | Descriptor |
|---|---|
| seq_parameter_set_rbsp( ) { | |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   chroma_format_idc | u(2) |
|   if( chroma_format_idc = = 3 ) | |
|     separate_colour_plane_flag | u(1) |
|   res_change_in_clvs_allowed_flag | u(1) |
|   pic_width_max_in_luma_samples | ue(v) |
|   pic_height_max_in_luma_samples | ue(v) |
|   sps_conformance_window_flag | u(1) |
|   if( sps_conformance_window_flag ) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   sps_log2_ctu_size_minus5 | u(2) |
|   subpic_info_present_flag | u(1) |
|   if( subpic_info_present_flag ) { | |
|     sps_num_subpics_minus1 | ue(v) |
|     sps_independent_subpics_flag | u(1) |
|     for( i = 0; sps_num_subpics_minus1 > 0 && i <= sps_num_subpics_minus1; i++ ) { | |
|       if( i > 0 && pic_width_max_in_luma_samples > CtbSizeY ) | |
|         subpic_ctu_top_left_x[ i ] | u(v) |
|       if( i > 0 && pic_height_max_in_luma_samples > CtbSizeY ) { | |
|         subpic_ctu_top_left_y[ i ] | u(v) |
|       if( i < sps_num_subpics_minus1 && | |
|         pic_width_max_in_luma_samples > CtbSizeY ) | |

TABLE 16-continued

Syntax at SPS level that groups syntax elements with similar functions.

| | Descriptor |
|---|---|
|     subpic_width_minus1[ i ] | u(v) |
|     if( i < sps_num_subpics_minus1 && | |
|         pic_height_max_in_luma_samples > CtbSizeY ) | |
|       subpic_height_minus1[ i ] | u(v) |
|     if( !sps_independent_subpics_flag ) { | |
|       subpic_treated_as_pic_flag[ i ] | u(1) |
|       loop_filter_across_subpic_enabled_flag[ i ] | u(1) |
|     } | |
|   } | |
|   sps_subpic_id_len_minus1 | ue(v) |
|   subpic_id_mapping_explicitly_signalled_flag | u(1) |
|   if( subpic_id_mapping_explicitly_signalled_flag ) { | |
|     subpic_id_mapping_in_sps_flag | u(1) |
|     if( subpic_id_mapping_in_sps_flag ) | |
|       for( i = 0; i <= sps_num_subpics_minus1; i++ ) | |
|         sps_subpic_id[ i ] | u(v) |
|   } | |
| } | |
| bit_depth_minus8 | ue(v) |
| sps_entropy_coding_sync_enabled_flag | u(1) |
| if( sps_entropy_coding_sync_enabled_flag ) | |
|   sps_wpp_entry_point_offsets_present_flag | u(1) |
| log2_max_pic_order_cnt_lsb_minus4 | u(4) |
| sps_poc_msb_flag | u(1) |
| if( sps_poc_msb_flag ) | |
|   poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0 ) | |
|   sps_sublayer_dpb_params_flag | u(1) |
| if( sps_ptl_dpb_hrd_params_present_flag ) | |
|   dpb_parameters( sps_max_sublayers_minus1, sps_sublayer_dpb_params_flag ) | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| sps_max_luma_transform_size_64_flag | u(1) |
| if( ChromaArrayType != 0 ) { | |
|   sps_joint_cbcr_enabled_flag | u(1) |
|   same_qp_table_for_chroma | u(1) |
|   numQpTables = same_qp_table_for_chroma ? 1 : ( sps_joint_cbcr_enabled_flag ? 3 : 2 ) | |
|   for( i = 0; i < numQpTables; i++ ) { | |
|     qp_table_start_minus26[ i ] | se(v) |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_diff_val[ i ][ j ] | ue(v) |
|     } | |
|   } | |
| } | |

TABLE 16-continued

Syntax at SPS level that groups syntax elements with similar functions.

| | Descriptor |
|---|---|
| sps_sao_enabled_flag | u(1) |
| sps_alf_enabled_flag | u(1) |
| if( sps_alf_enabled_flag && ChromaArrayType != 0 ) | |
|   sps_ccalf_enabled_flag | u(1) |
| sps_transform_skip_enabled_flag | u(1) |
| if( sps_transform_skip_enabled_flag ) { | |
|   log2_transform_skip_max_size_minus2 | ue(v) |
|   sps_bdpcm_enabled_flag | u(1) |
| } | |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
| if( chroma_format_idc = = 1 ) { | |
|   sps_chroma_horizontal_collocated_flag | u(1) |
|   sps_chroma_vertical_collocated_flag | u(1) |
| } | |
| sps_weighted_pred_flag | u(1) |
| sps_weighted_bipred_flag | u(1) |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < rpl1_same_as_rpl0_flag ? 1 : 2; i++ ) { | |
|   num_ref_pic_lists_in_sps[ i ] | ue(v) |
|   for( j = 0; j < num_ref_pic_lists_in_sps[ i ]; j++ ) | |
|     ref_pic_list_struct( i, j ) | |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| sps_ref_wraparound_enabled_flag | u(1) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| if( sps_bdof_enabled_flag ) | |
|   sps_bdof_pic_present_flag | u(1) |
| sps_smvd_enabled_flag | u(1) |
| sps_dmvr_enabled_flag | u(1) |
| if( sps_dmvr_enabled_flag) | |
|   sps_dmvr_pic_present_flag | u(1) |
| sps_mmvd_enabled_flag | u(1) |
| six_minus_max_num_merge_cand | ue(v) |
| sps_sbt_enabled_flag | u(1) |
| sps_affine_enabled_flag | u(1) |
| if( sps_affine_enabled_flag ) { | |
|   five_minus_max_num_subblock_merge_cand | ue(v) |
|   sps_affine_type_flag | u(1) |
|   if( sps_amvr_enabled_flag ) | |
|     sps_affine_amvr_enabled_flag | u(1) |
|   sps_affine_prof_enabled_flag | u(1) |
|   if( sps_affine_prof_enabled_flag ) | |
|     sps_prof_pic_present_flag | u(1) |
| } | |
| sps_bcw_enabled_flag | u(1) |
| sps_ciip_enabled_flag | u(1) |
| if( sps_mmvd_enabled_flag ) | |
|   sps_fpel_mmvd_enabled_flag | u(1) |
| if( MaxNumMergeCand >= 2 ) { | |
|   sps_gpm_enabled_flag | u(1) |
|   if( sps_gpm_enabled_flag && MaxNumMergeCand >= 3 ) | |
|     max_num_merge_cand_minus_max_num_gpm_cand | ue(v) |
| } | |
| log2_parallel_merge_level_minus2 | ue(v) |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |

TABLE 16-continued

Syntax at SPS level that groups syntax elements with similar functions.

| | Descriptor |
|---|---|
| sps_palette_enabled_flag | u(1) |
| if( ChromaArrayType = = 3 && !sps_max_luma_transform_size_64_flag ) | |
|   sps_act_enabled_flag | u(1) |
| if( sps_transform_skip_enabled_flag \|\| sps_palette_enabled_flag ) | |
|   min_qp_prime_ts_minus4 | ue(v) |
| sps_ibc_enabled_flag | u(1) |
| if( sps_ibc_enabled_flag ) | |
|   six_minus_max_num_ibc_merge_cand | ue(v) |
| sps_lmcs_enabled_flag | u(1) |
| sps_lfnst_enabled_flag | u(1) |
| sps_ladf_enabled_flag | u(1) |
| if( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| sps_explicit_scaling_list_enabled_flag | u(1) |
| sps_dep_quant_enabled_flag | u(1) |
| if( !sps_dep_quant_enabled_flag ) | |
|   sps_sign_data_hiding_enabled_flag | u(1) |
| sps_virtual_boundaries_enabled_flag | u(1) |
| if( sps_virtual_boundaries_enabled_flag ) { | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(13) |
|   } | |
| } | |
| if( sps_ptl_dpb_hrd_params_present_flag ) { | |
|   sps_general_hrd_params_present_flag | u(1) |
|   if( sps_general_hrd_params_present_flag ) { | |
|     general_hrd_parameters( ) | |
|     if( sps_max_sublayers_minus1 > 0 ) | |
|       sps_sublayer_cpb_params_present_flag | u(1) |
|     firstSubLayer = sps_sublayer_cpb_params_present_flag ? 0 : | |
|       sps_max_sublayers_minus1 | |
|     ols_hrd_parameters( firstSubLayer, sps_max_sublayers_minus1 ) | |
|   } | |
| } | |
| field_seq_flag | u(1) |
| vui_parameters_present_flag | u(1) |
| if( vui_parameters_present_flag ) | |
|   vui_parameters( ) /* Specified in ITU-T H.SE \| ISO/IEC 23002-7 */ | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

Another example of the decoding process for VVC is illustrated in table 17 below. The table 17 shows syntax at SPS level that groups syntax elements with similar functions.

TABLE 17

Syntax at SPS level that groups syntax elements with similar functions

| | Descriptor |
|---|---|
| seq_parameter_set_rbsp( ) { | |
|   sps_seq_parameter_set_id | u(4) |
|   sps_video_parameter_set_id | u(4) |
|   sps_max_sublayers_minus1 | u(3) |

TABLE 17-continued

Syntax at SPS level that groups syntax elements with similar functions

| | Descriptor |
|---|---|
| sps_reserved_zero_4bits | u(4) |
| sps_ptl_dpb_hrd_params_present_flag | u(1) |
| if( sps_ptl_dpb_hrd_params_present_flag ) | |
|   profile_tier_level( 1, sps_max_sublayers_minus1 ) | |
| gdr_enabled_flag | u(1) |
| chroma_format_idc | u(2) |
| if( chroma_format_idc = = 3 ) | |
|   separate_colour_plane_flag | u(1) |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |
| if( sps_conformance_window_flag ) { | |
|   sps_conf_win_left_offset | ue(v) |
|   sps_conf_win_right_offset | ue(v) |
|   sps_conf_win_top_offset | ue(v) |
|   sps_conf_win_bottom_offset | ue(v) |
| } | |
| sps_log2_ctu_size_minus5 | u(2) |
| subpic_info_present_flag | u(1) |
| if( subpic_info_present_flag ) { | |
|   sps_num_subpics_minus1 | ue(v) |
|   sps_independent_subpics_flag | u(1) |
|   for( i = 0; sps_num_subpics_minus1 > 0 && i <= sps_num_subpics_minus1; i++ ) { | |
|     if( i > 0 && pic_width_max_in_luma_samples > CtbSizeY ) | |
|       subpic_ctu_top_left_x[ i ] | u(v) |
|     if( i > 0 && pic_height_max_in_luma_samples > CtbSizeY ) | |
| { | |
|       subpic_ctu_top_left_y[ i ] | u(v) |
|     if( i < sps_num_subpics_minus1 && | |
|       pic_width_max_in_luma_samples > CtbSizeY ) | |
|       subpic_width_minus1[ i ] | u(v) |
|     if( i < sps_num_subpics_minus1 && | |
|       pic_height_max_in_luma_samples > CtbSizeY ) | |
|       subpic_height_minus1[ i ] | u(v) |
|     if( !sps_independent_subpics_flag) { | |
|       subpic_treated_as_pic_flag[ i ] | u(1) |
|       loop_filter_across_subpic_enabled_flag[ i ] | u(1) |
|     } | |
|   } | |
|   sps_subpic_id_len_minus1 | ue(v) |
|   subpic_id_mapping_explicitly_signalled_flag | u(1) |
|   if( subpic_id_mapping_explicitly_signalled_flag ) { | |
|     subpic_id_mapping_in_sps_flag | u(1) |
|     if( subpic_id_mapping_in_sps_flag ) | |
|       for( i = 0; i <= sps_num_subpics_minus1; i++ ) | |
|         sps_subpic_id[ i ] | u(v) |
|   } | |
| } | |
| bit_depth_minus8 | ue(v) |
| sps_entropy_coding_sync_enabled_flag | u(1) |
| if( sps_entropy_coding_sync_enabled_flag ) | |
|   sps_wpp_entry_point_offsets_present_flag | u(1) |
| log2_max_pic_order_cnt_lsb_minus4 | u(4) |
| sps_poc_msb_flag | u(1) |
| if( sps_poc_msb_flag ) | |
|   poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0 ) | |
|   sps_sublayer_dpb_params_flag | u(1) |
| if( sps_ptl_dpb_hrd_params_present_flag ) | |
|   dpb_parameters( sps_max_sublayers_minus1, sps_sublayer_dpb_params_flag ) | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |

TABLE 17-continued

Syntax at SPS level that groups syntax elements with similar functions

| | Descriptor |
|---|---|
|     sps_log2_diff_max_bt_min_qt_intra_slice_luma | ue(v) |
|     sps_log2_diff_max_tt_min_qt_intra_slice_luma | ue(v) |
|   } | |
|   sps_log2_diff_min_qt_min_cb_inter_slice | ue(v) |
|   sps_max_mtt_hierarchy_depth_inter_slice | ue(v) |
|   if( sps_max_mtt_hierarchy_depth_inter_slice != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
|   sps_max_luma_transform_size_64_flag | u(1) |
|   if( ChromaArrayType != 0 ) { | |
|     sps_joint_cbcr_enabled_flag | u(1) |
|     same_qp_table_for_chroma | u(1) |
|     numQpTables = same_qp_table_for_chroma ? 1 : ( sps_joint_cbcr_enabled_flag ? 3 : 2 ) | |
|     for( i = 0; i < numQpTables; i++ ) { | |
|       qp_table_start_minus26[ i ] | se(v) |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         delta_qp_diff_val[ i ][ j ] | ue(v) |
|       } | |
|     } | |
|   } | |
|   sps_sao_enabled_flag | u(1) |
|   sps_alf_enabled_flag | u(1) |
|   if( sps_alf_enabled_flag && ChromaArrayType != 0 ) | |
|     sps_ccalf_enabled_flag | u(1) |
|   sps_transform_skip_enabled_flag | u(1) |
|   if( sps_transform_skip_enabled_flag ) { | |
|     log2_transform_skip_max_size_minus2 | ue(v) |
|     sps_bdpcm_enabled_flag | u(1) |
|   } | |
|   sps_isp_enabled_flag | u(1) |
|   sps_mrl_enabled_flag | u(1) |
|   sps_mip_enabled_flag | u(1) |
|   if( ChromaArrayType != 0 ) | |
|     sps_cclm_enabled_flag | u(1) |
|   if( chroma_format_idc == 1 ) { | |
|     sps_chroma_horizontal_collocated_flag | u(1) |
|     sps_chroma_vertical_collocated_flag | u(1) |
|   } | |
|   sps_palette_enabled_flag | u(1) |
|   if( ChromaArrayType == 3 && !sps_max_luma_transform_size_64_flag ) | |
|     sps_act_enabled_flag | u(1) |
|   if( sps_transform_skip_enabled_flag \|\| sps_palette_enabled_flag ) | |
|     min_qp_prime_ts_minus4 | ue(v) |
|   sps_ibc_enabled_flag | u(1) |
|   if( sps_ibc_enabled_flag ) | |
|     six_minus_max_num_ibc_merge_cand | ue(v) |
|   sps_weighted_pred_flag | u(1) |
|   sps_weighted_bipred_flag | u(1) |
|   long_term_ref_pics_flag | u(1) |
|   inter_layer_ref_pics_present_flag | u(1) |
|   sps_idr_rpl_present_flag | u(1) |
|   rpl1_same_as_rpl0_flag | u(1) |
|   for( i = 0; i < rpl1_same_as_rpl0_flag ? 1 : 2; i++ ) { | |
|     num_ref_pic_lists_in_sps[ i ] | ue(v) |
|     for( j = 0; j < num_ref_pic_lists_in_sps[ i ]; j++) | |
|       ref_pic_list_struct( i, j ) | |
|   } | |
|   sps_log2_diff_min_qt_min_cb_inter_slice | ue(v) |
|   sps_max_mtt_hierarchy_depth_inter_slice | ue(v) |
|   if( sps_max_mtt_hierarchy_depth_inter_slice != 0 ) { | |
|     sps_log2_diff_max_bt_min_qt_inter_slice | ue(v) |
|     sps_log2_diff_max_tt_min_qt_inter_slice | ue(v) |
|   } | |

TABLE 17-continued

Syntax at SPS level that groups syntax elements with similar functions

| | Descriptor |
|---|---|
| sps_ref_wraparound_enabled_flag | u(1) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| if( sps_bdof_enabled_flag ) | |
|   sps_bdof_pic_present_flag | u(1) |
| sps_smvd_enabled_flag | u(1) |
| sps_dmvr_enabled_flag | u(1) |
| if( sps_dmvr_enabled_flag) | |
|   sps_dmvr_pic_present_flag | u(1) |
| sps_mmvd_enabled_flag | u(1) |
| six_minus_max_num_merge_cand | ue(v) |
| sps_sbt_enabled_flag | u(1) |
| sps_affine_enabled_flag | u(1) |
| if( sps_affine_enabled_flag ) { | |
|   five_minus_max_num_subblock_merge_cand | ue(v) |
|   sps_affine_type_flag | u(1) |
|   if( sps_amvr_enabled_flag ) | |
|     sps_affine_amvr_enabled_flag | u(1) |
|   sps_affine_prof_enabled_flag | u(1) |
|   if( sps_affine_prof_enabled_flag ) | |
|     sps_prof_pic_present_flag | u(1) |
| } | |
| sps_bcw_enabled_flag | u(1) |
| sps_ciip_enabled_flag | u(1) |
| if( sps_mmvd_enabled_flag ) | |
|   sps_fpel_mmvd_enabled_flag | u(1) |
| if( MaxNumMergeCand >= 2 ) { | |
|   sps_gpm_enabled_flag | u(1) |
|   if( sps_gpm_enabled_flag && MaxNumMergeCand >= 3 ) | |
|     max_num_merge_cand_minus_max_num_gpm_cand | ue(v) |
| } | |
| log2_parallel_merge_level_minus2 | ue(v) |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_lmcs_enabled_flag | u(1) |
| sps_lfnst_enabled_flag | u(1) |
| sps_ladf_enabled_flag | u(1) |
| if( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| sps_explicit_scaling_list_enabled_flag | u(1) |
| sps_dep_quant_enabled_flag | u(1) |
| if( !sps_dep_quant_enabled_flag ) | |
|   sps_sign_data_hiding_enabled_flag | u(1) |
| sps_virtual_boundaries_enabled_flag | u(1) |
| if( sps_virtual_boundaries_enabled_flag ) { | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(13) |
|   } | |
| } | |
| if( sps_ptl_dpb_hrd_params_present_flag ) { | |
|   sps_general_hrd_params_present_flag | u(1) |
|   if( sps_general_hrd_params_present_flag ) { | |
|     general_hrd_parameters( ) | |
|     if( sps_max_sublayers_minus1 > 0 ) | |
|       sps_sublayer_cpb_params_present_flag | u(1) |
|     firstSubLayer = sps_sublayer_cpb_params_present_flag ? 0 : | |
|       sps_max_sublayers_minus1 | |
|     ols_hrd_parameters( firstSubLayer, sps_max_sublayers_minus1 ) | |

TABLE 17-continued

| Syntax at SPS level that groups syntax elements with similar functions | |
|---|---|
| | Descriptor |
|    } | |
|  } | |
|  field_seq_flag | u(1) |
|  vui_parameters_present_flag | u(1) |
|  if( vui_parameters_present_flag ) | |
|    vui_parameters( ) /* Specified in ITU-T H.SEI | ISO/IEC 23002-7 | |
| */ | |
|  sps_extension_flag | u(1) |
|  if( sps_extension_flag ) | |
|    while( more_rbsp_data( ) ) | |
|      sps_extension_data_flag | u(1) |
|  rbsp_trailing_bits( ) | |
| } | |

According to some embodiments, the syntax elements in the picture parameter set (PPS) are arranged so that the similar function related syntax elements are grouped. An example of the decoding process for VVC is illustrated in table 18 below. Table 18 shows syntax at PPS level that groups syntax elements with similar functions.

TABLE 18

| Syntax at PPS level that groups syntax elements with similar functions | |
|---|---|
| | Descriptor |
| pic_parameter_set_rbsp( ) { | |
|  pps_pic_parameter_set_id | ue(v) |
|  pps_seq_parameter_set_id | u(4) |
|  mixed_nalu_types_in_pic_flag | u(1) |
|  pic_width_in_luma_samples | ue(v) |
|  pic_height_in_luma_samples | ue(v) |
|  pps_conformance_window_flag | u(1) |
|  if( pps_conformance_window_flag ) { | |
|    pps_conf_win_left_offset | ue(v) |
|    pps_conf_win_right_offset | ue(v) |
|    pps_conf_win_top_offset | ue(v) |
|    pps_conf_win_bottom_offset | ue(v) |
|  } | |
|  scaling_window_explicit_signalling_flag | u(1) |
|  if( scaling_window_explicit_signalling_flag ) { | |
|    scaling_win_left_offset | ue(v) |
|    scaling_win_right_offset | ue(v) |
|    scaling_win_top_offset | ue(v) |
|    scaling_win_bottom_offset | ue(v) |
|  } | |
|  output_flag_present_flag | u(1) |
|  subpic_id_mapping_in_pps_flag | u(1) |
|  if( subpic_id_mapping_in_pps_flag ) { | |
|    pps_num_subpics_minus1 | ue(v) |
|    pps_subpic_id_len_minus1 | ue(v) |
|    for( i = 0; i <= pps_num_subpic_minus1; i++ ) | |
|      pps_subpic_id[ i ] | u(v) |
|  } | |
|  no_pic_partition_flag | u(1) |
|  if( !no_pic_partition_flag ) { | |
|    pps_log2_ctu_size_minus5 | u(2) |
|    num_exp_tile_columns_minus1 | ue(v) |
|    num_exp_tile_rows_minus1 | ue(v) |
|    for( i = 0; i <= num_exp_tile_columns_minus1; i++ ) | |
|      tile_column_width_minus1[ i ] | ue(v) |
|    for( i = 0; i <= num_exp_tile_rows_minus1; i++ ) | |
|      tile_row_height_minus1[ i ] | ue(v) |
|    if( NumTilesInPic > 1 ) | |
|      rect_slice_flag | u(1) |
|    if( rect_slice_flag ) | |
|      single_slice_per_subpic_flag | u(1) |
|    if( rect_slice_flag && !single_slice_per_subpic_flag ) { | |
|      num_slices_in_pic_minus1 | ue(v) |
|      if( num_slices_in_pic_minus1 > 0 ) | |
|        tile_idx_delta_present_flag | u(1) |
|      for( i = 0; i < num_slices_in_pic_minus1; i++ ) { | |
|        if( NumTileColumns > 1 ) | |
|          slice_width_in_tiles_minus1[ i ] | ue(v) |
|        if( NumTileRows > 1 && ( tile_idx_delta_present_flag | |

TABLE 18-continued

Syntax at PPS level that groups syntax elements with similar functions

| | Descriptor |
|---|---|
| `| |` | |
|     SliceTopLeftTileIdx[ i ] % NumTileColumns = = 0 ) ) | |
|   slice_height_in_tiles_minus1[ i ] | ue(v) |
|   if( slice_width_in_tiles_minus1[ i ] = = 0 && | |
|     slice_height_in_tiles_minus1[ i ] = = 0 && | |
| RowHeight[ SliceTopLeftTileIdx[ i ] / NumTileColumns ] > 1 ) { | |
|   num_exp_slices_in_tile[ i ] | ue(v) |
|   for( j = 0; j < num_exp_slices_in_tile[ i ]; j++ ) | |
|     exp_slice_height_in_ctus_minus1[ i ][ j ] | ue(v) |
|   i += NumSlicesInTile[ i ] − 1 | |
|   } | |
|   } | |
|   if( tile_idx_delta_present_flag && i < num_slices_in_pic_minus1 ) | |
|     tile_idx_delta[ i ] | se(v) |
|   } | |
| } | |
|   loop_filter_across_tiles_enabled_flag | u(1) |
|   loop_filter_across_slices_enabled_flag | u(1) |
| } | |
| cabac_init_present_flag | u(1) |
| init_qp_minus26 | se(v) |
| cu_qp_delta_enabled_flag | u(1) |
| pps_chroma_tool_offsets_present_flag | u(1) |
| if( pps_chroma_tool_offsets_present_flag ) { | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
| } | |
| if( pps_cu_chroma_qp_offset_list_enabled_flag ) { | |
|   chroma_qp_offset_list_len_minus1 | ue(v) |
|   for( i = 0; i <= chroma_qp_offset_list_len_minus1; i++ ) { | |
|     cb_qp_offset_list[ i ] | se(v) |
|     cr_qp_offset_list[ i ] | se(v) |
|     if( pps_joint_cbcr_qp_offset_present_flag ) | |
|       joint_cbcr_qp_offset_list[ i ] | se(v) |
|   } | |
| } | |
| for( i = 0; i < 2; i++ ) | |
|   num_ref_idx_default_active_minus1[ i ] | ue(v) |
| rpl1_idx_present_flag | u(1) |
| pps_weighted_pred_flag | u(1) |
| pps_weighted_bipred_flag | u(1) |
| rpl_info_in_ph_flag | u(1) |
| if( ( pps_weighted_pred_flag || pps_weighted_bipred_flag ) && rpl_info_in_ph_flag ) | |
|   wp_info_in_ph_flag | u(1) |
| pps_ref_wraparound_enabled_flag | u(1) |
| if( pps_ref_wraparound_enabled_flag ) | |
|   pps_ref_wraparound_offset | ue(v) |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     pps_cb_beta_offset_div2 | se(v) |
|     pps_cb_tc_offset_div2 | se(v) |
|     pps_cr_beta_offset_div2 | se(v) |
|     pps_cr_tc_offset_div2 | se(v) |
|   } | |
| } | |
| if( deblocking_filter_override_enabled_flag ) | |
|   dbf_info_in_ph_flag | u(1) |
| sao_info_in_ph_flag | u(1) |
| alf_info_in_ph_flag | u(1) |
| picture_header_extension_present_flag | u(1) |
| slice_header_extension_present_flag | u(1) |
| pps_extension_flag | u(1) |
| if( pps_extension_flag ) | |
|   while( more_rbsp_data( ) ) | |

TABLE 18-continued

| Syntax at PPS level that groups syntax elements with similar functions | |
|---|---|
| | Descriptor |
| pps_extension_data_flag | u(1) |
| rbsp_trailing_bits( ) | |
| } | |

Another example of the decoding process for VVC is illustrated in table 19 below. Table 19 shows syntax at PPS level that groups syntax elements with similar functions.

TABLE 19

| Syntax at PPS level that groups syntax elements with similar functions | |
|---|---|
| | Descriptor |
| pic_parameter_set_rbsp( ) { | |
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag ) { | |
|     pps_conf_win_left_offset | ue(v) |
|     pps_conf_win_right_offset | ue(v) |
|     pps_conf_win_top_offset | ue(v) |
|     pps_conf_win_bottom_offset | ue(v) |
|   } | |
|   scaling_window_explicit_signalling_flag | u(1) |
|   if( scaling_window_explicit_signalling_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   subpic_id_mapping_in_pps_flag | u(1) |
|   if( subpic_id_mapping_in_pps_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus1 > 0 ) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && ( tile_idx_delta_present_flag | | |
|           SliceTopLeftTileIdx[ i ] % NumTileColumns = = 0 ) ) | |
|           slice_height_in_tiles_minus1[ i ] | ue(v) |
|         if( slice_width_in_tiles_minus1[ i ] = = 0 && | |
|           slice_height_in_tiles_minus1[ i ] = = 0 && | |
|         RowHeight[ SliceTopLeftTileIdx[ i ] / NumTileColumns ] > 1 ) { | |
|           num_exp_slices_in_tile[ i ] | ue(v) |
|           for( j = 0; j < num_exp_slices_in_tile[ i ]; j++ ) | |

TABLE 19-continued

Syntax at PPS level that groups syntax elements with similar functions

| | Descriptor |
|---|---|
|         exp_slice_height_in_ctus_minus1[ i ][ j ] | ue(v) |
|       i += NumSlicesInTile[ i ] − 1 | |
|     } | |
|     if( tile_idx_delta_present_flag && i < num_slices_in_pic_minus1 ) | |
|       tile_idx_delta[ i ] | se(v) |
|    } | |
|   } | |
|   loop_filter_across_tiles_enabled_flag | u(1) |
|   loop_filter_across_slices_enabled_flag | u(1) |
| } | |
| cabac_init_present_flag | u(1) |
| for( i = 0; i < 2; i++ ) | |
|   num_ref_idx_default_active_minus1[ i ] | ue(v) |
| rpl1_idx_present_flag | u(1) |
| pps_weighted_pred_flag | u(1) |
| pps_weighted_bipred_flag | u(1) |
| rpl_info_in_ph_flag | u(1) |
| if( ( pps_weighted_pred_flag || pps_weighted_bipred_flag ) && rpl_info_in_ph_flag ) | |
|   wp_info_in_ph_flag | u(1) |
| pps_ref_wraparound_enabled_flag | u(1) |
| if( pps_ref_wraparound_enabled_flag ) | |
|   pps_ref_wraparound_offset | ue(v) |
| init_qp_minus26 | se(v) |
| cu_qp_delta_enabled_flag | u(1) |
| pps_chroma_tool_offsets_present_flag | u(1) |
| if( pps_chroma_tool_offsets_present_flag ) { | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
| } | |
| if( pps_cu_chroma_qp_offset_list_enabled_flag ) { | |
|   chroma_qp_offset_list_len_minus1 | ue(v) |
|   for( i = 0; i <= chroma_qp_offset_list_len_minus1; i++ ) { | |
|     cb_qp_offset_list[ i ] | se(v) |
|     cr_qp_offset_list[ i ] | se(v) |
|     if( pps_joint_cbcr_qp_offset_present_flag ) | |
|       joint_cbcr_qp_offset_list[ i ] | se(v) |
|   } | |
| } | |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     pps_cb_beta_offset_div2 | se(v) |
|     pps_cb_tc_offset_div2 | se(v) |
|     pps_cr_beta_offset_div2 | se(v) |
|     pps_cr_tc_offset_div2 | se(v) |
|   } | |
| } | |
| if( deblocking_filter_override_enabled_flag ) | |
|   dbf_info_in_ph_flag | u(1) |
| sao_info_in_ph_flag | u(1) |
| alf_info_in_ph_flag | u(1) |
| picture_header_extension_present_flag | u(1) |
| slice_header_extension_present_flag | u(1) |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |

Figure 7:
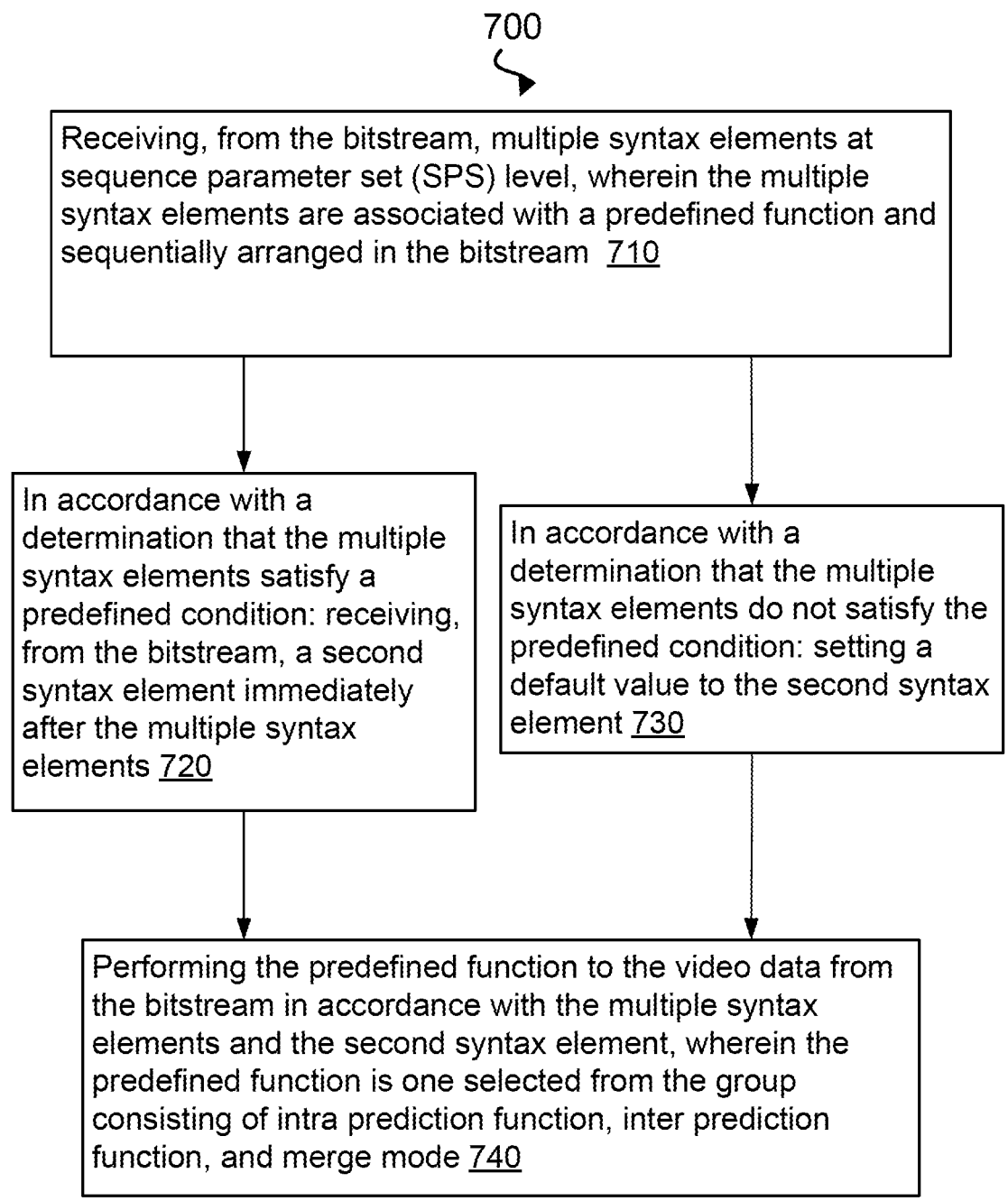
FIG. 7 is a flowchart illustrating an example process by which a video decoder implements the techniques of decoding video data in accordance with some implementations of the present disclosure.

FIG. 7 is a flowchart 700 illustrating an example process by which a video decoder (e.g., video decoder 30) implements the techniques of decoding video data in accordance with some implementations of the present disclosure.

As shown in FIG. 7, in some embodiments, the video decoder 30 receives, from the bitstream, multiple syntax elements at sequence parameter set (SPS) level, and the multiple syntax elements are associated with a predefined function and sequentially arranged in the bitstream (710).

The video decoder 30, in accordance with a determination that the multiple syntax elements satisfy a predefined condition, receives, from the bitstream, a second syntax element immediately after the multiple syntax elements (720).

The video decoder 30, in accordance with a determination that the multiple syntax elements do not satisfy the predefined condition, sets a default value to the second syntax element (730).

The video decoder 30, performs the predefined function to the video data from the bitstream in accordance with the multiple syntax elements and the second syntax element, and the predefined function is one selected from the group consisting of intra prediction function, inter prediction function, and merge mode (740).

In some embodiments, the multiple syntax elements associated with the intra prediction function and sequentially arranged in the bitstream at least include:
  sps_isp_enabled_flag,
  sps_mrl_enabled_flag,
  sps_mip_enabled_flag,
  sps_palette_enabled_flag, and
  sps_ibc_enabled_flag,
  and in some embodiments the sequentially arranged multiple syntax elements associated with the intra prediction function does not include sps_bcw_enabled_flag.

In some embodiments, the video decoder 30, receives from the bitstream, a set of syntax elements associated with the inter prediction function after the receiving of the multiple syntax elements associated with the intra prediction function.

In some embodiments, the multiple syntax elements associated with the inter prediction function and sequentially arranged in the bitstream at least include:
  sps_weighted_pred_flag,
  sps_weighted_bipred_flag,
  long_term_ref_pics_flag,
  inter_layer_ref_pics_present_flag,
  sps_idr_rpl_present_flag,
  rpl1_same_as_rpl0_flag,
  sps_log 2_diff_min_qt_min_cb_inter_slice,
  sps_max_mtt_hierarchy_depth_inter_slice,
  sps_ref_wraparound_enabled_flag,
  sps_temporal_mvp_enabled_flag,
  sps_amvr_enabled_flag,
  sps_bdof_enabled_flag,
  sps_smvd_enabled_flag,
  sps_dmvr_enabled_flag,
  sps_mmvd_enabled_flag,
  six_minus_max_num_merge_cand,
  sps_sbt_enabled_flag,
  sps_affine_enabled_flag,
  sps_bcw_enabled_flag,
  sps_ciip_enabled_flag, and
  log 2_parallel_merge_level_minus2

In some embodiments, the multiple syntax elements associated with the merge mode and sequentially arranged in the bitstream at least include:
  sps_mmvd_enabled_flag
  six_minus_max_num_merge_cand,
  sps_sbt_enabled_flag,
  sps_affine_enabled_flag,
  sps_bcw_enabled_flag,
  sps_ciip_enabled_flag, and
  log 2_parallel_merge_level_minus2.

The multiple syntax elements associated with the merge mode is also associated with the inter prediction function.

In some embodiments, the video decoder 30, receives from the bitstream, a set of syntax elements associated with a quantization function before the receiving of the multiple syntax elements associated with the intra prediction function.

In some embodiments, the video decoder 30, receives, from the bitstream, multiple syntax elements at one or more of picture parameter set (PPS) level and slice level, wherein the multiple syntax elements are associated with a predefined function and sequentially arranged in the bitstream; the video decoder 30, in accordance with a determination that the multiple syntax elements satisfy a predefined condition: receives, from the bitstream, a second syntax element immediately after the multiple syntax elements; the video decoder 30, in accordance with a determination that the multiple syntax elements do not satisfy the predefined condition: sets a default value to the second syntax element; and the video decoder 30, performs the predefined function to video data from the bitstream in accordance with the multiple syntax elements and the second syntax element, wherein the predefined function is one selected from the group consisting of quantization function, intra prediction function, and inter prediction function.

In some embodiments, the video decoder 30, further receives a set of syntax elements associated with the quantization function before the video decoder 30 receives a set of syntax elements associated with the inter prediction function.

In some embodiments, the video decoder 30, further receives a set of syntax elements associated with the quantization function after receiving a set of syntax elements associated with the inter prediction function.

In some embodiments, the multiple syntax elements in PPS level associated with the inter prediction function and sequentially arranged in the bitstream at least include:
  rpl1_idx_present_flag,
  pps_weighted_pred_flag,
  pps_weighted_bipred_flag,
  rpl_info_in_ph_flag, and
  pps_ref_wraparound_enabled_flag.

In some embodiments, the multiple syntax elements in PPS level include: pps_weighted_pred_flag, pps_weighted_bipred_flag, and rpl_info_in_ph_flag; the predefined condition is: (pps_weighted_pred_flag is true or pps_weighted_bipred_flag is true) and rpl_info_in_ph_flag is true; and the second syntax is wp_info_in_ph_flag.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components. The apparatus may use the circuitries in combination with the other hardware or software components for performing the above-described methods. Each module, sub-module, unit, or sub-unit disclosed above may be implemented at least partially using one or more circuitries.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of decoding video data, comprising:
receiving, from a bitstream, multiple syntax elements at a sequence parameter set (SPS) level, wherein the multiple syntax elements are associated with a predefined function and sequentially arranged in the bitstream;
in response to a determination that at least one of the multiple syntax elements satisfies a predefined condition:
receiving, from the bitstream, a second syntax element after the multiple syntax elements;
in response to a determination that the at least one of the multiple syntax elements does not satisfy the predefined condition:
setting a value of the second syntax element to a default value; and
performing the predefined function for video data from the bitstream in accordance with at least one of the multiple syntax elements and the second syntax element, wherein the predefined function is one selected from a group consisting of an intra prediction function, an inter prediction function, and a merge mode.

2. The method according to claim 1, wherein the multiple syntax elements associated with the intra prediction function and sequentially arranged in the bitstream at least include:
sps_isp_enabled_flag,
sps_mrl_enabled_flag,
sps_mip_enabled_flag,
sps_palette_enabled_flag, and
sps_ibc_enabled_flag, and
wherein the sequentially arranged multiple syntax elements associated with the intra prediction function do not include sps_bcw_enabled_flag.

3. The method according to claim 2, further comprising, receiving from the bitstream, a set of syntax elements associated with the inter prediction function after the receiving of the multiple syntax elements associated with the intra prediction function.

4. The method according to claim 1, wherein the multiple syntax elements associated with the inter prediction function and sequentially arranged in the bitstream at least include:
sps_weighted_pred_flag,
sps_weighted_bipred_flag,
long_term_ref_pics_flag,
inter_layer_ref_pics_present_flag,
sps_idr_rpl_present_flag,
rpl1_same_as_rpl0_flag,
sps_log 2_diff_min_qt_min_cb_inter_slice,
sps_max_mtt_hierarchy_depth_inter_slice,
sps_ref_wraparound_enabled_flag,
sps_temporal_mvp_enabled_flag,
sps_amvr_enabled_flag,
sps_bdof_enabled_flag,
sps_smvd_enabled_flag,
sps_dmvr_enabled_flag,
sps_mmvd_enabled_flag,
six_minus_max_num_merge_cand,
sps_sbt_enabled_flag,
sps_affine_enabled_flag,
sps_bcw_enabled_flag,
sps_ciip_enabled_flag, and
log 2_parallel_merge_level_minus2.

5. The method according to claim 1, wherein the multiple syntax elements associated with the merge mode and sequentially arranged in the bitstream at least include:
sps_mmvd_enabled_flag
six_minus_max_num_merge_cand, sps_sbt_enabled_flag,
sps_affine_enabled_flag,
sps_bcw_enabled_flag,
sps_ciip_enabled_flag, and
log 2_parallel_merge_level_minus2.

6. The method according to claim 1, further comprising, receiving from the bitstream, a set of syntax elements associated with the merge mode before the receiving of the multiple syntax elements associated with the intra prediction function.

7. The method according to claim 1, wherein the receiving the second syntax element is conducted immediately after the multiple syntax elements.

8. An electronic apparatus comprising:
one or more processing units;
memory coupled to the one or more processing units; and
a plurality of programs stored in the memory that, when executed by the one or more processing units, cause the electronic apparatus to perform actions of decoding video data, the actions comprising:
receiving, from a bitstream, multiple syntax elements at a sequence parameter set (SPS) level, wherein the multiple syntax elements are associated with a predefined function and sequentially arranged in the bitstream;
in response to a determination that at least one of the multiple syntax elements satisfies a predefined condition:
receiving, from the bitstream, a second syntax element after the multiple syntax elements;
in response to a determination that the at least one of the multiple syntax elements does not satisfy the predefined condition:
setting a value of the second syntax element to a default value; and
performing the predefined function for video data from the bitstream in accordance with at least one of the multiple syntax elements and the second syntax element, wherein the predefined function is one selected from a group consisting of an intra prediction function, an inter prediction function, and a merge mode.

9. The electronic apparatus according to claim 8, wherein the multiple syntax elements associated with the intra prediction function and sequentially arranged in the bitstream at least include:
sps_isp_enabled_flag,
sps_mrl_enabled_flag,
sps_mip_enabled_flag,
sps_palette_enabled_flag, and
sps_ibc_enabled_flag, and
wherein the sequentially arranged multiple syntax elements associated with the intra prediction function do not include sps_bcw_enabled_flag.

10. The electronic apparatus according to claim 9, wherein the method further comprises, receiving from the bitstream, a set of syntax elements associated with the inter prediction function after the receiving of the multiple syntax elements associated with the intra prediction function.

11. The electronic apparatus according to claim 8, wherein the multiple syntax elements associated with the inter prediction function and sequentially arranged in the bitstream at least include:
sps_weighted_pred_flag,
sps_weighted_bipred_flag,
long_term_ref_pics_flag,
inter_layer_ref_pics_present_flag,
sps_idr_rpl_present_flag,
rpl1_same_as_rpl0_flag,
sps_log 2_diff_min_qt_min_cb_inter_slice,
sps_max_mtt_hierarchy_depth_inter_slice,
sps_ref_wraparound_enabled_flag,
sps_temporal_mvp_enabled_flag,
sps_amvr_enabled_flag,
sps_bdof_enabled_flag,
sps_smvd_enabled_flag,
sps_dmvr_enabled_flag,
sps_mmvd_enabled_flag,
six_minus_max_num_merge_cand,
sps_sbt_enabled_flag,
sps_affine_enabled_flag,
sps_bcw_enabled_flag,
sps_ciip_enabled_flag, and
log 2_parallel_merge_level_minus2.

12. The electronic apparatus according to claim 8, wherein the multiple syntax elements associated with the merge mode and sequentially arranged in the bitstream at least include:
sps_mmvd_enabled_flag
six_minus_max_num_merge_cand,
sps_sbt_enabled_flag,
sps_affine_enabled_flag,
sps_bcw_enabled_flag,
sps_ciip_enabled_flag, and
log 2_parallel_merge_level_minus2.

13. The electronic apparatus according to claim 8, wherein the actions further comprise, receiving from the bitstream, a set of syntax elements associated with the merge mode before the receiving of the multiple syntax elements associated with the intra prediction function.

14. The electronic apparatus according to claim 8, wherein the receiving the second syntax element is conducted immediately after the multiple syntax elements.

15. A non-transitory computer-readable medium, having instructions stored thereon, which when executed by one or more processors cause the one or more processors to perform acts of decoding video data, the acts comprising:
receiving, from a bitstream, multiple syntax elements at a sequence parameter set (SPS) level, wherein the multiple syntax elements are associated with a predefined function and sequentially arranged in the bitstream;
in response to a determination that at least one of the multiple syntax elements satisfies a predefined condition:
receiving, from the bitstream, a second syntax element after the multiple syntax elements;
in response to a determination that the at least one of the multiple syntax elements does not satisfy the predefined condition:
setting a value of the second syntax element to a default value; and
performing the predefined function for video data from the bitstream in accordance with at least one of the multiple syntax elements and the second syntax element, wherein the predefined function is one selected from a group consisting of an intra prediction function, an inter prediction function, and a merge mode.

16. The non-transitory computer-readable medium according to claim 15, wherein the multiple syntax elements associated with the intra prediction function and sequentially arranged in the bitstream at least include:
sps_isp_enabled_flag,
sps_mrl_enabled_flag,
sps_mip_enabled_flag,
sps_palette_enabled_flag, and
sps_ibc_enabled_flag, and wherein the sequentially arranged multiple syntax elements associated with the intra prediction function do not include sps_bcw_enabled_flag.

17. The non-transitory computer-readable medium according to claim 16, wherein the method further comprises, receiving from the bitstream, a set of syntax elements associated with the inter prediction function after the receiving of the multiple syntax elements associated with the intra prediction function.

18. The non-transitory computer-readable medium according to claim 15, wherein the multiple syntax elements associated with the inter prediction function and sequentially arranged in the bitstream at least include:
sps_weighted_pred_flag,
sps_weighted_bipred_flag,
long_term_ref_pics_flag,
inter_layer_ref_pics_present_flag,
sps_idr_rpl_present_flag,
rpl1_same_as_rpl0_flag,
sps_log 2_diff_min_qt_min_cb_inter_slice,
sps_max_mtt_hierarchy_depth_inter_slice,
sps_ref_wraparound_enabled_flag,
sps_temporal_mvp_enabled_flag,
sps_amvr_enabled_flag,
sps_bdof_enabled_flag,
sps_smvd_enabled_flag,
sps_dmvr_enabled_flag,
sps_mmvd_enabled_flag,
six_minus_max_num_merge_cand,
sps_sbt_enabled_flag,
sps_affine_enabled_flag,
sps_bcw_enabled_flag,
sps_ciip_enabled_flag, and
log 2_parallel_merge_level_minus2.

19. The non-transitory computer-readable medium according to claim 15, wherein the multiple syntax elements associated with the merge mode and sequentially arranged in the bitstream at least include:
sps_mmvd_enabled_flag
six_minus_max_num_merge_cand,
sps_sbt_enabled_flag,
sps_affine_enabled_flag,
sps_bcw_enabled_flag,
sps_ciip_enabled_flag, and
log 2_parallel_merge_level_minus2.

20. The non-transitory computer-readable medium according to claim 15, wherein the acts further comprise, receiving from the bitstream, a set of syntax elements associated with merge mode before the receiving of the multiple syntax elements associated with the intra prediction function.

* * * * *